(12) United States Patent
Becattini, Jr. et al.

(10) Patent No.: US 8,516,975 B2
(45) Date of Patent: Aug. 27, 2013

(54) PET FEEDING SYSTEM AND METHOD FOR COLLECTING SPILLED FOOD AND WATER

(75) Inventors: Fernando Becattini, Jr., Malvern, PA (US); Jay Richard Sobel, Toronto (CA); Fernando Becattini, Sr., Devon, PA (US); Steve Arthur Copeland, Barrie (CA)

(73) Assignee: TowerStar Pets, LLC, Malvern, PA (US)

( * ) Notice: Subject to any disclaimer, the term of this patent is extended or adjusted under 35 U.S.C. 154(b) by 588 days.

(21) Appl. No.: 12/691,510

(22) Filed: Jan. 21, 2010

(65) Prior Publication Data

US 2010/0180827 A1 Jul. 22, 2010

Related U.S. Application Data

(63) Continuation-in-part of application No. PCT/US2009/039075, filed on Apr. 1, 2009, which is a continuation of application No. 12/348,176, filed on Jan. 2, 2009, now abandoned, which is a continuation-in-part of application No. 12/060,641, filed on Apr. 1, 2008, now abandoned.

(60) Provisional application No. 61/102,550, filed on Oct. 3, 2008.

(51) Int. Cl.
*A01K 5/01* (2006.01)

(52) U.S. Cl.
USPC ...... 119/61.54; 119/51.5; 119/52.1; 119/61.5

(58) Field of Classification Search
USPC ................ 119/51.01, 51.5, 51.12, 52.1, 55, 119/119/61.5, 61.51, 72, 61.53, 74, 61.54, 119/76, 61.55, 900, 61.56, 52.2, 61.57, 52.3, 119/58, 59, 60, 63
See application file for complete search history.

(56) References Cited

U.S. PATENT DOCUMENTS

| | | |
|---|---|---|
| 1,114,264 A | 10/1914 | Hoyle |
| 1,803,413 A | 5/1931 | Trites |
| 1,874,141 A | 8/1932 | Sueper |
| D89,262 S | 2/1933 | Nunimaker |
| D105,450 S | 7/1937 | Clifton |
| 2,555,396 A | 6/1951 | Cosner |
| 2,586,979 A | 2/1952 | Myers |
| 2,659,345 A | 11/1953 | Herbert |
| 2,845,896 A | 8/1958 | Copeland |

(Continued)

FOREIGN PATENT DOCUMENTS

WO   WO 2009/124106   10/2009

OTHER PUBLICATIONS

"The Marchiori Feeding Kiosk for Pets," http://www.catsplay.com/bci57068.phh3., Copyright 2005.

(Continued)

*Primary Examiner* — T. Nguyen
(74) *Attorney, Agent, or Firm* — RatnerPrestia

(57) ABSTRACT

A pet feeding system for separating spilled food from spilled water comprises a housing having a contained feeding area and at least one opening used to separate spilled food from spilled water. The system may include a sloped surface extending downward from a bowl region toward a collection region. A method for collecting spilled food and spilled water from a pet feeding system includes the step of separating spilled water from spilled food.

21 Claims, 49 Drawing Sheets

(56) References Cited

U.S. PATENT DOCUMENTS

| | | | | |
|---|---|---|---|---|
| 3,180,316 | A | 4/1965 | Chatfield et al. | |
| 3,599,608 | A | 8/1971 | Esquival | |
| 3,651,787 | A | 3/1972 | Cooper | |
| 3,730,141 | A | 5/1973 | Manning et al. | |
| 3,763,826 | A * | 10/1973 | Portelli | 119/52.1 |
| D229,073 | S | 11/1973 | Brickel | |
| 3,890,931 | A * | 6/1975 | Saver | 119/161 |
| D237,787 | S | 11/1975 | Weyrich | |
| 3,924,573 | A | 12/1975 | Thomas et al. | |
| 3,965,863 | A * | 6/1976 | Scott | 119/161 |
| 4,029,051 | A | 6/1977 | McKinney | |
| 4,192,256 | A | 3/1980 | Clugston | |
| D257,692 | S | 12/1980 | Thayer | |
| D257,914 | S | 1/1981 | Wooters | |
| D259,669 | S | 6/1981 | Peterson | |
| D267,901 | S | 2/1983 | Johnstonbaugh | |
| D270,672 | S | 9/1983 | Zelinger | |
| 4,428,325 | A | 1/1984 | Koch | |
| 4,532,891 | A * | 8/1985 | Jones | 119/61.54 |
| D289,808 | S | 5/1987 | Gardner | |
| 4,699,089 | A | 10/1987 | Teschke | |
| 4,886,016 | A | 12/1989 | Atchley | |
| 4,907,539 | A | 3/1990 | Abulhasan | |
| 4,940,019 | A | 7/1990 | Coffer | |
| 4,947,796 | A | 8/1990 | Robinette | |
| D312,896 | S | 12/1990 | Goetz | |
| 5,000,122 | A | 3/1991 | Smith | |
| D315,974 | S | 4/1991 | Steiner | |
| D324,192 | S | 2/1992 | Waltel, Jr. | |
| 5,133,291 | A | 7/1992 | Justice | |
| 5,152,247 | A | 10/1992 | Brown | |
| 5,158,040 | A | 10/1992 | Martin | |
| 5,174,245 | A | 12/1992 | Bishop | |
| D335,007 | S | 4/1993 | McPhee | |
| 5,224,443 | A | 7/1993 | Leslie | |
| 5,327,838 | A | 7/1994 | Beltman | |
| D353,082 | S | 12/1994 | Keven | |
| 5,445,110 | A | 8/1995 | Birnie | |
| 5,492,083 | A | 2/1996 | Holladay | |
| 5,499,609 | A | 3/1996 | Evans | |
| 5,509,376 | A * | 4/1996 | Tsengas | 119/51.5 |
| D374,109 | S | 9/1996 | Lillelund et al. | |
| 5,551,371 | A | 9/1996 | Markey et al. | |
| D374,513 | S | 10/1996 | Melvin | |
| 5,560,316 | A | 10/1996 | Lillelund et al. | |
| D377,244 | S | 1/1997 | Steininger | |
| D385,068 | S | 10/1997 | Malcolm | |
| D393,107 | S | 3/1998 | Tsengas | |
| 5,730,081 | A | 3/1998 | Tsengas | |
| 5,765,505 | A | 6/1998 | Yun | |
| 5,794,565 | A | 8/1998 | Beshah | |
| 5,881,670 | A | 3/1999 | Pelsor | |
| D410,780 | S | 6/1999 | McGinty | |
| D412,377 | S | 7/1999 | Sharon | |
| D424,252 | S | 5/2000 | Hirsh | |
| D425,262 | S | 5/2000 | Scott et al. | |
| 6,055,934 | A | 5/2000 | Burns et al. | |
| 6,089,187 | A | 7/2000 | Gaspary | |
| 6,142,099 | A | 11/2000 | Lange, Jr. | |
| 6,145,474 | A | 11/2000 | Lemkin | |
| 6,209,487 | B1 | 4/2001 | Quinlan et al. | |
| 6,405,673 | B1 | 6/2002 | Allender | |
| 6,427,626 | B1 | 8/2002 | Quinlan et al. | |
| 6,467,428 | B1 | 10/2002 | Andrisin et al. | |
| D467,045 | S | 12/2002 | Tsengas | |
| D477,691 | S | 7/2003 | Crowley | |
| 6,786,177 | B1 | 9/2004 | Lemkin | |
| 6,789,504 | B1 | 9/2004 | O'Neil | |
| D506,295 | S | 6/2005 | Hammer et al. | |
| 7,073,461 | B2 | 7/2006 | Gonet | |
| 7,152,550 | B2 | 12/2006 | Walker | |
| D551,400 | S | 9/2007 | Tsengas | |
| 7,341,019 | B1 | 3/2008 | Tsengas | |
| D592,814 | S * | 5/2009 | Uffner et al. | D30/133 |
| D602,652 | S | 10/2009 | Horvath | |
| D606,711 | S | 12/2009 | Becattini et al. | |
| D618,862 | S | 6/2010 | Shamoon et al. | |
| D621,559 | S | 8/2010 | Clark, Jr. | |
| D621,560 | S | 8/2010 | McMurphy | |
| D622,013 | S | 8/2010 | Aho | |
| 2003/0037732 | A1 | 2/2003 | Quinlan et al. | |
| 2004/0144330 | A1 | 7/2004 | Marchioro | |
| 2005/0115508 | A1 | 6/2005 | Little | |
| 2005/0211184 | A1 | 9/2005 | Tominaga et al. | |
| 2008/0190372 | A1 * | 8/2008 | Horvath | 119/61.56 |
| 2008/0196668 | A1 | 8/2008 | Clark | |
| 2009/0241843 | A1 | 10/2009 | Becattini et al. | |
| 2009/0241844 | A1 | 10/2009 | Becattini et al. | |

OTHER PUBLICATIONS

International Search Report for Application No. PCT/US2009/039075, dated May 27, 2009.

International Search Report for Application No. PCT/US09/31431, dated Mar. 10, 2009.

Application No. PCT/US09/31431, filed Jan. 20, 2009 (Now Abandoned).

Pending U.S. Appl. No. 12/612,965, filed Nov. 5, 2009.

Pending U.S. Appl. No. 29/346,923, filed Nov. 9, 2009.

Pending Canadian Application No. 133413, filed Dec. 21, 2009.

USPTO Notice of Allowance for Application No. 29/312,240, dated Sep. 23, 2009.

USPTO Non-Final Office Action for U.S. Appl. No. 29/312,240, dated Jun. 22, 2009.

European Community Design Reg. No. 001650342-0001, Dec. 21, 2009, Tower Star pets, LLC.

USPTO Notice of Allowance for U.S. Appl. No. 29/346,923, Dated May 27, 2010.

* cited by examiner

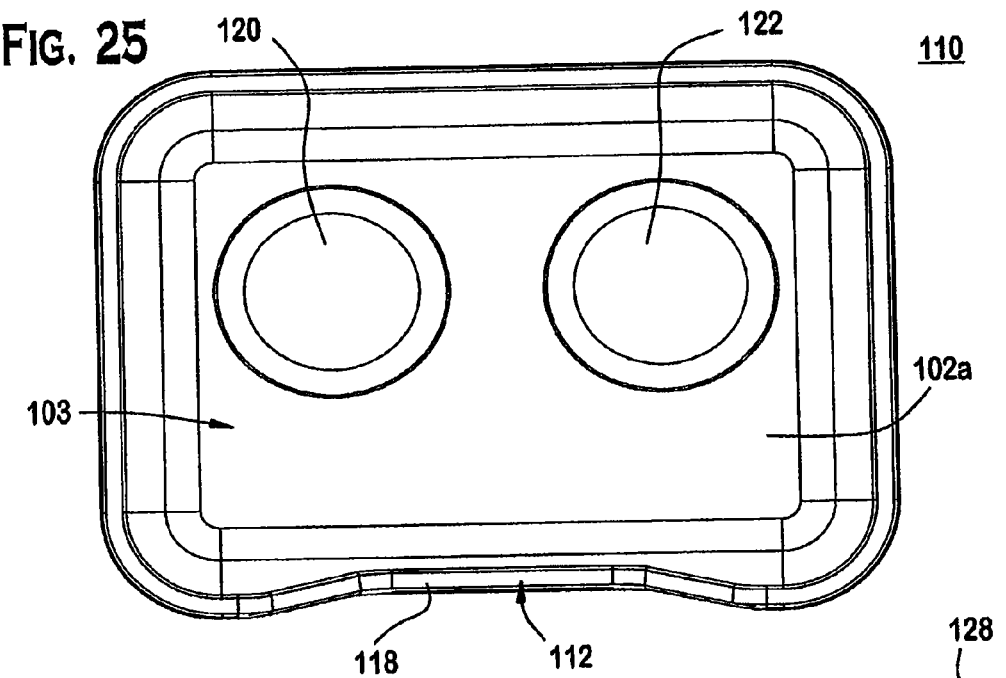
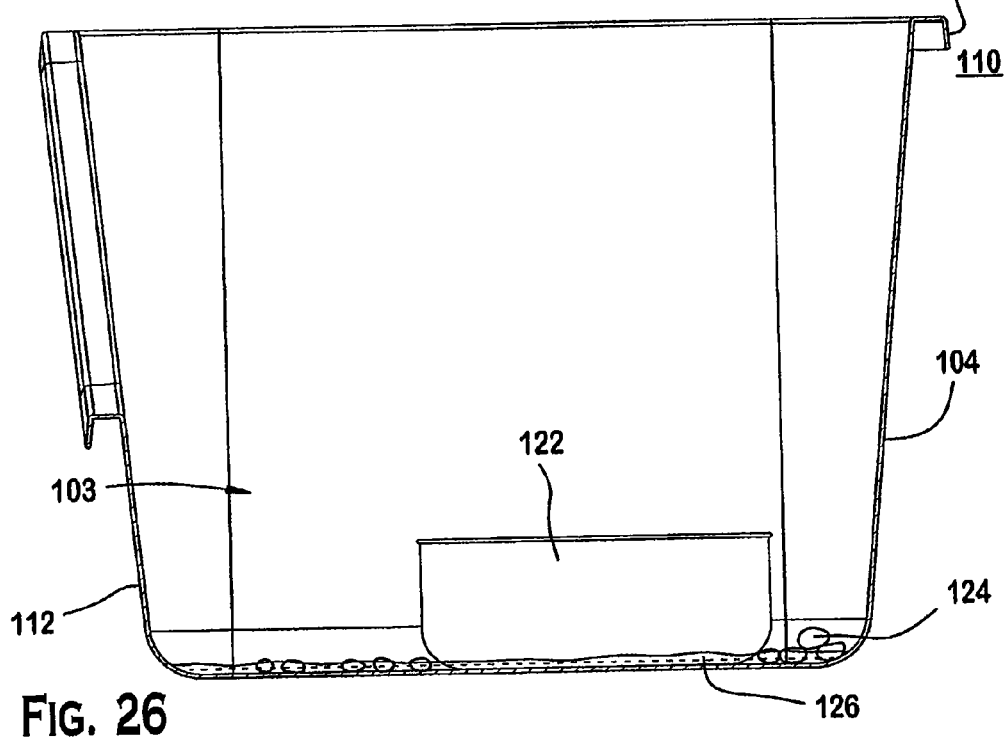

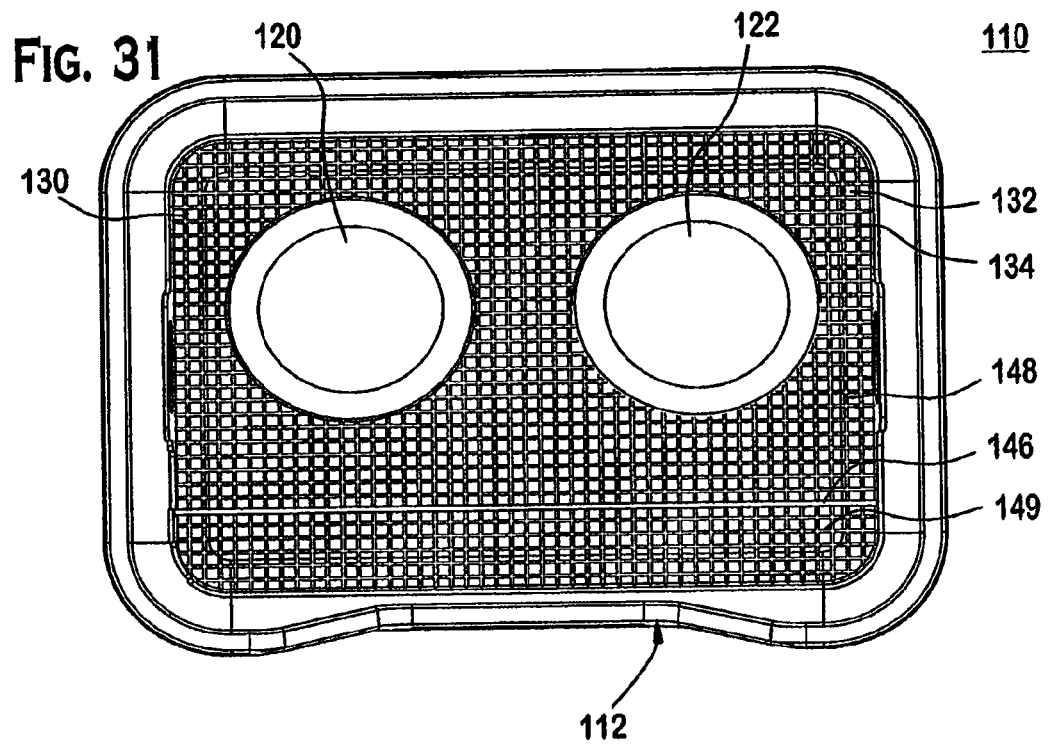
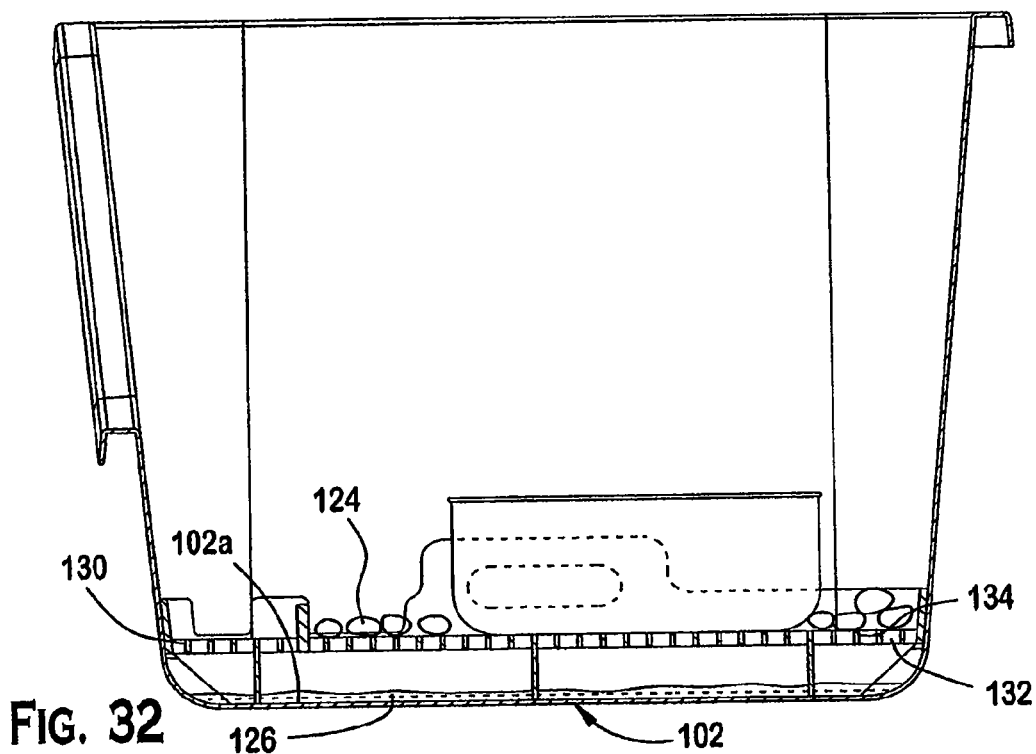

PET FEEDING SYSTEM AND METHOD FOR COLLECTING SPILLED FOOD AND WATER

CROSS REFERENCE TO RELATED APPLICATIONS

This application is a continuation-in-part of PCT Application No. PCT/US2009/039075, filed Apr. 1, 2009, which claims priority to U.S. application Ser. No. 12/348,176, filed Jan. 2, 2009, which in turn claims the benefit of U.S. Provisional Application No. 61/102,550, filed Oct. 3, 2008; and U.S. application Ser. No. 12/060,641, filed Apr. 1, 2008. The contents of each of these applications are incorporated by reference herein, in their entirety, and for all purposes.

FIELD OF THE INVENTION

The present invention pertains to pet feeding systems and particularly to the containment of pet food and water within such systems.

BACKGROUND OF THE INVENTION

Pet owners, particularly dog and cat owners, have the difficult task of maintaining a suitable place in their home where pets can access food and water. Owners must frequently fill, empty, and re-fill food and water bowls, as well as maintain a clean feeding area. For many reasons, these responsibilities can be time-consuming and inconvenient.

One common problem is that food and water spills often create messes in the area surrounding feeding bowls. It is not uncommon for pets to knock food and water out of their bowls onto the surrounding floor and walls, or to spill and splash food and water onto the floor and surrounding area while feeding. Pet owners also create spills around pet feeding areas by accidentally bumping the food or water bowls or by spilling food and water while setting bowls on the floor. These spills, particularly water spills, can damage floors, walls, and furniture. In addition, spilled matter can adhere to a pet's paws or feet and be tracked around the house, thereby widening the area that a pet owner needs to clean.

Efforts have been made to minimize the messes around a pet's feeding area. For example, in U.S. Pat. No. 4,532,891 to Jones, feeding bowls are engaged by a lattice member that is supported by a collection pan. The lattice member has interstices that are large enough (i.e., at least ⅜ inch across and preferably ¾ inch to 1 inch across) to permit both spilled food and spilled water to fall through the interstices into the collection pan.

SUMMARY OF THE INVENTION

A shortcoming of previous attempts to contain the mess created by feeding pets is that spilled water and spilled food are contained together, thus creating a soggy, unsanitary mess. Upon drying, the saturated pet food often hardens and adheres to the container surface and becomes more difficult to clean. This also prevents the pet owner from being able to collect spilled food for re-use while it is still substantially dry. Another shortcoming of previous attempts is they collect spilled food in an area that is not accessible to the pet, thus preventing the pet from consuming the spilled food, and essentially cleaning its own mess.

Pet feeding systems in accordance with the invention efficiently collect spilled food and spilled water, and rapidly separate spilled water from the spilled food. A pet feeding system in accordance with one embodiment of the invention comprises a housing which defines a contained feeding area adapted to hold a food bowl and/or a water bowl. The housing comprises means for filtering spilled food from spilled water. The means for filtering comprise at least one opening sufficiently small such that the spilled food remains in the contained feeding area but the spilled water passes through the at least one opening, thereby allowing for separation of spilled food from spilled water. The pet feeding system may have a sloped surface extending downward from a bowl region toward a perforated collection region.

In another embodiment, the pet feeding system includes a housing defining a contained feeding area, the housing having means for filtering spilled food from spilled water. The housing defines at least one opening in the contained feeding area, and at least one bowl is disposed in the at least one opening. The means for filtering includes at least one opening sufficiently small such that the spilled food remains in the contained feeding area but the spilled water passes through the at least one opening, thereby allowing for separation of spilled food from spilled water.

In another embodiment, a pet feeding system includes a base, at least one wall having a front section and a remaining section, and at least one bowl disposed on or above the base. The wall extends upwardly from the base to define a contained feeding area. The front section has a low portion and at least one high portion and the remaining section has a high portion. The top of the low portion is above the top edge of the bowl(s).

In another embodiment, a pet feeding system includes a first reservoir and a second reservoir. The first reservoir has a bowl region adapted to hold at least one bowl for containing food, water, or both food and water. The first reservoir is adapted to contain spilled food and the second reservoir is adapted to contain spilled water.

The present invention also provides methods for collecting and containing spilled food and spilled water from a pet feeding system. One method in accordance with the invention includes separating the pet feeding system into a first reservoir having at least one wall and a second reservoir, which are detachably coupled to each other. The first reservoir comprises a bowl region adapted to hold at least one bowl for containing food and/or water. In addition, the first reservoir is adapted to contain spilled food and the second reservoir is adapted to contain spilled water. Spilled food is removed from the first reservoir and spilled water is removed from the second reservoir.

In another embodiment, a pet feeding system includes a second reservoir disposed underneath a first reservoir. The first reservoir has a filtering trough located adjacent the bowl region. The filtering trough has openings which are sufficiently small to permit spilled water to pass through the openings into the second reservoir, while retaining spilled food in the first reservoir. Thus, spilled food is separated from spilled water.

In another embodiment, a pet feeding system includes a housing which defines a contained feeding area having a collection region and a bowl region. The bowl region is adapted to hold at least one bowl for containing food, water, or both food and water. The housing has a base with a sloped surface for directing water from the bowl region to the collection region. The collection region is adapted to contain a quantity of water.

In another embodiment, a pet feeding system includes a housing and a filter component. According to this embodiment, the housing defines a contained feeding area adapted to hold at least one bowl for containing food, water, or both food and water and defines a filter opening. The filter component is mounted to the housing at the filter opening for filtering spilled food from spilled water, and the filter component is removable from the housing. The filter component comprises at least one opening sufficiently small such that spilled food that lands on the filter component remains on the filter component, but the spilled water passes through the at least one opening, thereby allowing for separation of spilled water from spilled food.

In another embodiment, a pet feeding system includes a base having a first end and a second end opposite the first end, the base having a uniform slope descending from the first end to the second end. A barrier extends upwardly from the base and surrounds the perimeter of the base, the barrier having a first section rising a first height from the base, and a second section rising a second height from the base at the second end of the base, the second height being less than the first height to form an access opening at the second end of the base. A trap in the second end of the base is configured to receive a solid or a liquid spilled on the base. The trap includes at least one opening for allowing a liquid that enters the trap to exit the trap while retaining a solid that enters the trap.

In another embodiment, a pet feeding system includes a substantially planar base having a first end and a second end opposite the first end. The base has a slope descending from the first end to the second end. The system also includes at least one bowl receptacle between the first and the second end, and a barrier extending upwardly from and surrounding the perimeter of the base. A trap in the second end of the base is configured for receiving a solid or a liquid spilled on the base. At least one channel fluidly connects the first end of the base with the trap.

In another embodiment, a method for feeding a pet includes receiving a spilled solid onto a sloped base, receiving a spilled liquid onto a sloped base, channeling any spilled liquid that falls on the first end of the base down at least one channel to rapidly convey the spilled liquid from the first end of the base into a trap, retaining the spilled solid on the base or in the trap where it remains accessible and in an edible condition to a pet that is using the pet feeding system, and draining the spilled liquid through the trap to a collection area beneath the base, where the liquid remains separate from the spilled solid.

It is to be understood that both the foregoing general description and the following detailed description are exemplary, but not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. Included in the drawings are the following figures:

FIG. 25 illustrates a top plan view of the embodiment of the housing of the present invention shown in FIG. 24;

FIG. 26 illustrates a cross-sectional view, along the line 26-26, of the embodiment of the housing of the present invention shown in FIG. 24;

FIG. 31 illustrates a top plan view of the embodiment of the present invention shown in FIG. 29 having a filtering tray;

FIG. 32 illustrates a cross-sectional view, along the line 32-32, of the embodiment of the present invention shown in FIG. 29 having a filtering tray;

DETAILED DESCRIPTION OF THE INVENTION

Figure 1:
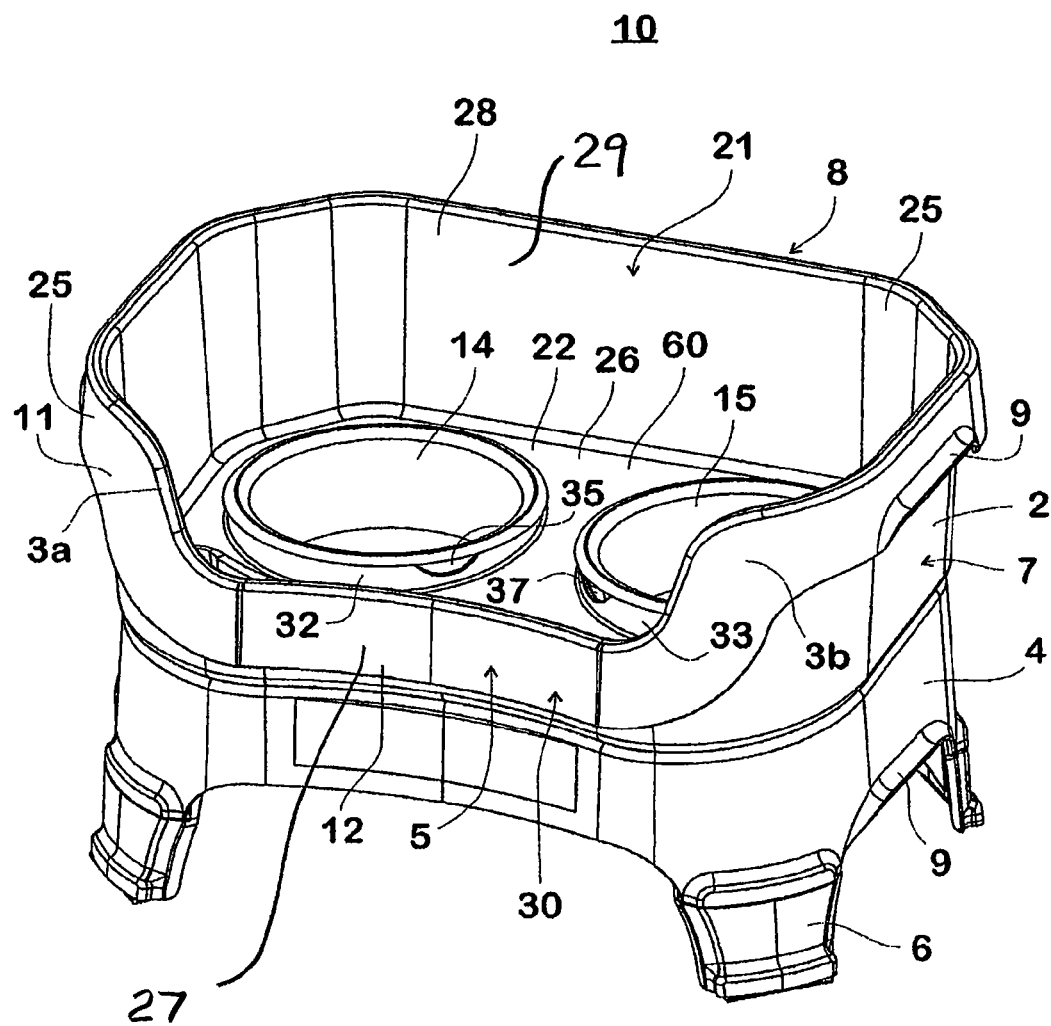
FIG. 1 illustrates a perspective view of an embodiment of the present invention.

Pet feeding systems in accordance with various embodiments of the invention address a number of considerations that are not appreciated or accounted for in known pet feeding systems. One consideration is "food spill accessibility", i.e. collecting spilled food in a manner that keeps the food off the floor and in a sanitary environment while still being accessible to the pet after the spill. When spilled food remains accessible to the pet, the pet can still reach and consume the spilled food, essentially allowing the pet to clean up its own food spills. This is in contrast to traditional approaches that collect spilled food in enclosed areas below the feeding area where the pet cannot access. Another consideration is "spill separation", i.e. keeping spilled water separate from spilled food, so as to eliminate or minimize the amount of time that spilled food stays in contact with spilled water. When spilled water and spilled food are collected together, they combine to form a soggy and unsanitary mess that can attract pests and create a breeding ground for germs. In some cases, pet food that mixes with water dries, hardens and adheres to the surface becoming more difficult to remove from the pet feeding system. In other cases, where more water is spilled, the spilled food breaks apart and dissolves in the water creating a solution that can be more difficult to clean up and dispose of than either spilled food or spilled water alone. Furthermore, the dissolved food can not be recovered for reuse, resulting in waste.

Food spill accessibility and spill separation are not addressed in the approaches taken by Jones and others. In fact, the concepts of food spill accessibility and spill separation are incompatible with the approaches taken by Jones and others. The system in Jones, for example, overlooks both considerations because it not only collects spilled food and water together, but collects spilled food and water beneath a lattice where the spills cannot be accessed by the animal. The approaches taken by Jones and others focus entirely on collecting spilled food and water in an enclosure so that the spilled food and water can not leave the feeding apparatus, or be tracked away by the animals. This approach overlooks the fact that when spilled food and water are collected together in a feeding system, the mess is not reduced, but merely contained in a location within the feeding system, where it creates many of the same problems observed with spills that are not controlled and can actually result in a more unsightly and difficult to clean mess than experienced with no system at all. By keeping the spilled food accessible, the pet can consume the spilled food and reduce the mess. Moreover, the approaches by Jones and others result in wasted food, because the spilled food is allowed to mix with or dissolve in spilled water over extended periods of time, rendering the food unrecoverable.

Embodiments of the pet feeding system separate spilled food from spilled water in an efficient manner that can be self-cleaning, reduces messes and reduces food waste. Although embodiments of the invention are described and illustrated in the figures as having one bowl for containing food and one bowl for containing water, the invention contemplates a pet feeding system having no bowl, as well as a system that has one bowl, or two or more bowls. As used throughout, the term "bowl" includes any container which is adapted to contain either food or water, or both food and water, in the latter case preferably having a divider to separate the food and water, and the bowl may be removable from the housing or integral with the housing. The pet feeding system is intended to be used by one or multiple pets (i.e., either sequentially or concurrently). Any suitable material(s) may be used for the features of the present invention. Preferably, the features of the pet feeding system are made of material that is impervious to liquids, most preferably plastic material, or alternatively wood, ceramic, or metal (e.g., stainless steel). The embodiments described herein are intended for use by dogs and cats, and can be configured in a variety of sizes, as needed.

Figure 3:
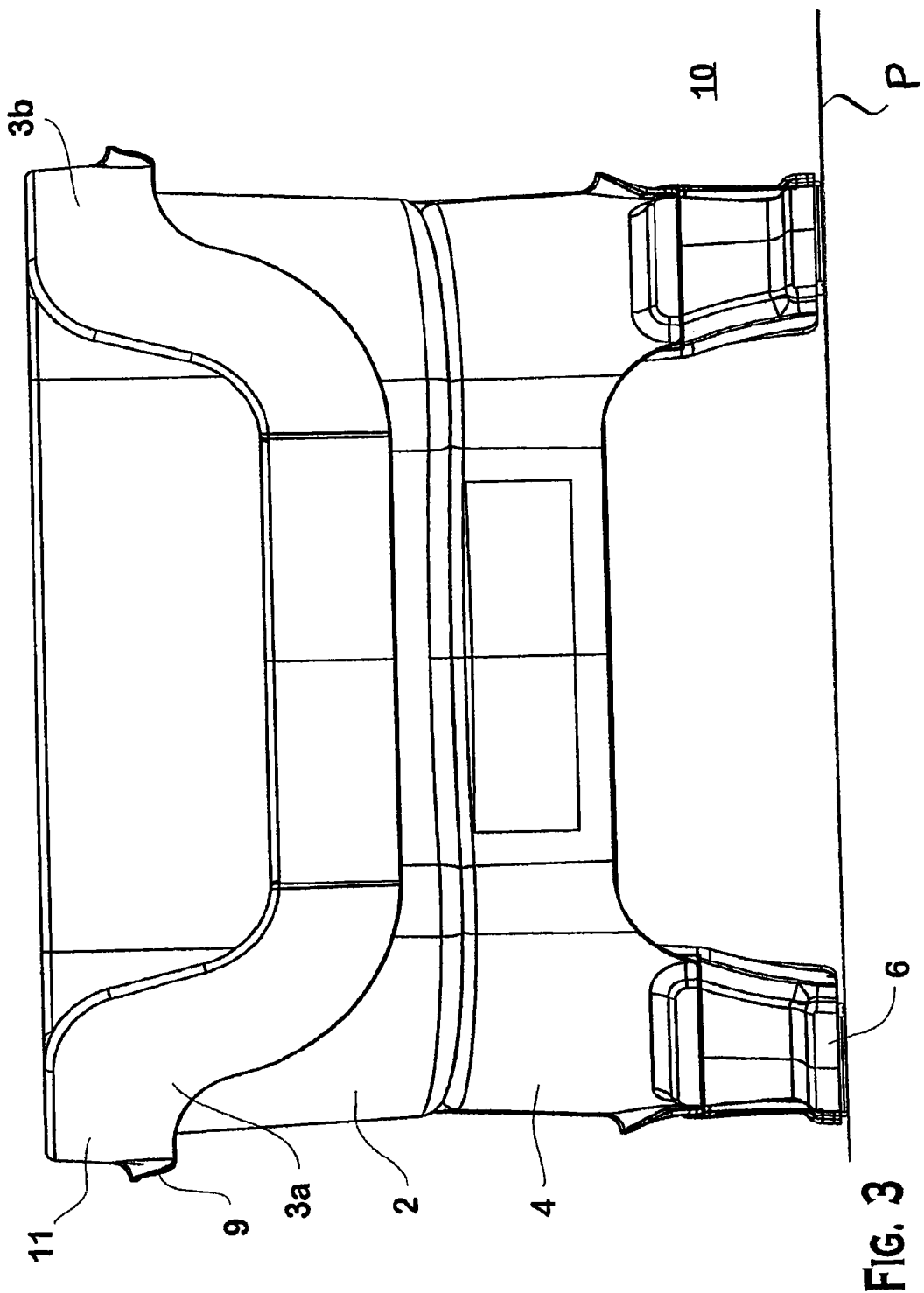
FIG. 3 illustrates a front view of the embodiment of the present invention shown in FIG. 1.

In reference to the drawings, FIG. 1 is a perspective view of an embodiment of the invention. A pet feeding system 10 according to FIG. 1 comprises a housing 8 having a front end 27 and a rear end 29. Housing 8 defines a contained feeding area 21 adapted to hold at least one bowl. In a preferred embodiment, the housing 8 has a base 60 which includes a generally planar or flat surface 26, and the contained feeding area 21 has a bowl region 22. Base 60 forms an inclined surface with respect to an imaginary horizontal plane "P" shown in FIG. 3, which extends through a surface upon which feeding system 10 rests. A large section of base 60 has a uniform slope that descends toward plane P (i.e. downwardly) from rear end 29 to front end 27. In particular, the sloped surface 26 of base 60 has a uniform slope around the bowl area. As will be shown and described in more detail below, the uniformly sloped surface 26 adjoins and drains into a trough having a variable slope.

It will be understood that sloped surfaces in accordance with the invention need not have a uniform slope, as shown with base 60. Although the area around bowls has a uniform slope on base 60, other slope configurations may be used, with the preferred configurations providing for rapid separation of spilled water from spilled food. Therefore, it will be understood that the area around the bowls may have a variable slope, for example. Surface configurations in accordance with the invention may also address ornamental considerations, in addition to spill separation. For example, the area around the bowls may include non-planar surfaces with gentle curvatures.

Various directional terms are used throughout this description to identify parts of components, or relative positions of components. Using FIG. 3 for reference, the term "bottom", as used herein, refers to a direction or feature that is oriented toward plane P, unless otherwise indicated. The term "top", as used herein, refers to a direction or feature that is oriented away from plane P, unless otherwise indicated. Similarly, the terms "high", "low" and "height" are measured in a direction perpendicular to plane P, unless otherwise indicated.

The bowl region 22 is adapted to hold one bowl or a plurality of bowls for containing food, water, or both. As used herein, a "contained feeding area" refers to any area defined by the housing that is adapted to hold at least one bowl. As described in more detail below with regard to the housing, a contained feeding area according to the present invention is not necessarily defined by any walls, barriers or other structures that enclose or partially enclose the area. However, in preferable embodiments, the contained feeding area may be defined by multiple walls, only one wall, a "ridge" of negligible height, or any number of walls and/or ridges of varying heights. The contained feeding area is adapted to be reached into by a pet's head, but is not adapted or intended for a pet to stand or walk around in.

Figure 2:
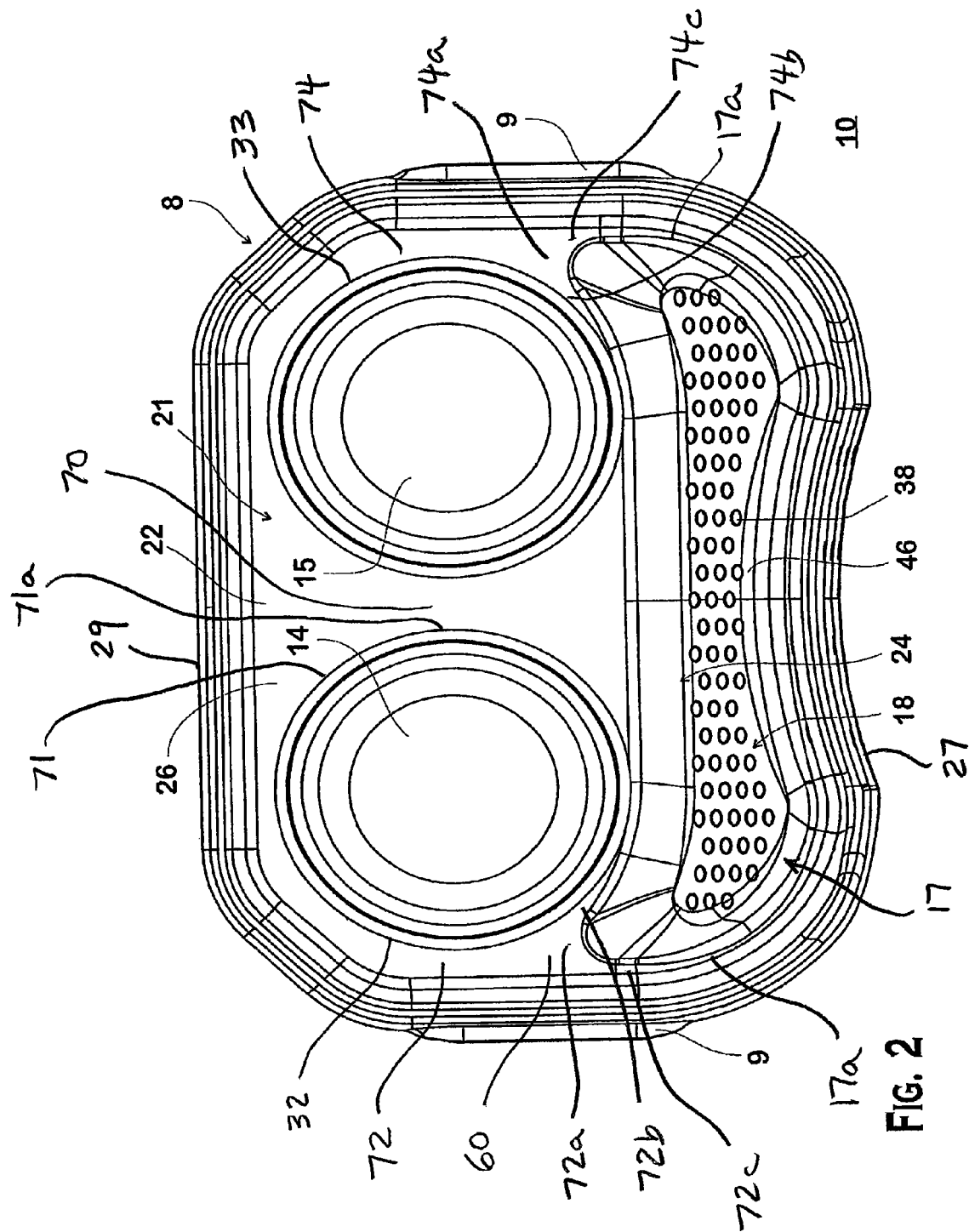
FIG. 2 illustrates a top plan view of the embodiment of the present invention shown in FIG. 1.

Preferred embodiments of the invention include one or more means for separating spilled water from spilled food. Referring now to FIG. 2, pet feeding system 10 comprises a trap 17 that separates spilled food from spilled water. Trap 17 includes a trough 46 located at the low end of sloped base 60. Trough 46 has a bottom section comprising a means for filtering 18. Filtering means 18 may comprise any one of the means for filtering described herein, or any combination thereof. For example, the means for filtering may comprise a single opening or multiple openings which are of any size that is sufficiently small to prevent a significant amount of spilled food from passing though the opening(s), while allowing a significant amount of water to drain through the opening(s). Preferably, the opening or openings are sized sufficiently small to prevent passage of any whole pieces of pet food that enter pet feeding system 10 as well as a significant amount of crumbs. Other exemplary means for filtering include systems for separating spilled food from spilled water, such as the use of an aspirator to draw spilled water from an area of the first reservoir 2 where only spilled water is directed.

Traps in accordance with the invention can include a wide variety of means for filtering spilled water from spilled food and means for draining spilled water from the trap. As shown in FIG. 2, such means may include, for example, a plurality of oval-shaped holes 38 defined by a portion of the base 60 that is adjacent to the feeding bowls 14, 15. As used herein, the term "opening" refers to any type of passage having any size or shape, including, for example, a hole, aperture, pore, void, slot, perforation, interstitial space, or slit, including irregular shapes and minute openings on the order of microns (or less) such as in filtering paper or filtering membranes. Means for filtering can alternatively include a single opening or a plurality of openings; can be any shape, including, for example, a circle, oval, square, or rectangle; can be defined by a portion of a surface 26 (as shown, for example, in FIG. 2), or can be defined by an entire surface (as shown, for example, in FIG. 16); can be parallel, perpendicular, or angled toward a surface; and can be removable (as shown, for example, in FIG. 19) from the feeding system or non-removable. Examples of alternative embodiments of means for filtering spilled food from spilled water include a trough, grid, mesh (including fine mesh defining square openings sized on the order of hundredths of an inch), tray, or rib having a single opening (as in a drain) or multiple openings. In one embodiment, the openings are holes which are oval and are disposed to have their longer axis extending parallel along the longer length of trough 46, as shown in FIG. 2, as holes having this configuration may be cleaned more easily.

Figure 38:
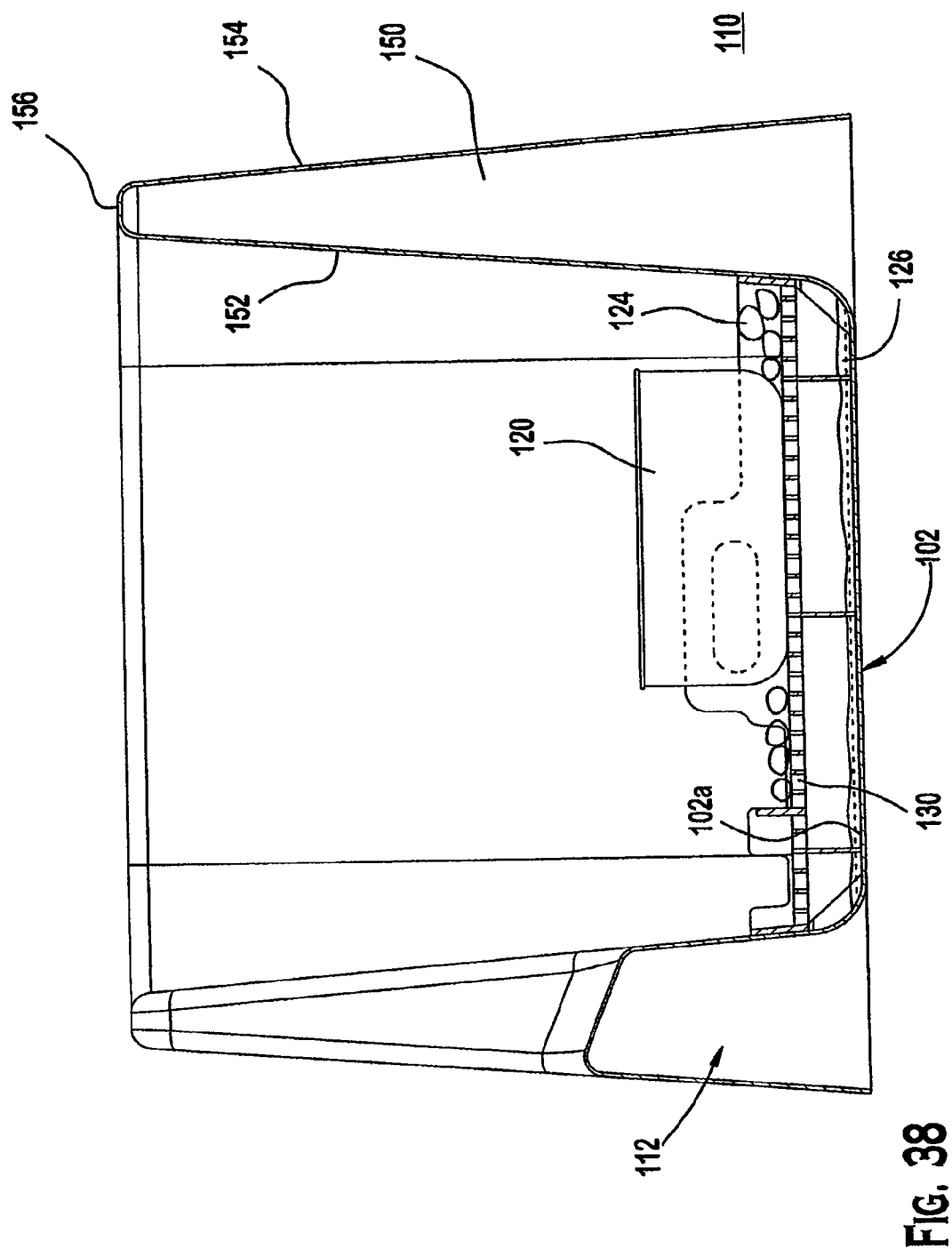
FIG. 38 illustrates a cross-sectional view, along the line 38-38, of the embodiment of the present invention shown in FIG. 37 having a double wall.

As explained above, the means for filtering preferably comprise at least one opening (a single opening or multiple openings). The at least one opening is sufficiently small such that the spilled food remains in the filtering area (e.g., on the filtering means 18 in FIG. 2, or on the filtering tray 130 as shown in FIG. 38) but the spilled water passes through the at least one opening, thereby allowing for separation of spilled food from spilled water. Thus, the spilled food remains within the contained feeding area (i.e., the area defined by the housing that is adapted to hold at least one bowl), and the spilled water passes through the means for filtering and out of the contained feeding area, and is contained in a separate reservoir. Because the spilled food and water are separated from each other and are not collected into the same reservoir or container, an owner may avoid the problem of spilled food becoming saturated with spilled water, causing the food to become soggy (and possibly hardened upon drying) and more difficult to clean. With the spilled food separated from spilled water, the spilled food may be easily recovered from the contained feeding area and re-used while it is still substantially dry. Alternatively, the pet can consume some or all of the spilled food because it remains accessible to the pet in the contained feeding area.

In order to separate spilled food from spilled water, it is important that the opening(s) are sufficiently small such that a significant amount of the spilled food pieces are larger than the opening(s) and will not fit through the opening(s). The width(s) of the opening(s) (e.g., the diameter of a circular opening) preferably range from minuscule to just less than 3/8 inch. For example, minuscule opening(s) may comprise micro-pores of a water-permeable filtering membrane (as shown, for example, in FIG. 23). Alternatively, the opening(s) have width(s) in a range of about 1/16 inch to about 1/4 inch.

In an exemplary embodiment, the openings are hole(s) defining a "short axis" and a "long axis" (e.g., a minor axis or width and a major axis or length, respectively), with the short axis substantially perpendicular to the long axis. As shown, for example, in FIG. 2, the hole(s) are preferably oval-shaped, with each oval having a short axis and a long axis. Each hole preferably has a short axis of less than ⅜ inch. In particular, the hole(s) preferably have a short axis ranging from minuscule to just less than ⅜ inch, and a long axis of about ⅜ inch (for example, the hole(s) may comprise long slits). More preferably, each hole is in the shape of an oval and has a short axis of about 1/16 inch to about ¼ inch (preferably about ⅛ inch), and a long axis of about ⅛ inch to less than about ⅜ inch (preferably about ¼ or 5/16 inch).

In sum, it is desirable to size the at least one opening in a way which retains substantially all (e.g., greater than about 80%, more preferably about 90%, more preferably about 95% and still more preferably about 99%) of the spilled food pieces. In an embodiment, a reasonably high amount of spilled pet food pieces is retained when the width of the hole(s) is just less than ⅜ inch (e.g., about 5/16 inch to just less than ⅜ inch). However, many commercially available national pet food brands have food pieces smaller than ⅜ inch, and crumbs created when the pet is eating are often smaller than ⅜ inch. Thus, it is preferable for the maximum width of the hole(s) to be about 5/16 inch or less, more preferably about ¼ inch or less, still more preferably about 3/16 inch or less, and most preferably about ⅛ inch or less. Consequently, the preferred size of the hole(s) is sufficiently small to prevent a significant amount of spilled food from passing through the hole(s) (i.e., permitting the spilled food to remain within the contained feeding area), while permitting spilled water to pass through the hole(s) and be retained in another reservoir.

Embodiments of the present invention separate spilled food and spilled water into separate containers. Permitting spilled food and spilled water to collect in the same container has several shortcomings, as is found in some prior art systems. The first shortcoming is that if spilled water is allowed to collect in the same area as whole pieces of food or a significant amount of food particles, it creates an odorous, unsightly, and unsanitary mixture that attracts pests such as ants, fruit flies, and drain flies, and becomes a breeding ground for germs. This soupy solution is also unpleasant to dispose of and requires much more frequent cleaning and maintenance than if spilled water is contained in an area relatively free of food particles. By keeping the water substantially clean, spilled water can be collected and held in the container for an extended period of time, even days, without requiring action by the pet owner or creating adverse side effects. In fact, if only a small amount of spilled water is collected, it can be left to evaporate and thus requires no effort of the pet owner. Thus, embodiments of the present invention provide a system whereby much of the spilled water is prevented from reaching the floor and is contained and collected in an area relatively free of food pieces so that a pet owner may leave spilled water in the collection area for an extended period of time with minimal adverse side effects.

Figure 19:
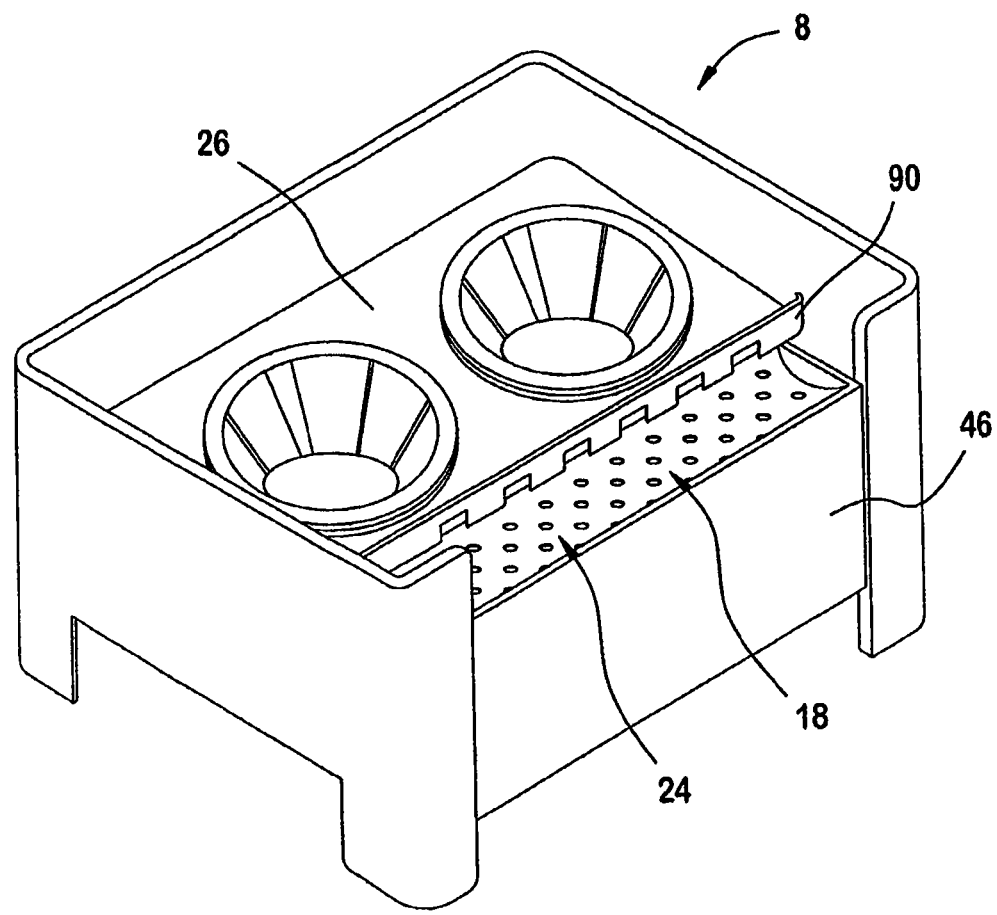
FIG. 19 illustrates a perspective view of an embodiment of the present invention in which the means for filtering comprise a removable trough.
Figure 51:
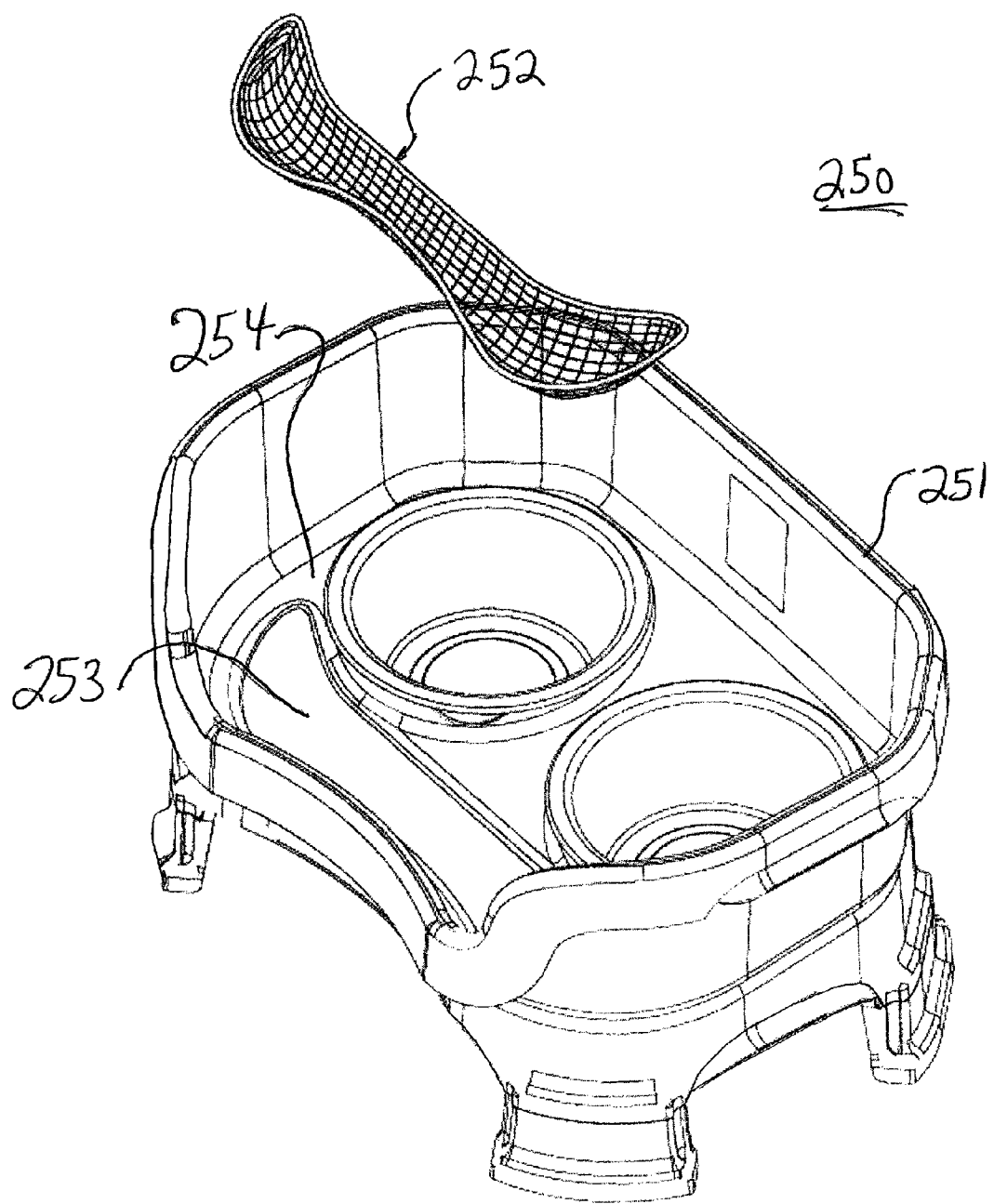
FIG. 51 illustrates an exploded perspective view of an embodiment of the present invention showing a filter component separate from the housing.

Embodiments of the present invention may comprise means for filtering which are integral with the housing (as shown in FIG. 2), means for filtering which are removable from the housing (as shown in FIGS. 19 and 51), or both. In some embodiments, the means for filtering which are removable from the housing may be detachably coupled to the housing. As shown in FIG. 2, the means for filtering 18 are preferably defined by a portion of the base 60 that is adjacent to the bowl region 22 within the contained feeding area 21. In addition, the means for filtering 18 is preferably situated at the lowest point within the contained feeding area. Moreover, the means for filtering 18 is preferably positioned between the bowl region and the front of the feeding system. In this arrangement, the means for filtering 18 is ideally placed to receive spilled food and water either directly from the pet's mouth or indirectly via the sloped base 60.

Figure 16:
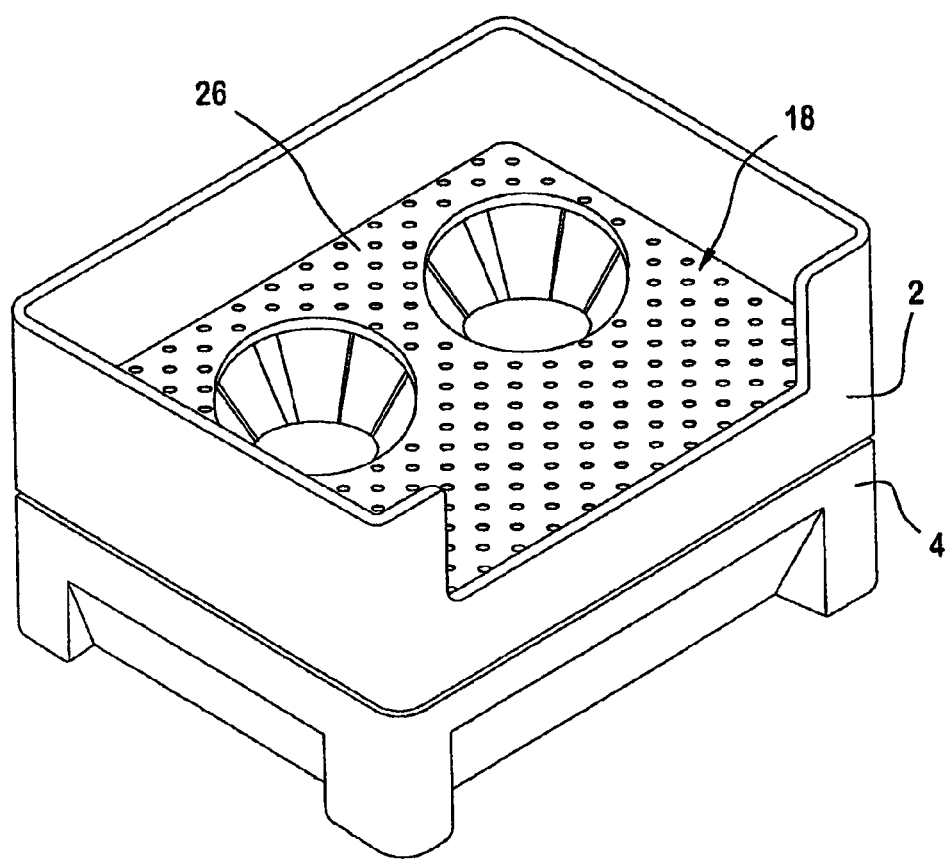
FIG. 16 illustrates a perspective view of an embodiment of the present invention in which the means for filtering extend throughout substantially the entire base of the first reservoir.
Figure 17:
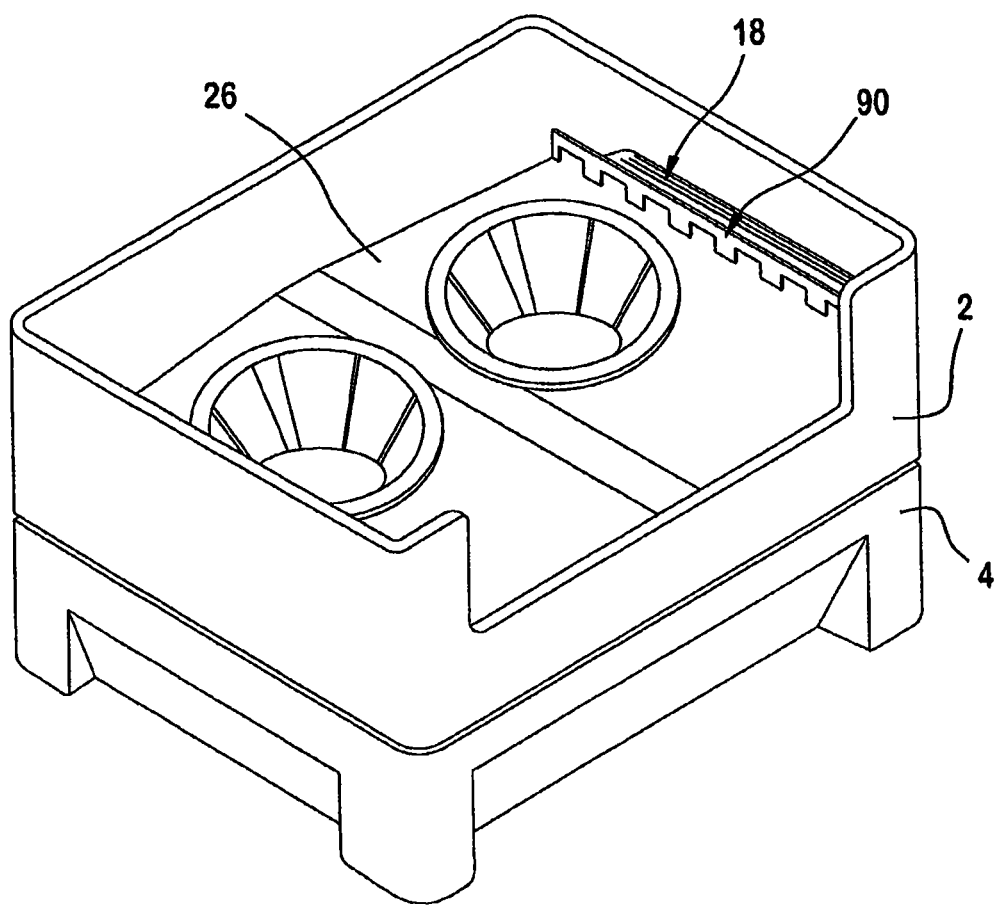
FIG. 17 illustrates a perspective view of an embodiment of the present invention in which the base of the first reservoir comprises a plurality of sloped surfaces and the means for filtering comprise a perforated rib.

In an alternative embodiment, as shown, for example, in FIG. 16, the means for filtering 18 may extend throughout substantially the entire base 60 of the housing 8. As illustrated in FIG. 17, embodiments of the present invention may also comprise means for filtering 18 which are perpendicular or angled toward the surface 26 of the bowl region 22 or toward a portion of the surface 26 adjacent to the bowl region 22. For example, the means for filtering 18 may comprise a perforated rib 90, as shown in FIG. 17. As illustrated in FIG. 19, other embodiments may include a perforated rib 90 and/or a perforated collection region 24 that is removable from the housing.

In the embodiment shown in FIGS. 1 and 2, the means for filtering 18 comprise a perforated collection region 24. As used herein, the "perforated collection region" refers to any region of the feeding system 10 that comprises a single hole or a plurality of holes for separating spilled water from spilled food. The housing 8 of the feeding system 10 defines the contained feeding area 21 having the bowl region 22 and the perforated collection region 24. In the embodiment shown in FIG. 1, the housing 8 has a sloped surface 26 which extends downward from the bowl region 22 toward the perforated collection region 24. A primary objective of the sloped surface 26 is to direct the flow of spilled water to the perforated collection region 24. In the embodiments shown, spilled water passes through the perforated collection region 24 into a second reservoir 4. Thus, it is contemplated that spilled food and spilled water are separated so that the spilled food stays dry and suitable for re-use and the spilled water stays clean, and so that a user can more easily collect the spilled food and water from the pet feeding system 10.

As used herein, a housing according to the present invention can be any structure which is adapted to hold at least one bowl. As described in more detail below, a housing may be one monolithic unit (i.e., formed as a single unit), or may alternatively include a plurality of units, such as a first reservoir 2 and a second reservoir 4, as illustrated in the embodiment shown in FIG. 1. Although the housing 8 is predominantly illustrated in the figures as comprising at least one wall or barrier 28 and a substantially rectangular shape with angled corners, a housing 8 according to the invention is also contemplated as having no walls, only one wall, a "ridge" of negligible height, or any number of multiple walls or ridges of varying heights. In alternative embodiments, walls or ridges are further contemplated as having a variety of alternative shapes, including, for example, curved, rounded, or straight. It is also contemplated that alternative wall or ridge shapes bring about alternative shapes of the pet feeding system, including, for example, an oval, circle, pentagon, square, rectangle, or modified oval with flattened sides, among others. It should be further appreciated that various features of the system described below are contemplated as having a variety of alternative shapes, preferably shapes that correspond to the overall shape of the system.

The housing may comprise one monolithic unit (for example, a single container or reservoir), or a plurality of units (for example, at least two containers or reservoirs). The plurality of units may comprise a combination of different types of units, such as a reservoir disposed over a mat. As shown in FIG. 1, the plurality of units may be easily coupled to each other. Alternatively, the housing may comprise a plurality of units which are not coupled to each other, such as a table-like reservoir disposed over a mat or tray.

Figure 49:
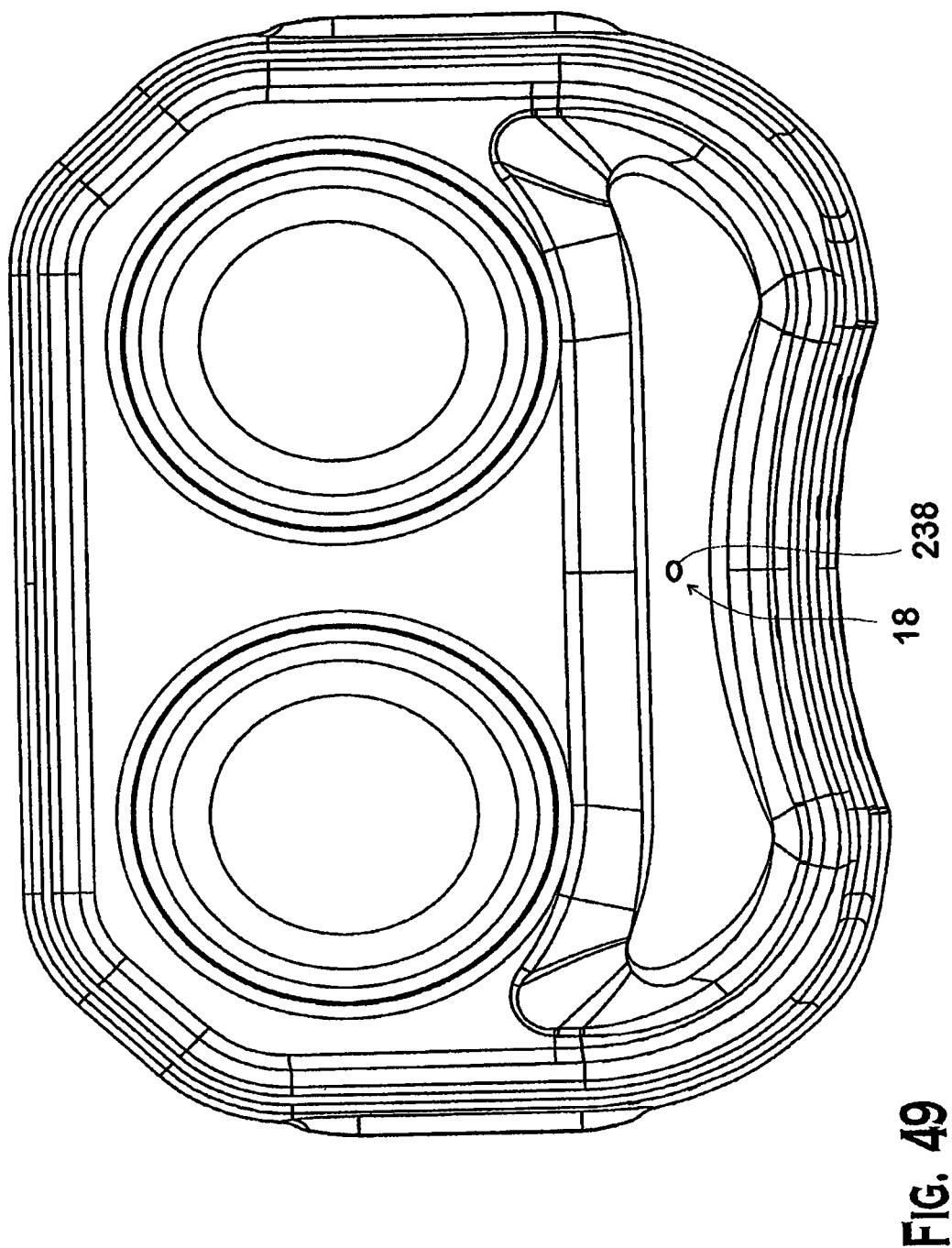
FIG. 49 illustrates a top plan view of an embodiment of the present invention in which the means for filtering comprise a single hole.

As illustrated in FIG. 1, the housing 8 comprises a first reservoir 2 and a second reservoir 4. The first reservoir 2 and second reservoir 4 are detachably coupled to each other, with the first reservoir 2 disposed above the second reservoir 4. As can be appreciated, the weight of the first reservoir 2 and a proper frictional fit are generally adequate to keep the first and second reservoirs affixed to each other in use. In alternative embodiments, the affixation of the two reservoirs may be made more secure by latches, magnets, buckles, hooks, snaps, or other similar means. In the embodiment shown in FIGS. 1 and 2, the first reservoir 2 comprises the contained feeding area 21 having a bowl region 22, a sloped surface 26, and means for filtering 18 spilled food from spilled water. The means for filtering 18 comprise a trough 46 which has oval-shaped holes 38 that are small enough to catch a substantial amount of spilled food (i.e. to prevent a substantial amount of spilled food from passing through the holes 38), while allowing spilled water to pass through the holes 38. While the shape of the holes in the preferred embodiment shown is oval, other shapes can be used. Thus, the holes are sufficiently small such that spilled food remains on the first reservoir 2 but the spilled water passes through the holes to the second reservoir 4, thereby allowing for separation of spilled food from spilled water. The surface 26 slopes downward from the bowl region 22 toward the perforated collection region 24. The trough 46 comprises a concave depression in the sloped surface 26, and has filter holes 38 which are defined in the depression. As shown in FIG. 49, the means for filtering 18 could alternatively comprise a single hole 238 or slit which separates spilled water from spilled food. In a preferred embodiment, the trough 46 is integral with the housing 8. In alternative embodiments, as shown in FIGS. 19 and 51, the trough 46 is removable from the housing 8. Thus, in embodiments where the trough 46 is removable, a user may detach the trough 46 from the housing 8 so that the trough is no longer coupled to the housing 8, but is entirely separated from it. Alternatively, the base may have no concave depression, and one or more holes may simply be located at the low end of the base, or in any area where spilled water may be directed.

Figure 4:
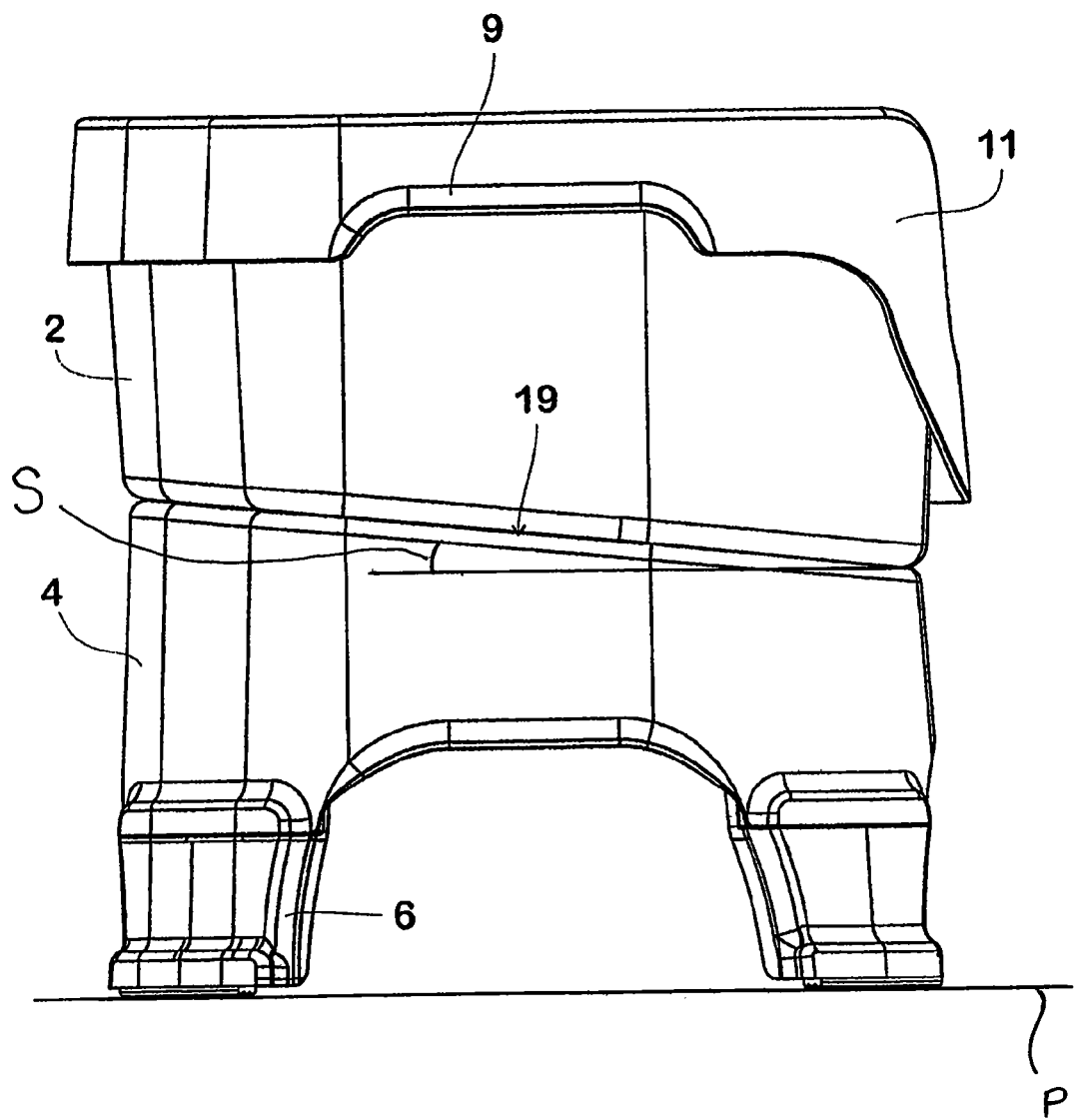
FIG. 4 illustrates a side view of the embodiment of the present invention shown in FIG. 1, viewed from the left side of FIG. 3.
Figure 5:
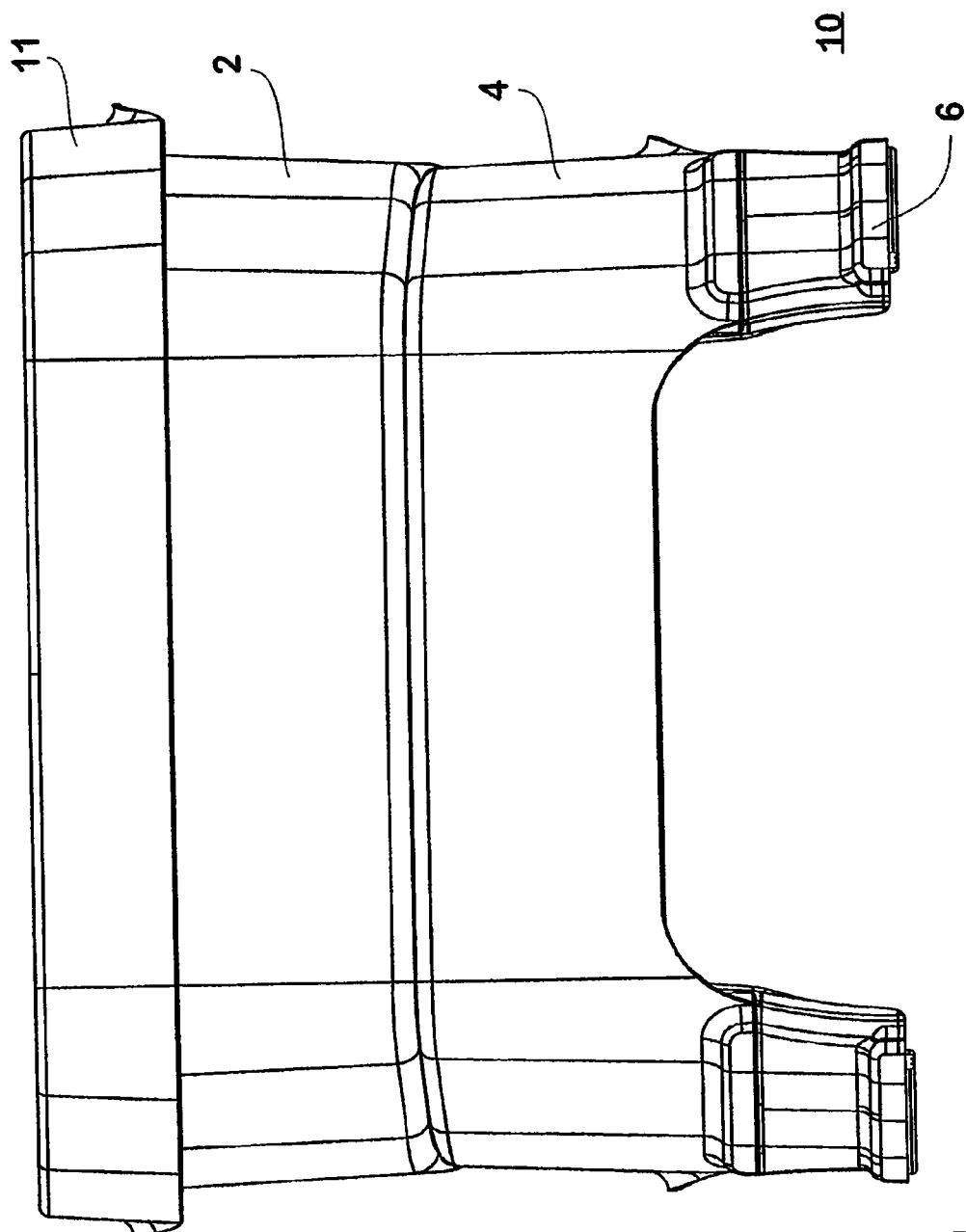
FIG. 5 illustrates a back view of the embodiment of the present invention shown in FIG. 1.
Figure 6:
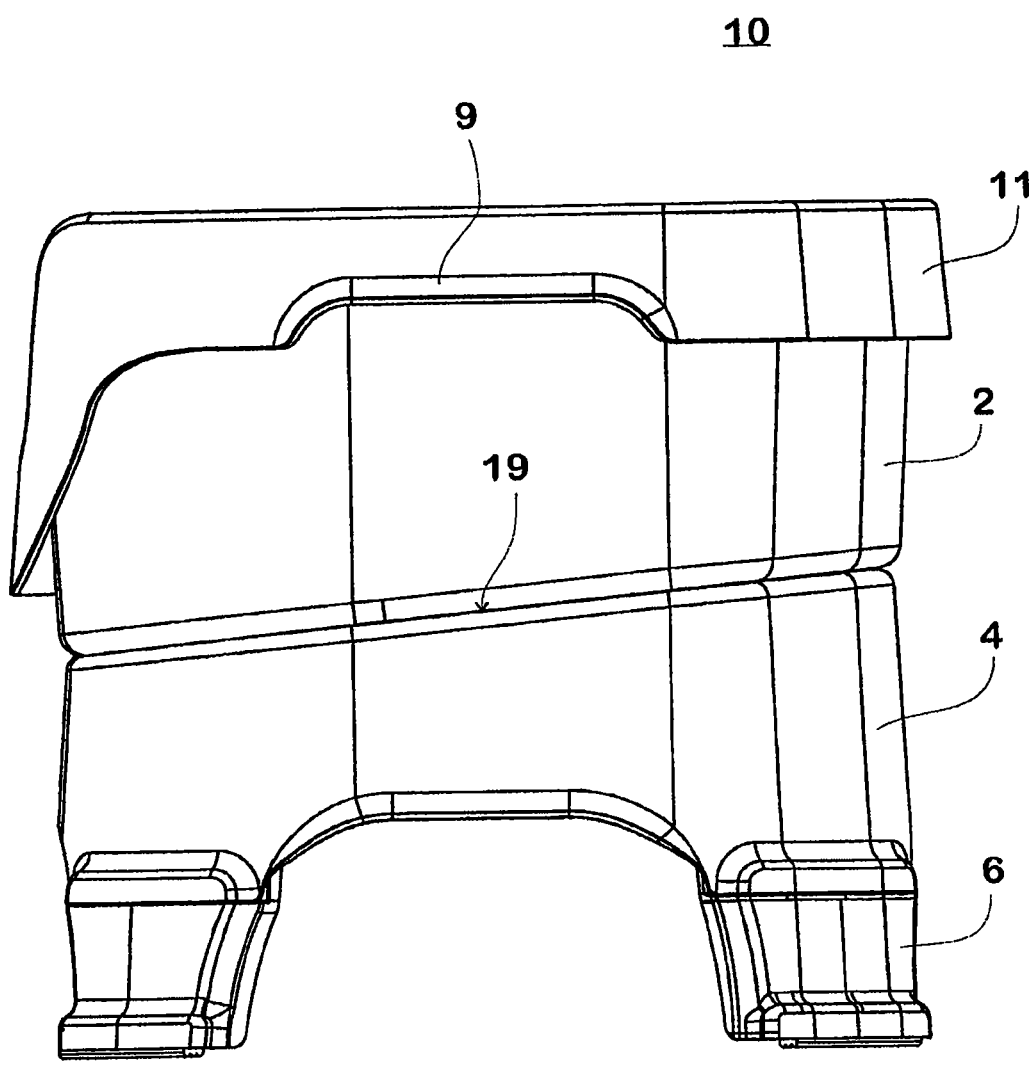
FIG. 6 illustrates a side view of the embodiment of the present invention shown in FIG. 1, viewed from the right side of FIG. 3.
Figure 7:
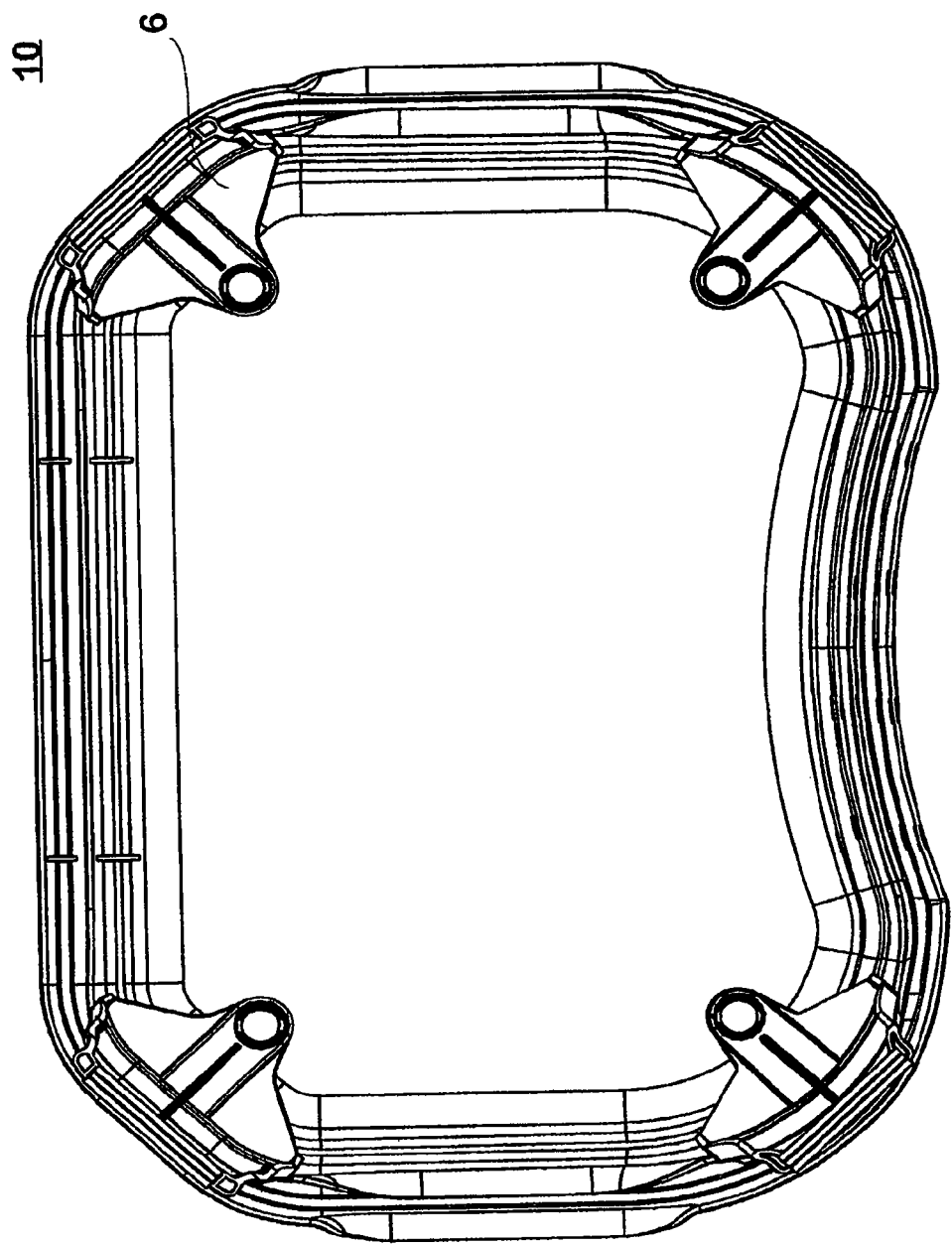
FIG. 7 illustrates a bottom view of the embodiment of the present invention shown in FIG. 1.

The downward inclination of the sloped surface 26 of base 60 can be any angle suitable for causing any spilled water to flow to the perforated collection region, as will be explained in further detail below. The surface of the base could alternatively have regions of varying slopes and slopes in different directions. Preferably, the first and second reservoir fit into one another in a way that provides an indication line 19 showing the angle of inclination, as shown in FIGS. 4 and 6. More preferably, the angle of the indication line 19 has a similar or even identical angle of the sloped surface 26. As illustrated in FIG. 17, the feeding system 10 may alternatively comprise a plurality of sloped surfaces.

In a preferred embodiment, the trough 46 is concave and curves downward from its front to back such that its lowest point would be along a center line which extends from left to right, which would be across the perforated collection 24 shown in FIG. 2. The bottom of trough 46 may be substantially level across the base or be bowed so as to have a single low point, centered both from left to right and front to back, to which spilled water would flow in the trough, that single centered location being a suitable location for a single hole or drain. Such a drain could also be located elsewhere in the trough and need not be centered.

Figure 8:
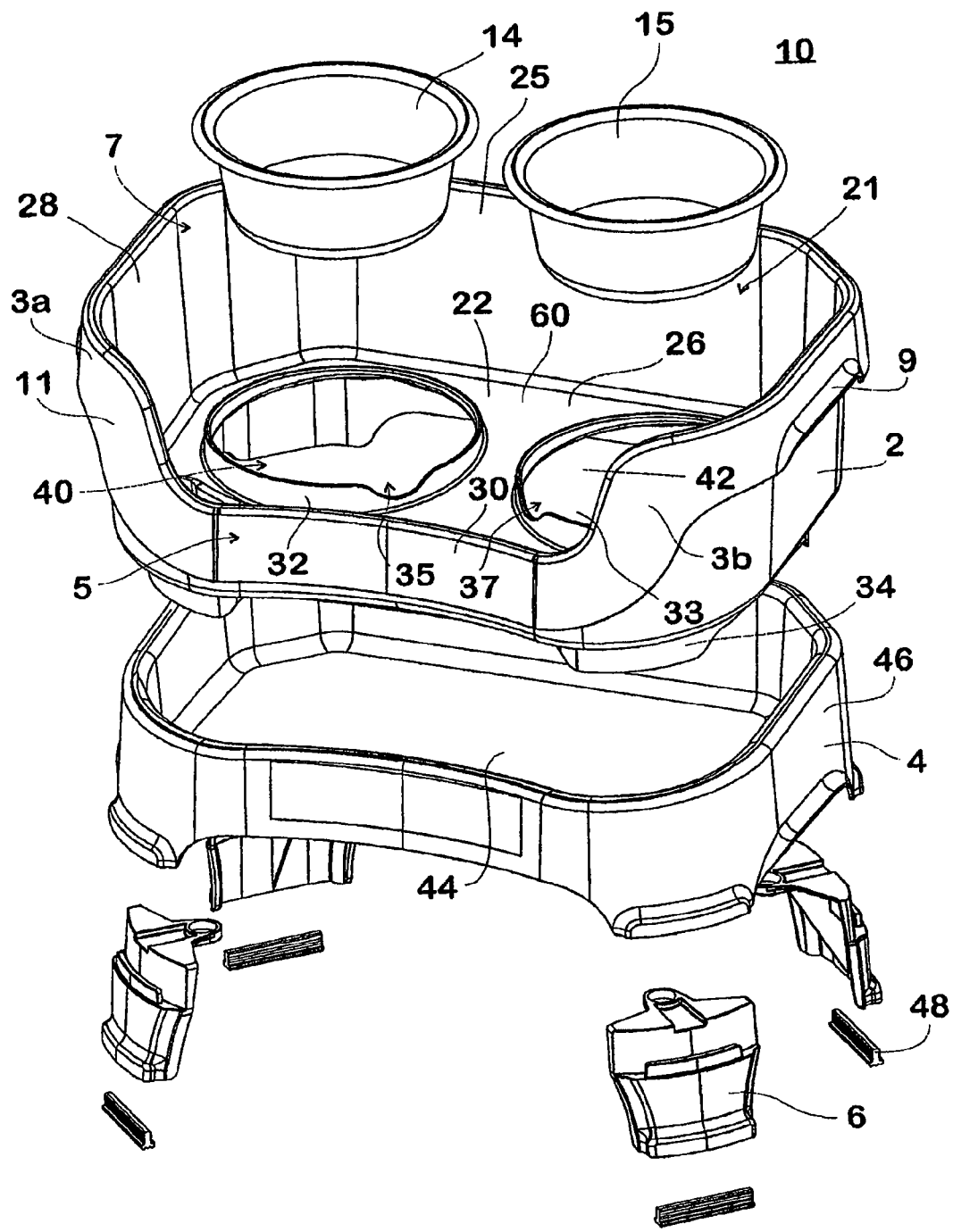
FIG. 8 illustrates an exploded view of the embodiment of the present invention shown in FIG. 1.

As used herein, and as illustrated in FIG. 8, the first reservoir 2 comprises a first reservoir base 60 and the second reservoir 4 comprises a second reservoir base 44. In a preferred embodiment, the first reservoir 2 comprises a first reservoir base 60 and at least one wall 28 extending upwardly from the first reservoir base 60 to define the contained feeding area 21. The at least one wall 28 preferably has a front section 5 and a remaining section 7. The front section 5 comprises a low portion 30 and at least one high portion 3a and 3b, and the remaining section 7 comprises a high portion 25. At least one bowl for containing food and water is optionally disposed on, disposed above, or extends through openings 40, 42 in the base 60. In the embodiment of the feeding system 10 shown in FIG. 1, the first reservoir base 60 has a sloped surface 26, and the at least one wall 28 extends upwardly from the sloped surface 26. The surface 26 and at least one wall 28 of the first reservoir 2 substantially contain spills that occur when in use by the pet or when the system 10 or bowls 14, 15 are knocked into or bumped by a pet or person. In addition, a segment 12 of the low portion 30 is contoured inwardly toward the bowl region 22. The contoured segment 12 permits a pet to stand in closer proximity to the bowl region 22 than if the segment were flat. Also, in comparison to a flat segment, the contoured segment 12 permits a user to hold the feeding system 10 more comfortably, as a contoured segment 12 can rest more easily against the user's body.

Figure 22C:
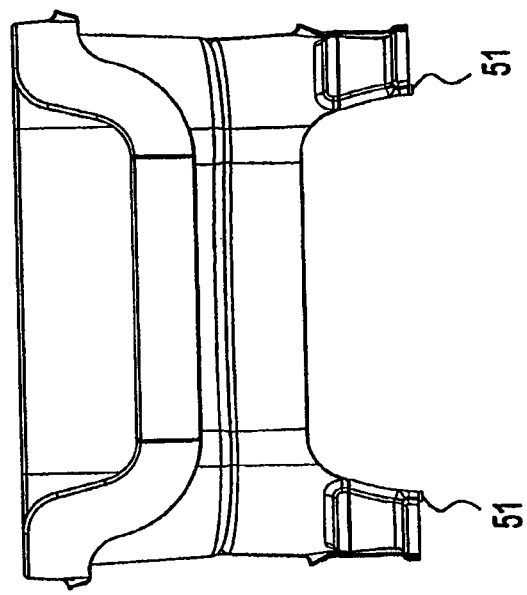
FIGS. 22a, 22b, and 22c illustrate three front views of three embodiments of the present invention, each having post legs as shown in FIG. 21.
Figure 22B:
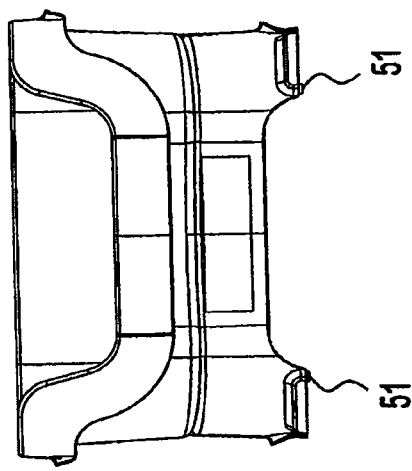
Figure 22A:
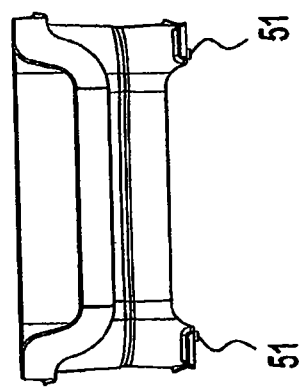

FIGS. 22a, 22b, and 22c illustrate pet feeding systems 10 with varying dimensions. The dimensions of the various features of the pet feeding system 10 can vary over wide ranges and are primarily based on the type and breed of the pets for which the system is intended for use. It can be imagined that a system for a large breed of dog would have significantly different proportions from a system for a cat or small dog. For example, the feeding system 10 shown in FIG. 22a would preferably be used by a relatively small pet, the feeding system 10 shown in FIG. 22b would preferably be used by a relatively medium-sized pet, and the feeding system 10 shown in FIG. 22c would preferably be used by a relatively large pet. As can be seen from comparing FIGS. 22a-22c with each other, the ratio of heights of the first reservoir 2 and second reservoir 4 need not be the same for the different sizes.

In a preferred embodiment, the high portions 3a, 3b, 25 of the pet feeding system 10 have a height above the floor of about 50% to about 80% of the shoulder height or withers of the pets for which the system is adapted for use. This relative height provides a close proximity between the high portions 3a, 3b, 25 of the pet feeding system 10 and the head and shoulders of the pet while the pet is feeding. Preferably, when the pet reaches into the contained feeding area 21 to access food and water bowls 14, 15, the high portions 3a, 3b, 25 of the system 10 surround the pet's head and shoulders to create a containment area. The high walls minimize or prevent food and water dropped or spilled from the pet's mouth from falling to the floor or splashing or splattering onto surrounding walls or objects. The at least one wall 28 of the feeding system 10 provides a physical barrier that deters a pet from moving its head around while feeding. Because the high portions 3a, 3b, 25 restrict the range of movement of the pet's head, it is believed that a pet will be more likely to keep its head, and therefore spilled food, over the feeding system 10. Therefore, the high portions 3a, 3b, 25, and their proximity to the low portion 30 are likely to reduce the chance of the pet bringing its head outside of the feeding system 10 and dropping food or water on the floor.

The high portions 3a, 3b, 25 of the feeding system 10 also block the pet's vision, thus obstructing the pet's view of the surrounding area and reducing visual distractions that may cause the pet to move its head or leave the feeding area. The wall(s) also create a physical barrier that inhibits pests, animals, and people, including children, from approaching the feeding bowls. Thus, the wall(s) may hinder pests, such as ants, from accessing the food and water bowls, and also may provide a safety benefit in the case of a small child or other person approaching a feeding dog. Moreover, the system can be easily designed to contain a spill of the entire contents of either or both of the food and water bowl(s).

To identify how much of the at least one wall 28 should be the low portion 30 versus the high portion 3a, 3b, 25, it is helpful to envision a "best fit" circle to the pet feeding system 10. With regard to the "best fit" circle, the low portion does not include the portions of wall between the low portion and the high portions that rise up from the low portion. Preferably, in relation to the "best fit" circle, the low portion of the pet feeding system 10 circumferentially occupies from about 85 degrees of the wall(s) to about 40 degrees of the wall(s). More preferably, the low portion of the pet feeding system 10 circumferentially occupies from about 80 degrees of the wall(s) to about 50 degrees of the wall(s). For example, if the shape of the pet feeding system 10 is a square, the low portion can be the majority of the front wall. As another example, in a circular embodiment of the invention, the low portion can be the majority of the front quadrant of the circle. In any embodiment, at least a portion of the front section comprises a high portion. In different embodiments, the portions of wall between the low portion and the high portions can be a 90 degree step or can be inclined (and such portions are also part of the "high portions" as used herein). Preferably, the portions of wall between the low portion and the high portions begin to rise from the low portion at no more than 85 degrees of the circumference of the "best fit" circle.

In a preferred embodiment, the high portions 3a, 3b, 25 are sufficiently high to contain substantially all of the spills and splashes when the feeding system 10 is in use. For example, when the pet is eating or drinking or in the event that the feeding system 10 is bumped or kicked, and food and/or water splashes out of the bowl(s), the food and/or water splashes up against the walls but is substantially prevented from splashing over the high portions 3a, 3b, 25 and out of the feeding system 10. As discussed above, the high portions 3a, 3b, 25 preferably have a height above the floor of about 50% to about 80% of the shoulder height or withers of the pets for which the system is adapted for use, thus providing a close proximity between the high portions 3a, 3b, 25 of the pet feeding system 10 and the head and shoulders of the pet while the pet is feeding. Because the high portions 3a, 3b, 25 are relatively close to a pet's shoulders, the high portions 3a, 3b, 25 are sufficiently high to contain food and/or water that is dropped from a pet's mouth while the pet is standing over the feeding system 10.

In a preferred embodiment, the top of the low portion 30 is above the top edge(s) of the bowl(s), most preferably at least about one-quarter inch above the top edge(s) of the bowl(s). The low portion 30 is preferably high enough above the bowl(s) so that when the feeding system 10 is bumped or kicked, spilled food and/or water is substantially prevented from splashing over the low portion 30 and out of the feeding system 10. A number of factors aid in allowing the low portion 30 to prevent or minimize food and/or water from escaping the containment area, even though the low portion 30 is lower than the high portions 3a, 3b, 25. These factors include: (1) the fact that the bowl(s) may be disposed much closer to the rear and side walls than to the low portion 30 of the front wall such that food or water spilled or splashed from the bowl(s) would have to travel further to escape over the low portion 30 of the front wall than over the high side or rear walls; (2) when a pet is drinking while positioned over the low portion 30 of the front wall, the majority of the splashes tend to occur in the rearward direction; (3) if the system 10 is positioned with its rear wall against a wall or cabinet, kicks or bumps will not come from the direction of the rear wall which would cause a higher splash over the front wall; and (4) as shown in the embodiment of FIGS. 1-8, for example, the trough 46 is configured to provide a greater height difference between the surface 26 and the low portion 30 of the front wall than the difference in height between the low portion 30 and the top edge(s) of the bowl(s). Furthermore, it is contemplated that when a pet stands in front of the low portion 30, other animals may be blocked or discouraged from accessing the contained feeding area 21, thus providing the pet with a sense of protection and control over its food and water. In a preferred embodiment, a perforated collection region 24 is also lower than the top edge of the bowl, with a sloped surface 26 extending downward from the bowl region 22 toward the collection region 24. The height of the low portion 30 relative to the collection region 24 further prevents food and/or water that falls into the collection region 24 from splashing over the low portion 30 and out of the feeding system 10.

Figure 18:
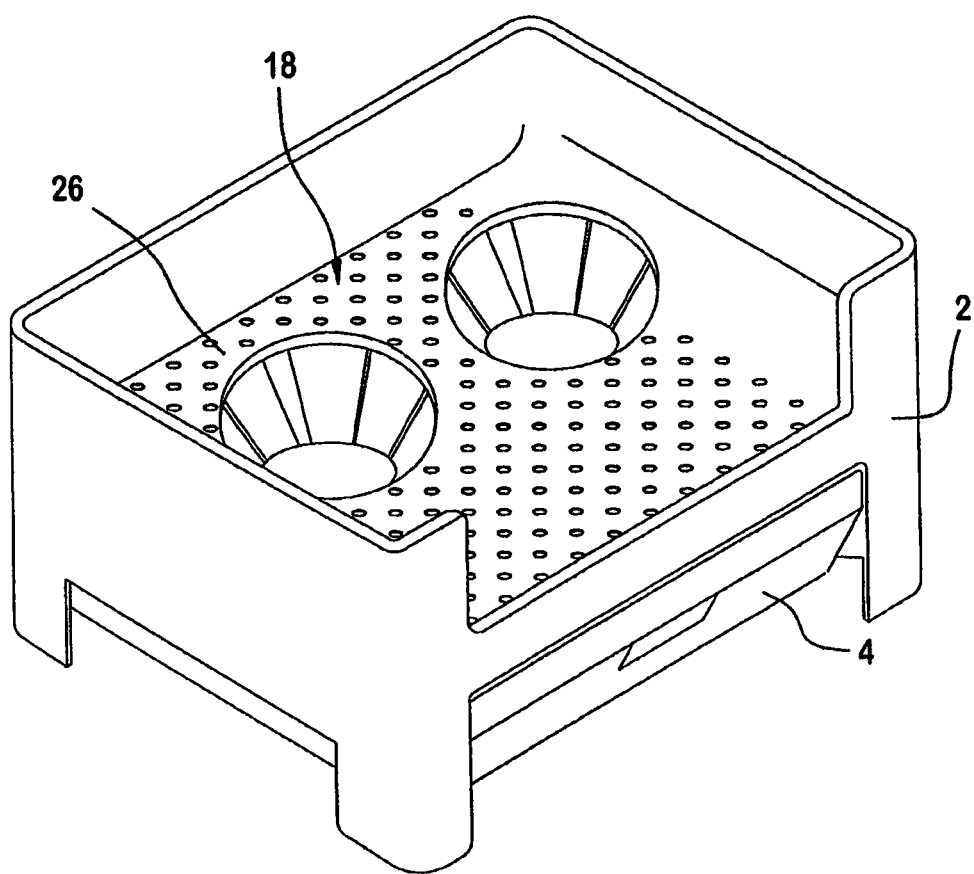
FIG. 18 illustrates a perspective view of an embodiment of the present invention in which the means for filtering extend throughout substantially the entire base of the first reservoir and the second reservoir comprises a drawer that is slideably movable relative to the first reservoir.

In the embodiment of the feeding system 10 shown in FIG. 8, the second reservoir 4 comprises at least one wall 46 and a second reservoir base 44. Spilled water that passes through the filter holes 38 of the first reservoir 2 lands in the second reservoir 4, and is substantially contained by the second reservoir base 44 and at least one wall 46. Systems in accordance with the present invention can have a number of different configurations for the second reservoir. Any type of catch basin or containment means can be used to receive liquid from the first reservoir. For example, the second reservoir may have a base without any walls, such as a tray or mat. In another alternative embodiment, as shown in FIG. 18, the second reservoir comprises a drawer that is slideably movable relative to the first reservoir. Thus, a user can access spilled water that has fallen into the second reservoir by sliding the drawer out from underneath the first reservoir.

Figure 20:
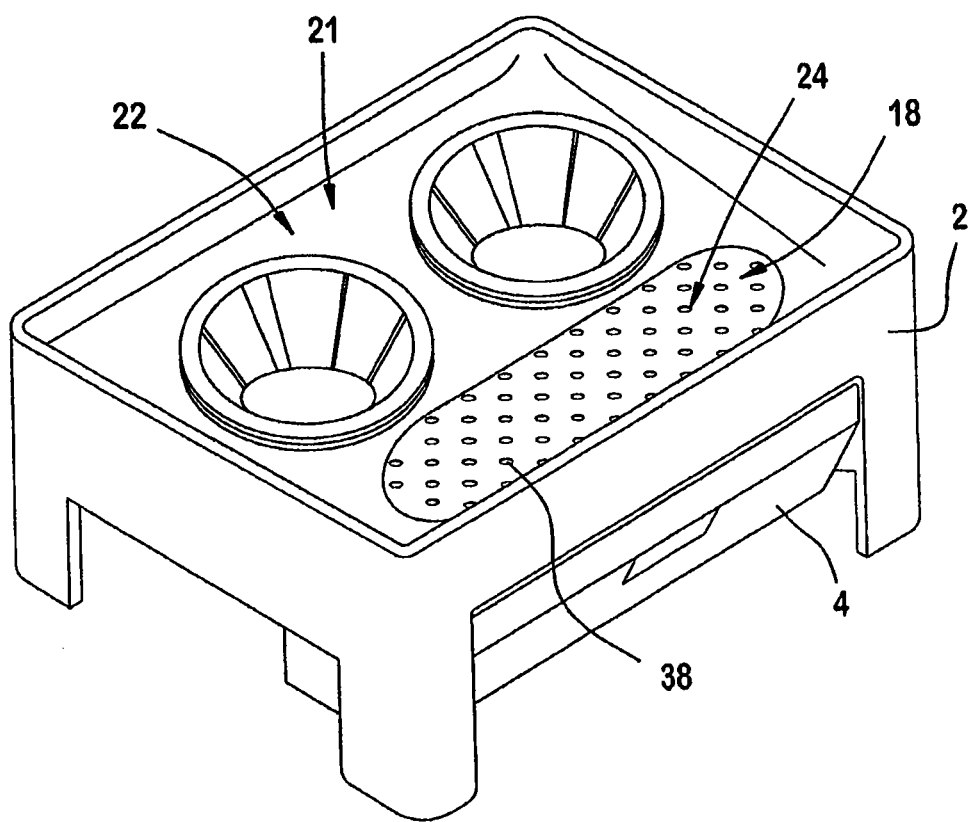
FIG. 20 illustrates a perspective view of an embodiment of the present invention in which the second reservoir comprises a drawer that is slideably movable relative to the first reservoir and is disposed underneath the means for filtering.

In the embodiment shown in FIG. 8, the tops of the wall(s) of the second reservoir 4 are sloped at an angle from back to front substantially the same as that of the sloped surface 26 of the first reservoir 2. As illustrated in FIG. 20, in an alternative embodiment, the second reservoir 4 is disposed substantially entirely underneath the portion of the first reservoir 2 having means for filtering spilled food from spilled water (e.g. underneath the filter holes 38 of the perforated collection region 24), without being disposed underneath the remaining portion of the first reservoir 2 (e.g. underneath the bowl region 22). The second reservoir may include a base that rests on the floor, or a base that is suspended above the floor, as shown, for example, in FIG. 20.

Embodiments of the invention may include one or more bowl receptacles, which may take the form of an area on sloped surface 26, a depression formed in the sloped surface, an aperture through base 60, or other means for supporting a bowl. Alternatively, the bowl receptacle may itself be a bowl that is integrally formed with the base. In the embodiment shown in FIG. 8, the sloped surface 26 of the bowl region 22 has bowl receptacles in the form of openings 40, 42 adapted to receive a food bowl 14 and a water bowl 15, respectively. The openings 40, 42 are surrounded by peripheral walls 32, 33 extending upwardly from the sloped surface 26 for keeping the bowls 14, 15 level. The height of each of the peripheral walls 32, 33 from the sloped surface 26 increases inversely proportional to the downward slope of the sloped surface 26 so that the tops of the bowls 14, 15 remain substantially parallel to the surface on which pet feeding system 10 rests. In other words, each bowl 14, 15 has a radially outwardly extending rim at its top, which rests on the top edge of the peripheral walls 32, 33, and the height of the peripheral walls as measured from the surface 26 varies around its circumference to allow for the bowls to rest substantially parallel to the surface on which pet feeding system 10 rests. This keeps the bowls level and permits a user to more easily place bowls in and remove bowls from the openings. Preferably, each of the peripheral walls 32, 33 defines a space 35, 37 for a user's finger(s) or thumb so that each bowl 14, 15 can be grasped more easily. Preferably, the height of the walls 32, 33 are sized to permit the bottom of the bowls 14, 15 to be below the plane of the sloped surface 26. The peripheral walls 32, 33 also prevent food which has spilled onto the surface 26 from also falling into the openings 40, 42 when the bowls are removed.

As illustrated in FIG. 8, the first reservoir 2 has a support portion 34. Support portion 34 fits snugly into the top opening of second reservoir 4 when first reservoir 2 is stacked on top of second reservoir 4, maintaining a stable assembly. The support portion 34 preferably extends downwardly from the bowl region 22 substantially enough and in a configuration that allows the first reservoir 2 to rest substantially level when placed on a flat surface and to ensure that the tops of the bowls 14, 15 remain substantially level when a user sets the first reservoir 2 down on a floor or surface with the bowls still resting in the openings 40, 42, so that their contents are prevented from spilling out. This feature is beneficial when the user needs to remove the first reservoir 2 from the second reservoir 4, to empty spilled water from the second reservoir, and needs to set the first reservoir on a nearby surface, with the bowls still confined in openings 40, 42. This prevents the bowls from being dislodged from the base and spilling their contents when the first reservoir 2 is placed on the floor.

In alternative embodiments of the present invention, elevating means increase the height(s) of the contained feeding area, bowl region, and/or feeding bowls 14, 15 relative to the floor. For example, in the embodiment shown in FIG. 8, the feeding system 10 has leg extensions 6 coupled to the bottom of the second reservoir 4, which increase the heights of the first reservoir 2 and second reservoir 4 relative to the floor. The leg extensions 6 may be removable from the housing 8 or permanently attached to the housing 8.

Preferred feeding systems in accordance with the invention not only collect spilled water, but rapidly remove that water out of the contained feeding area and direct it to a desired collection area. Rapid removal of spilled water minimizes the potential for spilled food to come in contact with spilled water, and reduces the time that spilled food stays in contact with spilled water when the food does come in contact with spilled water. In feeding system 10, base 60 is sloped uniformly toward the trap to convey spilled water away from the bowls. The chosen slope preferably is steep enough to move spilled water quickly upon contact with the base, not allowing any significant amount of standing water to accumulate, but not so steep that spilled food rolls or slides down the slope into the trap. This balance is preferable to maximize the separation of spilled water from spilled food. Much of the spilled food stays in the bowl area where the pet can easily see it and consume it. If food does roll or slide down base 60 and into trap 17, the trap will capture the food, and the food will remain accessible to the pet, as noted above.

As noted above, sloped surface 26 may have an angle of inclination identical to that shown by indication line 19 in FIG. 4. For purposes of description, it is assumed that sloped surface 26 has an inclination as indicated by line 19. As such, sloped surface 26 and base 60 have an angle of incline marked by angle "S" in FIG. 4. Angle S, which is measured relative to a horizontal plane parallel to plane P, is preferably between about 2 degrees and about 20 degrees, more preferably between about 4 degrees and about 16 degrees, and most preferably between about 5 degrees and 10 degrees. Slopes less than about 2 degrees may be suitable but may not convey spilled liquid away from the bowl area as rapidly as steeper slopes. Slopes greater than about 20 degrees may also be suitable, but may increase the likelihood of spilled food rolling down sloped surface 26 into trap 17, as compared to shallower slopes.

Water that travels down an inclined surface can travel either by "sheet flow" or "channel flow", depending on one or more conditions. In sheet flow, which is generally associated with flatter surfaces having little or no slope, the water spreads out laterally over the surface and into a thin continuous layer. As the layer of water is conveyed down the slope, the water tends to migrate in a direction transverse to the direction of the incline, resulting in a widely dispersed layer of water that moves relatively slowly. In channel flow, water travels in a more concentrated manner. Instead of dispersing laterally over the surface, the water remains fairly concentrated as a stream, moving the water more directly down the incline. Because water velocity is significantly higher in channel flow than sheet flow, channel flow is the more preferred method of conveying spilled water in feeding systems of the present invention.

Feeding systems in accordance with the invention preferably incorporate a number of hydraulic enhancements to promote channel flow and rapidly remove spilled water from the food containment area and direct it to the desired containment area. In system 10, the slope of base 60 is one variable that promotes channel flow. A broad range of slopes, including the preferred ranges described above, provide channel flow between the bowl area and trap 17. Another feature that promotes channel flow are the physical boundaries that limit the extent to which spilled water can spread laterally on the base. Referring again to FIG. 2, system 10 includes three channels for rapidly conveying water to the trap by channel flow. Specifically, system 10 features a central channel 70 and two side channels 72 and 74. Central channel 70 is located between bowls 14 and 15. In particular, central channel 70 is bounded on each side by peripheral walls 32 and 33 that support bowls 14 and 15, respectively. Walls 32 and 33 limit the lateral extent to which spilled water can spread on base 60, forming a flume 71 that directs spilled water right to the trap. Flume 71 is hour-glass shaped and converges to a narrow constriction 71a where walls 32 and 33 are closest to one another. Side channel 72 is bounded on one side by peripheral wall 32 and bounded on the other side by the rear and side walls of first reservoir 2. Side channel 74 is bounded on one side by peripheral wall 33 and bounded on the other side by the rear and side walls of first reservoir 2. Side channels 72 and 74 are symmetrically arranged along the outer periphery of the base. In this arrangement, central channel 70 conveys any water spilled toward the center of surface 26, and side channels 72 and 74 convey any water spilled toward the sidewalls of first reservoir 2.

The surfaces around the bowls are designed with a geometry that helps spilled water droplets coalesce into larger and larger droplets. The mass of these droplets quickly succumb to gravity on sloped surface 26, forming rivulets and small streams that develop more and more velocity as they travel down the sloped surface. Channels 70, 72 and 74 form chutes that connect the bowl area in fluid communication with the trap 17. That is, channels 70, 72 and 74 each form a fluid conduit that extends downwardly along sloped base 60 and discharges into one or more sections of trough 46. Side channels 72 and 74 each include a Y-split 72a and 74a, respectively. The Y-splits 72a and 74a form inner branches 72b, 74b and outer branches 72c, 74c, as shown. Inner branches 72b and 74b channel the water inwardly toward the center of base 60 and convey water directly into trough 46 near peripheral walls 32 and 33. Outer branches 72c, 74c convey water around the outer periphery of base 60 and onto a ledge 17a that borders the trough. Depending on the volume of water spilled, the water that flows to the outer branches and onto the ledges may travel around to the front of the base. These channels and chutes, along with the sloped base 60 and the filter holes 38, collectively direct spilled water to the desired containment area.

Preferably, all edges and transitions along the channels 70, 72 and 74 and ledge 17a (e.g., transitions between base 60, peripheral walls 32 and 33, side walls and rear walls) are rounded, not squared or sharp. The cross sections of channels are preferably U-shaped or have rounded transitions between the sides and bottoms of the channels. Rounded transitions, as opposed to sharp transitions, promote laminar flow and minimize shear stresses between the spilled water and channel walls to rapidly move the water down the base with reduced effects of turbulence. The channels 70, 72 and 74 and ledge 17a not only separate the water from solid food in a rapid manner, but provide a self-cleaning feature. The slope of the base, combined with the channel and ledge profiles, cause spilled water to achieve high velocities, creating scouring action along the base that removes dusts, films and other residues that may accumulate on the surface of the base. This is in direct contrast to systems with flat or wide open spaces that simply receive water without conveying it away from the spill area.

To the extent that both food and water enter the trap and contact one another, the water will have little time to be absorbed by the food. The water's velocity is relatively high due to the sloped base and geometries of the channels and ledge. In addition, water that enters the trap is drained almost instantly. The filtering means preferably provides a drying rack to remove any moisture that does contact the food. For example, the openings in filtering means 18 allow air to circulate underneath the trapped food and dry the food. The dried food can then be recovered from the trap for reuse, or remain in the trap for later consumption by the pet.

Figure 9:
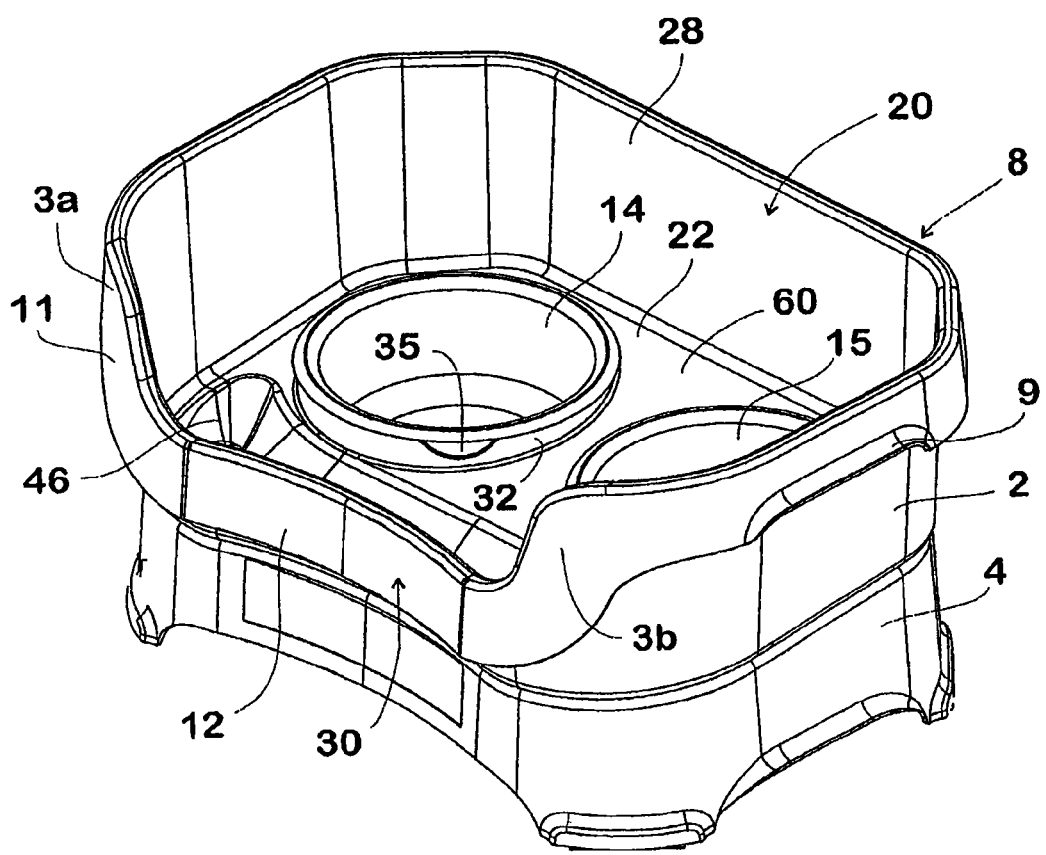
FIG. 9 illustrates a perspective view of an embodiment of the present invention without leg extensions.
Figure 10:
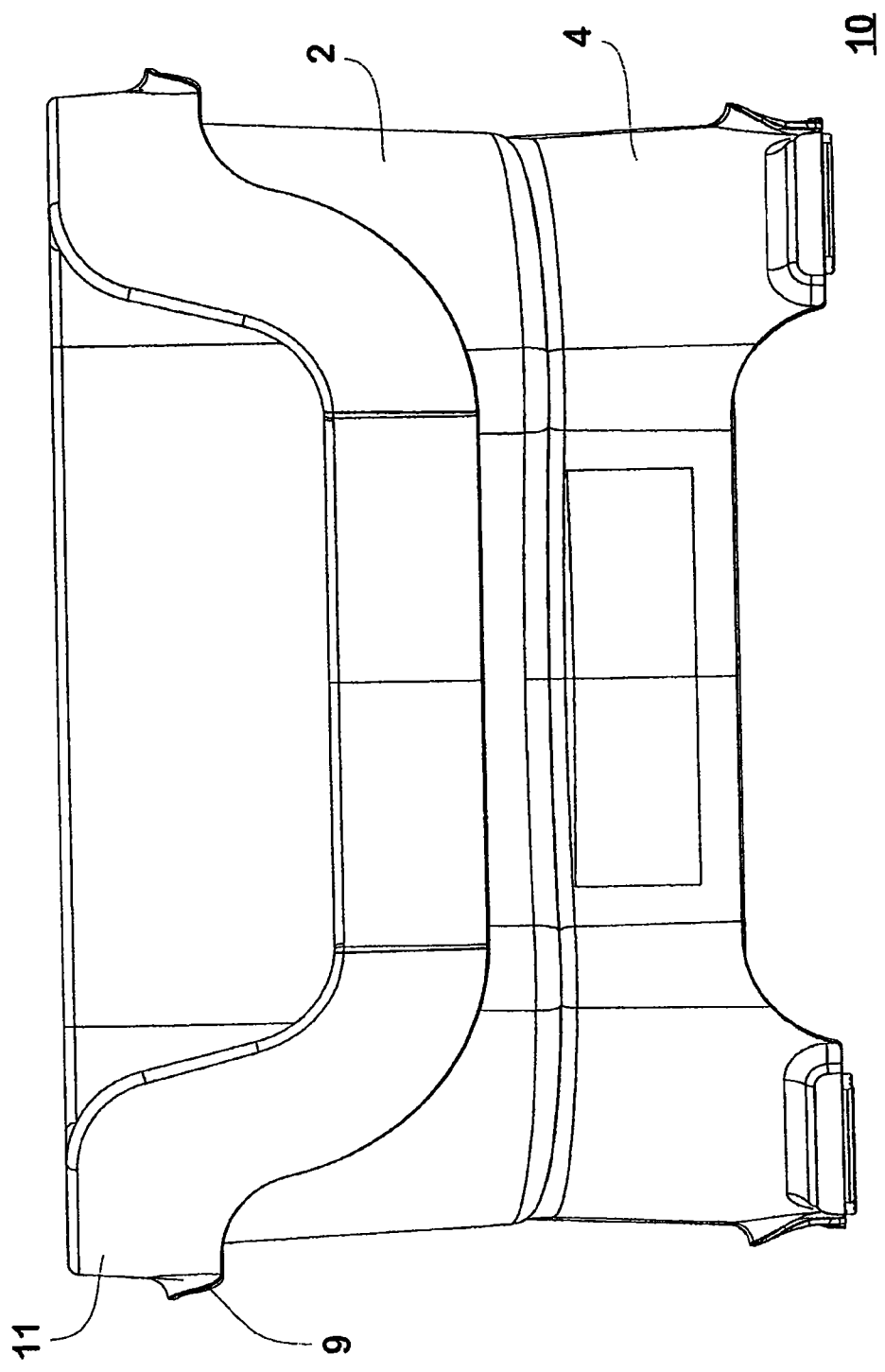
FIG. 10 illustrates a front view of the embodiment of the present invention shown in FIG. 9.
Figure 11:
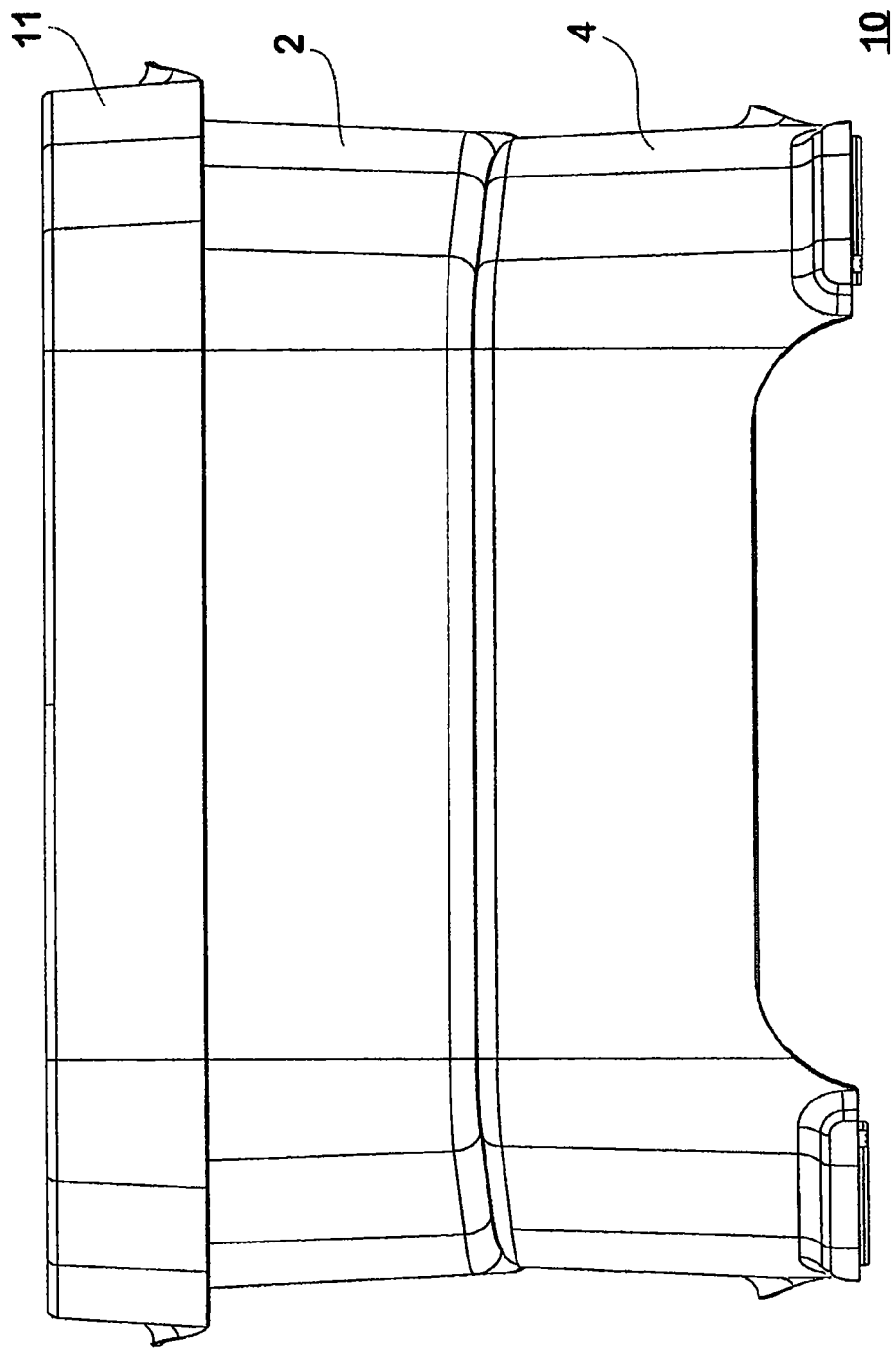
FIG. 11 illustrates a back view of the embodiment of the present invention shown in FIG. 9.
Figure 12:
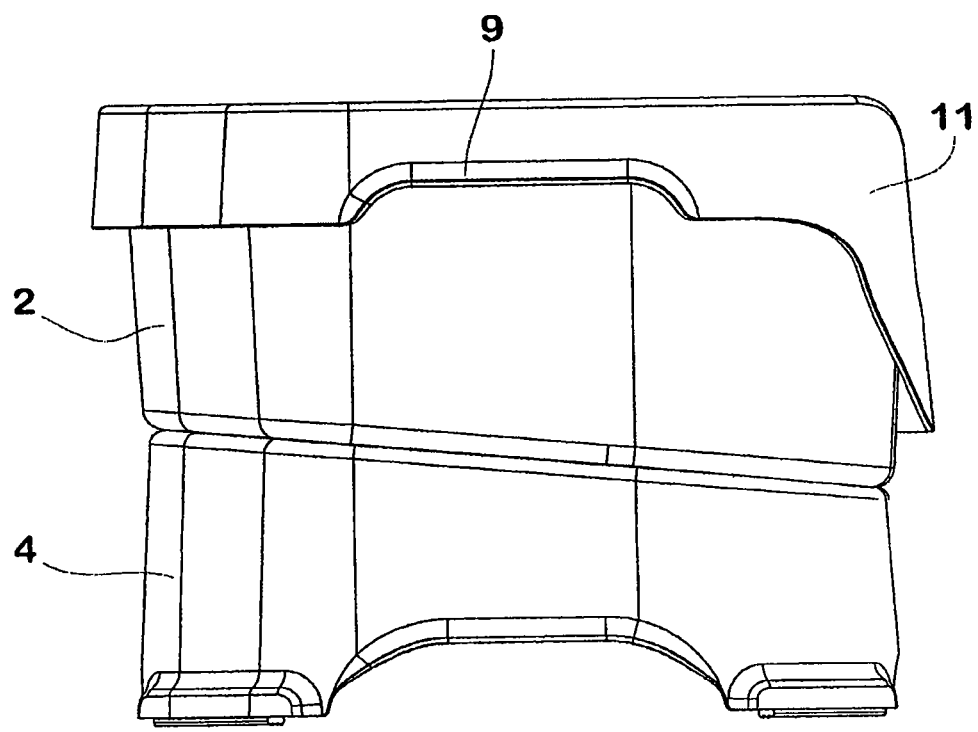
FIG. 12 illustrates a side view of the embodiment of the present invention shown in FIG. 9, viewed from the left side of FIG. 10.
Figure 13:
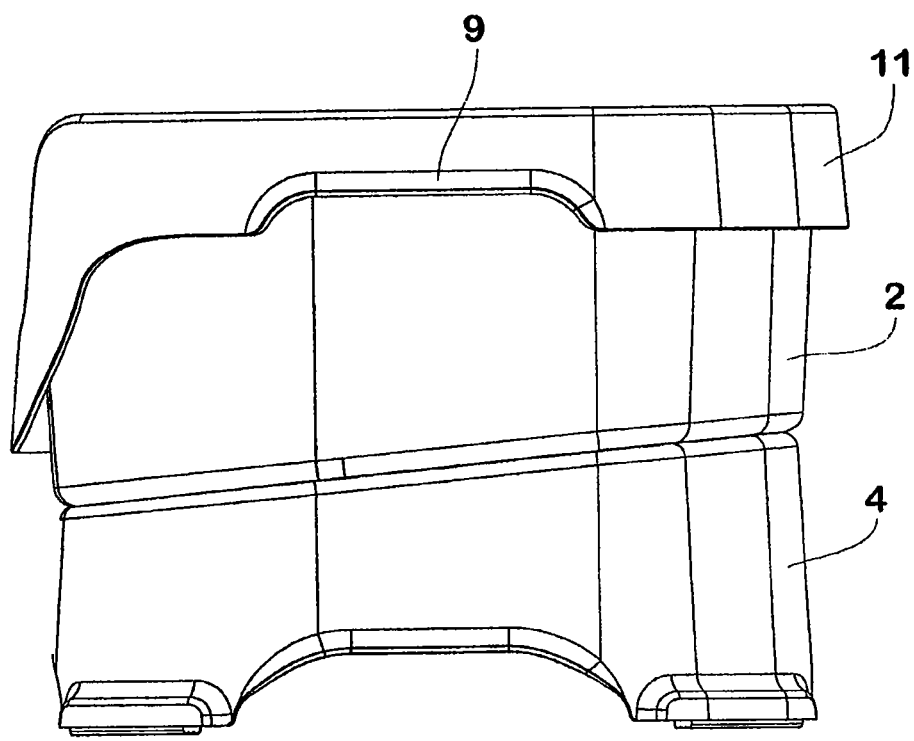
FIG. 13 illustrates a side view of the embodiment of the present invention shown in FIG. 9, viewed from the right side of FIG. 10.
Figure 14:
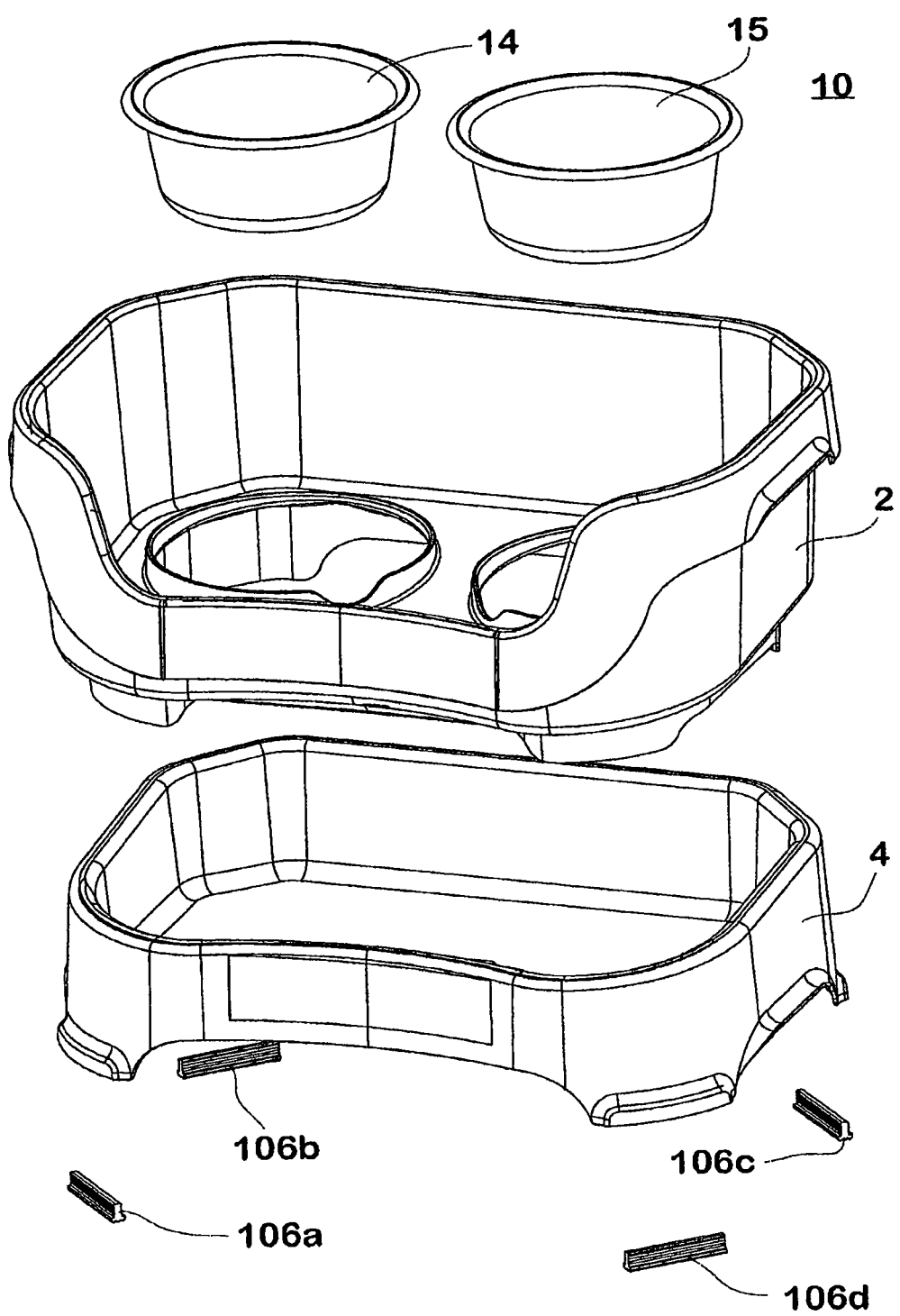
FIG. 14 illustrates a top exploded view of the embodiment of the present invention shown in FIG. 9.
Figure 15:
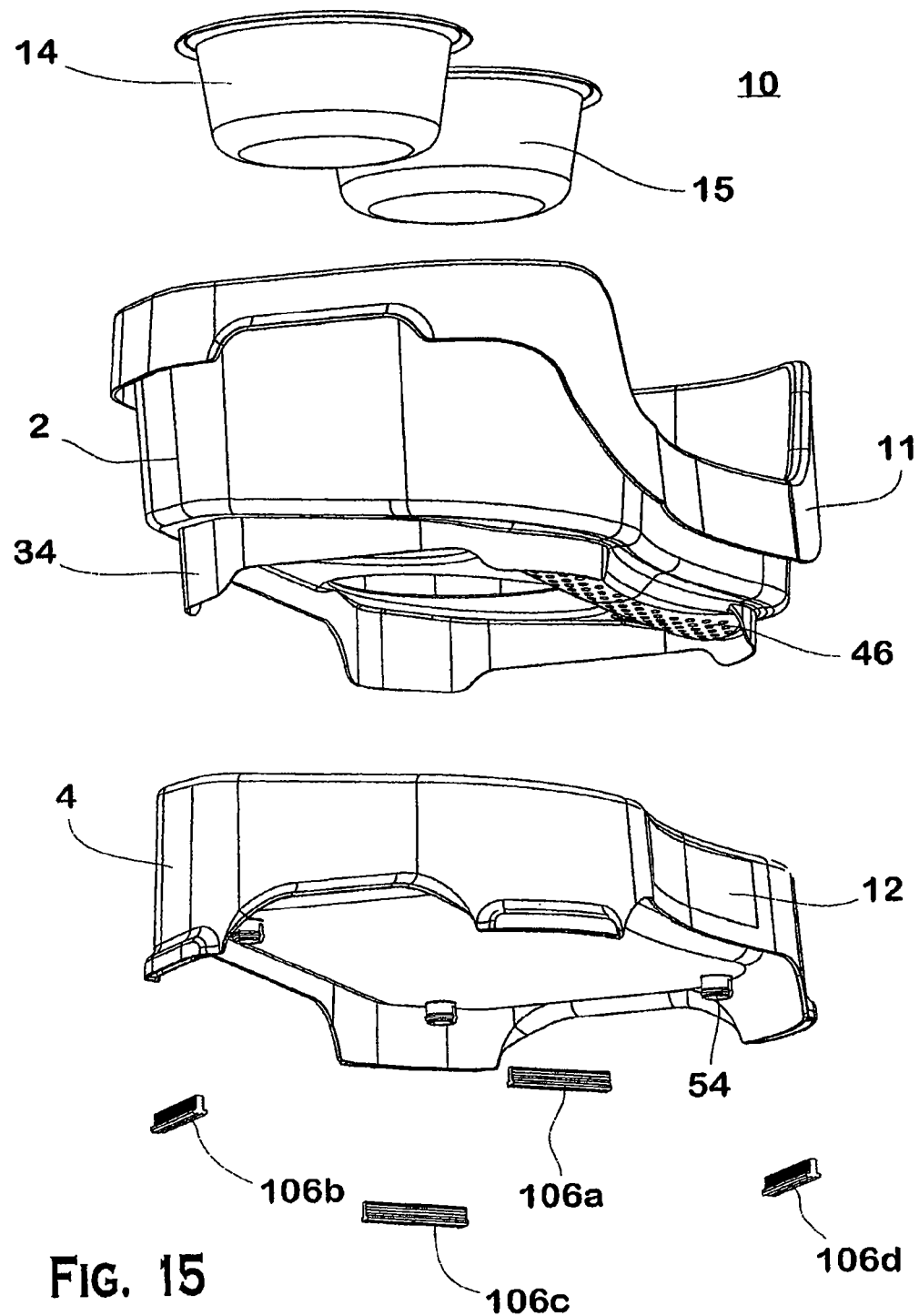
FIG. 15 illustrates a bottom exploded view of the embodiment of the present invention shown in FIG. 9.

FIGS. 10-15 illustrate various views of the embodiment shown in FIG. 9, which is substantially similar to the embodiment shown in FIG. 1, except that it does not include leg extensions 6. As shown in FIGS. 14 and 15, non-skid feet 106a-106d are adapted to fit into the bottom of second reservoir 4. Although a frictional fit for placing non-skid feet 106a-106d into second reservoir 4 is shown, other ways to affix the non-skid feet to the second reservoir can be easily accomplished. Non-skid feet, such as pads 106a-106d, can be any known and suitable material, such as a rubber.

Figure 21:
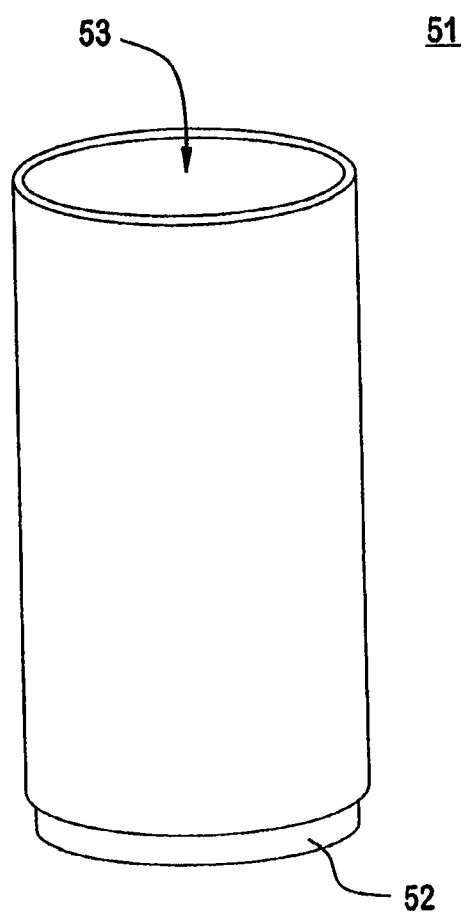
FIG. 21 illustrates a perspective view of an embodiment of a post leg used to enhance the pest deterrent characteristics of the present invention.

FIG. 21 illustrates a front view of an embodiment of a post leg 51 of the present invention. The post legs 51 are coupled to the bottom of the base 60 and raise the feeding system 10 off the ground (preferably by about ½ inch to ¾ inch). This deters ants or other insects from climbing the walls of the feeding system 10, because the walls do not come into contact with the ground when the post legs 51 are attached. A post leg 51 preferably comprises a non-skid foot 52 to help prevent the feeding system 10 from sliding and creating scuff marks or abrasions on the owner's floor, and an opening 53 which attach to posts 54 located on the underside of the feeding system 10 (e.g., underneath the second reservoir 4, as shown in FIG. 15). FIG. 22 illustrates three front views of three embodiments of the present invention, each having post legs 51.

Figure 24:
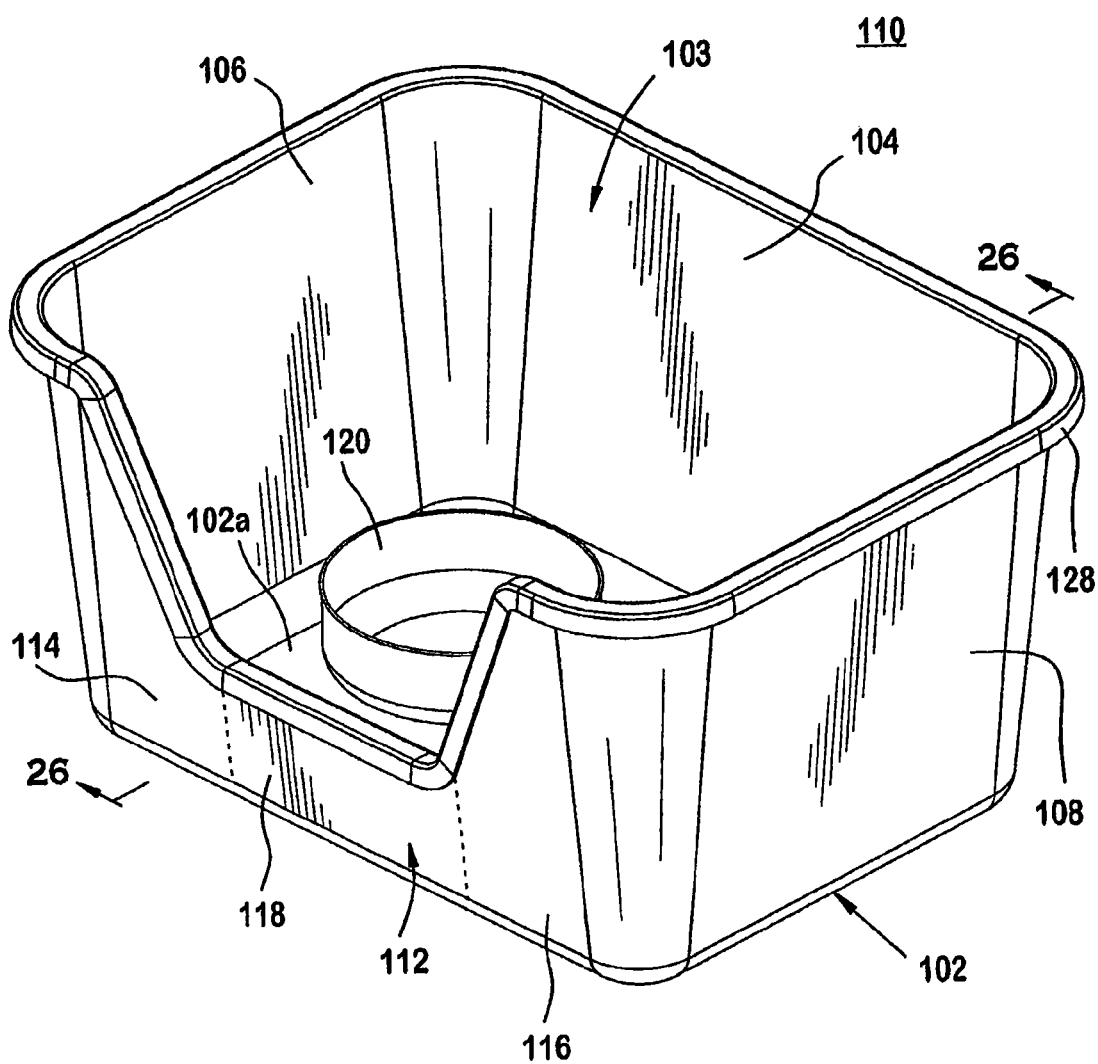
FIG. 24 illustrates a perspective view of another embodiment of the housing of the present invention.

Alternative embodiments of the housing 8 of the present invention may additionally include handles 9 and/or a collar 11, as shown, for example, in FIGS. 1 and 4. In a preferred embodiment, handles 9 are located on both the first reservoir 2 and the second reservoir 4. The collar 11 deters pests from entering the contained feeding area 21 of the feeding system 10, and provides an additional handle for the owner, and its exaggerated size adds to the overall aesthetic appearance of the pet feeding system 10. As shown in FIG. 24, a rolled edge 128 may also be used to deter pests from entering the contained feeding area 103, and also provides a handle for the owner. Also, alternative embodiments include non-skid protective pads 48, as shown in FIG. 8, which may prevent the feeding system 10 from sliding or creating scuff marks or abrasions on the owner's floor. The protective pads 48 can be shaped to fit either the bottom of the second reservoir 4 or the bottoms of the leg extensions 6.

Figure 23:
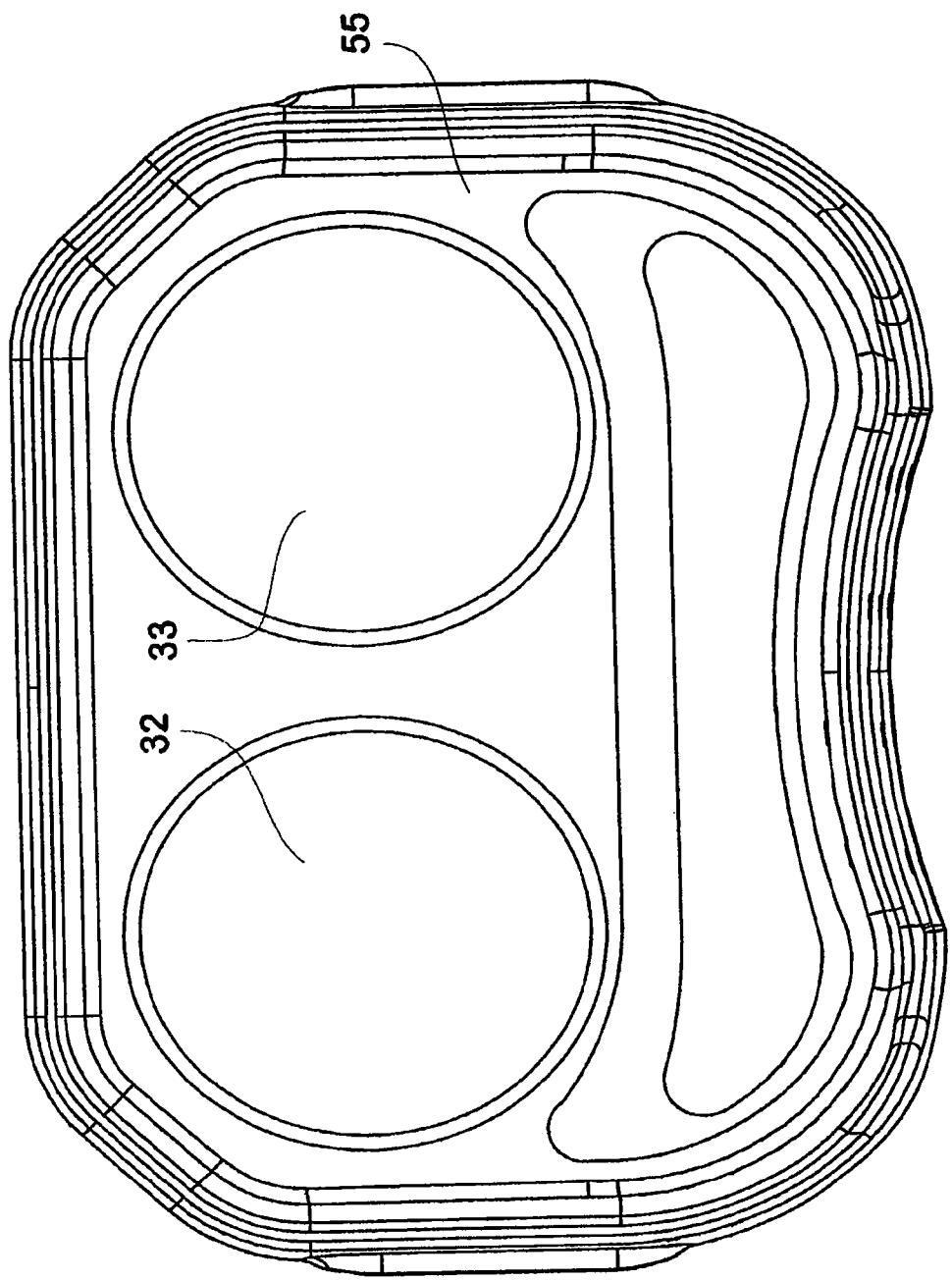
FIG. 23 illustrates a top plan view of an embodiment of the present invention having a filtering membrane.

FIG. 23 illustrates a top plan view of an embodiment of the present invention having a filtering membrane 55 on the surface 26. The filtering membrane 55 is water-permeable, thus allowing spilled water to seep through to the perforated collection region 24 and ultimately to the second reservoir 4 for collection while capturing spilled food and preventing the spilled food from touching the surface 26 of the feeding system 10. The filtering membrane 55 is preferably removable and conforms to the surface 26 of the feeding system 10. For example, as shown in FIG. 23, the filtering membrane 55 fits around the peripheral walls 32, 33 of the bowl openings 40, 42. The filtering membrane 55 enables an owner to clean messes off the feeding system 10 by simply removing the filtering membrane 55 and disposing of it, or by removing the filtering membrane 55 and cleaning it prior to placing it back into the feeding system 10. This permits a user to avoid the more cumbersome task of cleaning the surface 26 of the system 10. The filtering membrane 55 may or may not have adhesive for helping to adhere it to the feeding system 10. Filtering membrane 55 can be in the form of a liner as shown in the embodiment of FIG. 23. Alternatively, the filtering membrane may be a solid material serving as the sole means for filtering.

Other embodiments of the pet feeding system 10 may include a divider (not shown) between the food and water bowls. The divider is a separating wall that helps to prevent water and food from spilling or splashing into the other bowl. Additional embodiments may also include a strainer (not shown) disposed within the water bowl. The strainer permits a user to remove any spilled food that has fallen into the water bowl by lifting the strainer out of the water bowl and removing the spilled food from the strainer, rather than emptying and replacing all of the water in the water bowl. A deep water bowl (not shown) that is deeper than the food bowl is also contemplated in alternative embodiments. This feature helps to decrease the number of times that a user must re-fill the water bowl, especially if a pet tends to consume a great deal more water than food.

Figure 39:
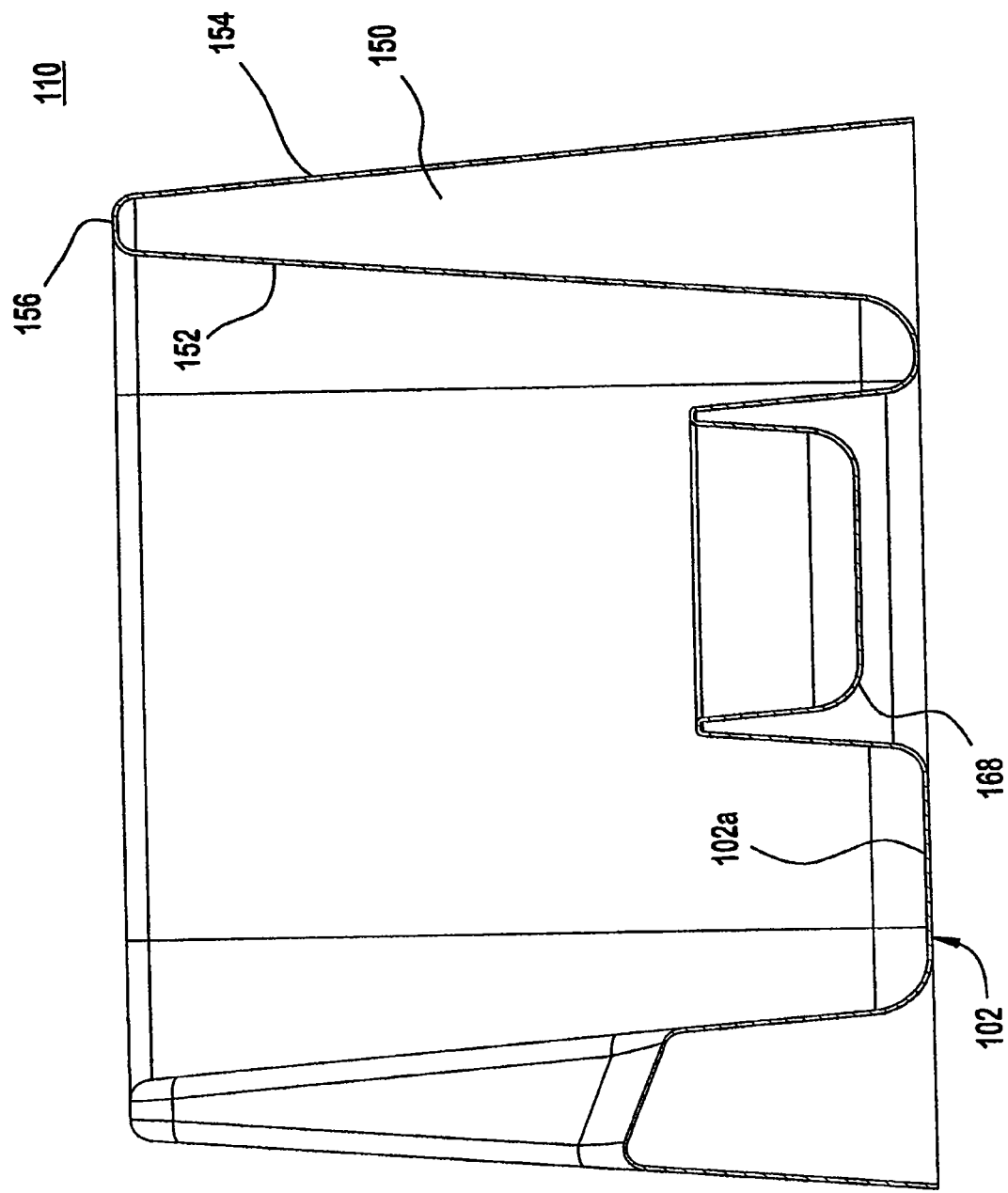
FIG. 39 illustrates a cross-sectional view of a monolithic embodiment of the housing of the present invention having a double wall and a base defining at least one mold.
Figure 40:
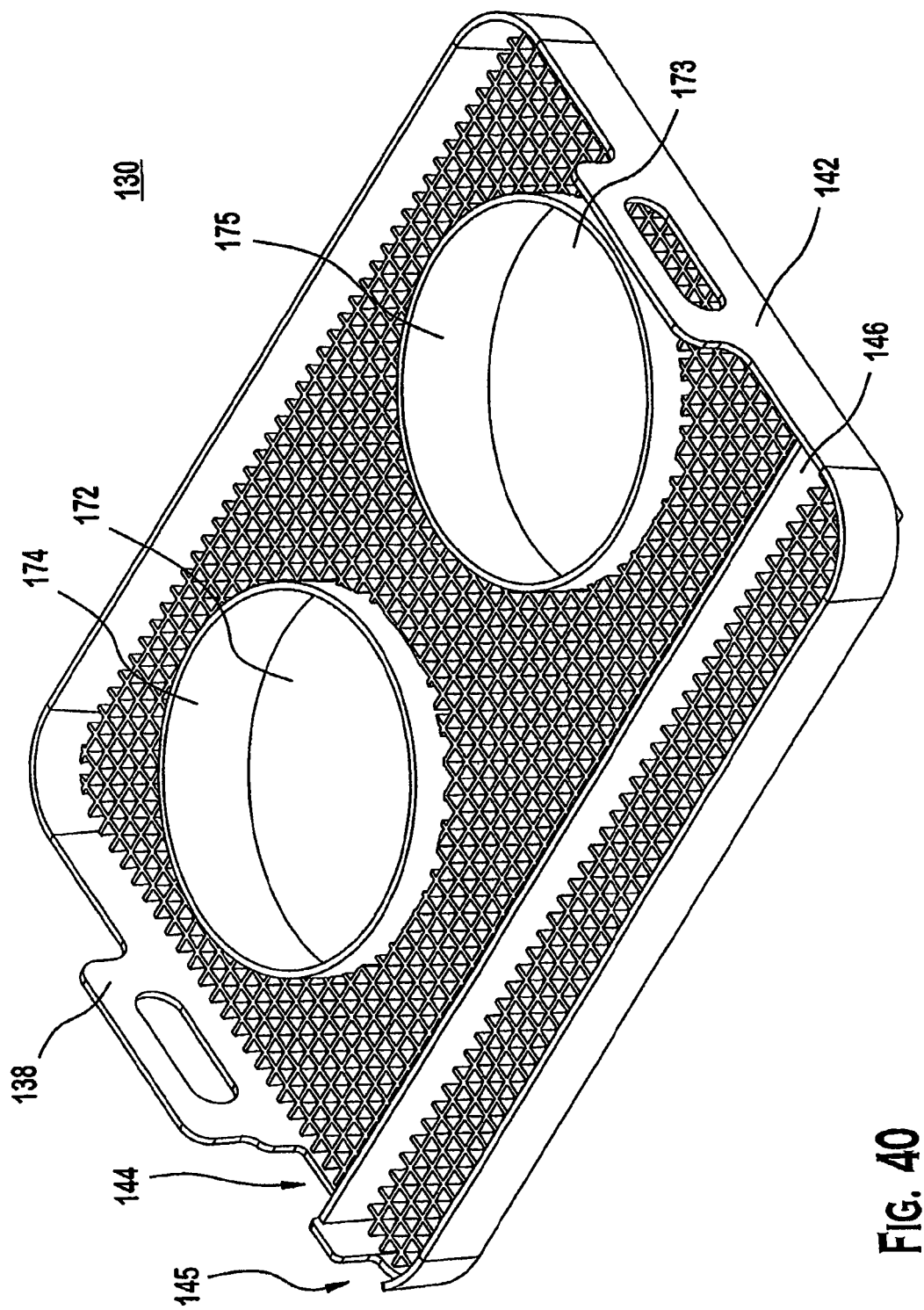
FIG. 40 illustrates a perspective view of an embodiment of the filtering tray having openings to fit around molds, such as the mold shown in FIG. 39.

As illustrated in FIGS. 24-48, alternative embodiments of the pet feeding system 110 have a housing which comprises a base 102 and at least one wall 108 having a front section 112 and a remaining section and extending upwardly from the base. The front section 112 comprises a low portion 118 and at least one high portion 116 and the remaining section comprises a high portion. In FIGS. 24-48, the means for filtering comprise a filtering tray 130 disposed above the base 102 and abutting the at least one wall. The filtering tray 130 defines interstitial spaces 132 and is adapted to have at least one bowl resting on or abutting it or extending through the openings in the tray as shown in FIG. 40. The interstitial spaces 132 are sufficiently small such that the spilled food remains on top of the filtering tray 130 but the spilled water passes through the interstitial spaces 132 onto the base 102, thereby allowing for separation of spilled food from spilled water. The filtering tray 130 is preferably removable.

Figure 27:
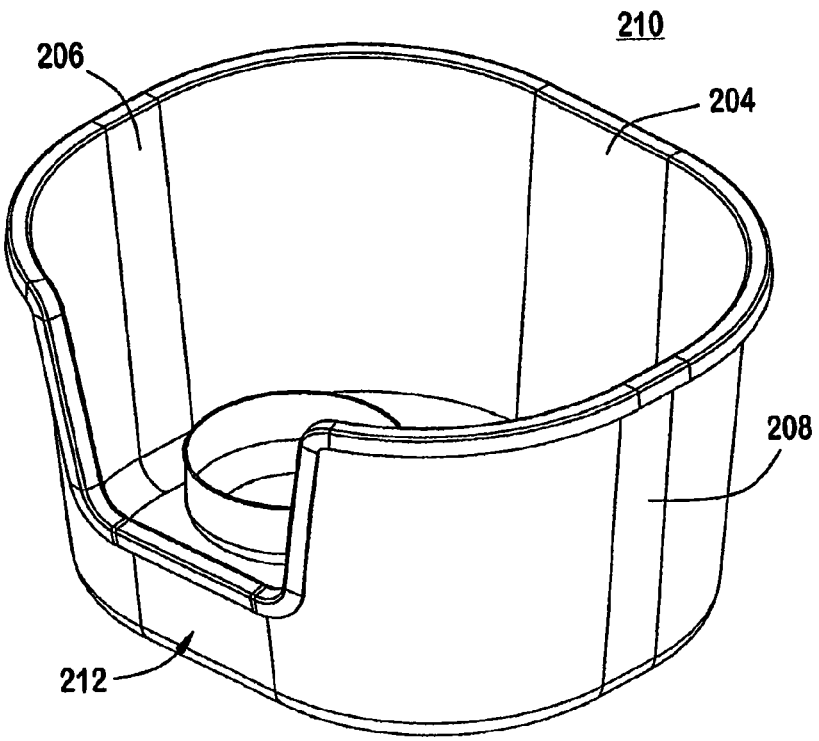
FIG. 27 illustrates a perspective view of an embodiment of the housing of the present invention having the shape of a modified oval.
Figure 28:
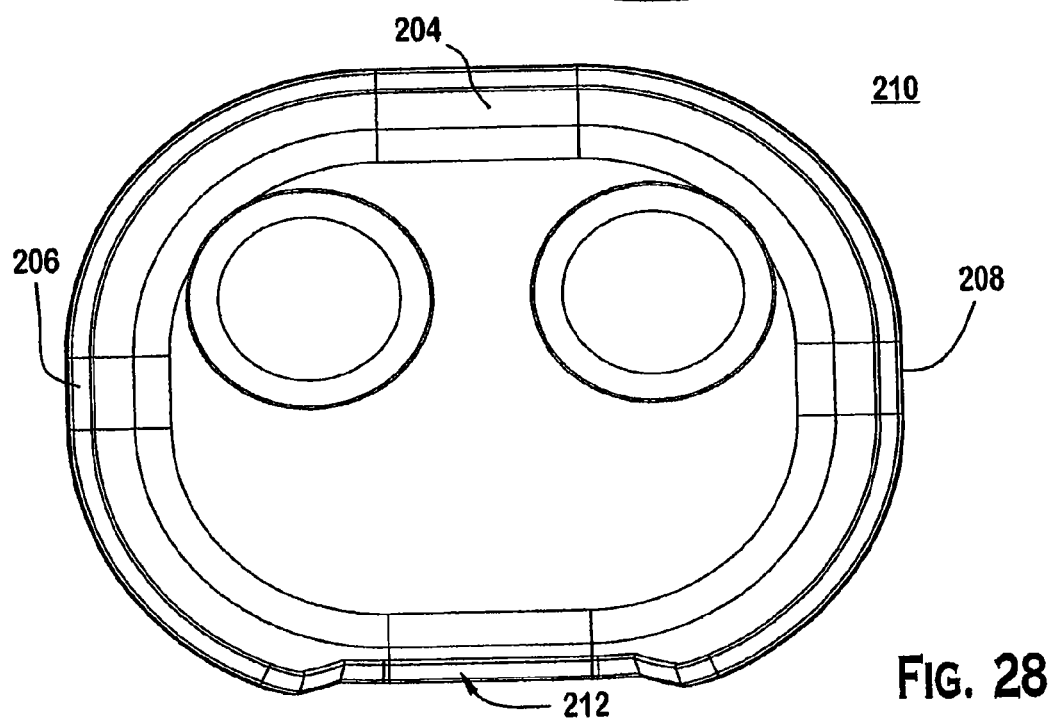
FIG. 28 illustrates a top plan view of the embodiment of the housing of the present invention shown in FIG. 27 having the shape of a modified oval.
Figure 29:
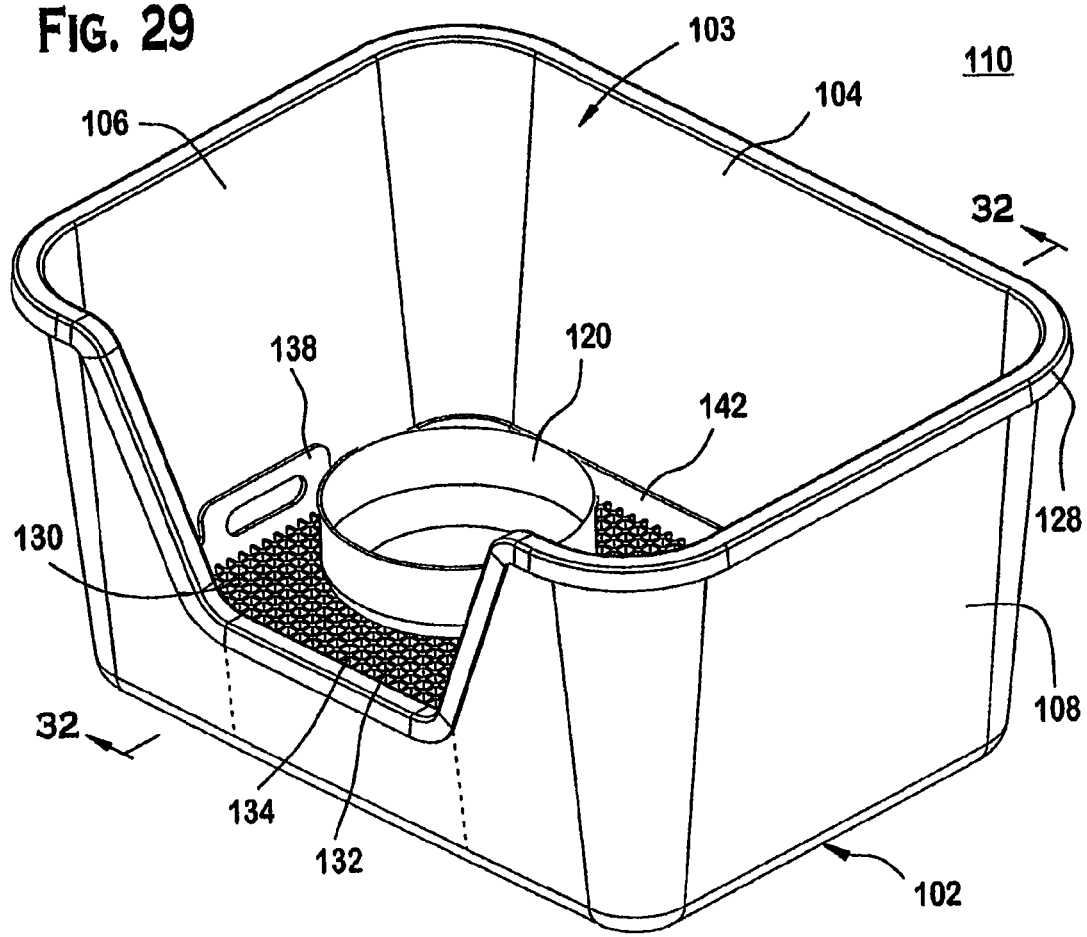
FIG. 29 illustrates a perspective view of an embodiment of the present invention having a filtering tray.
Figure 30:
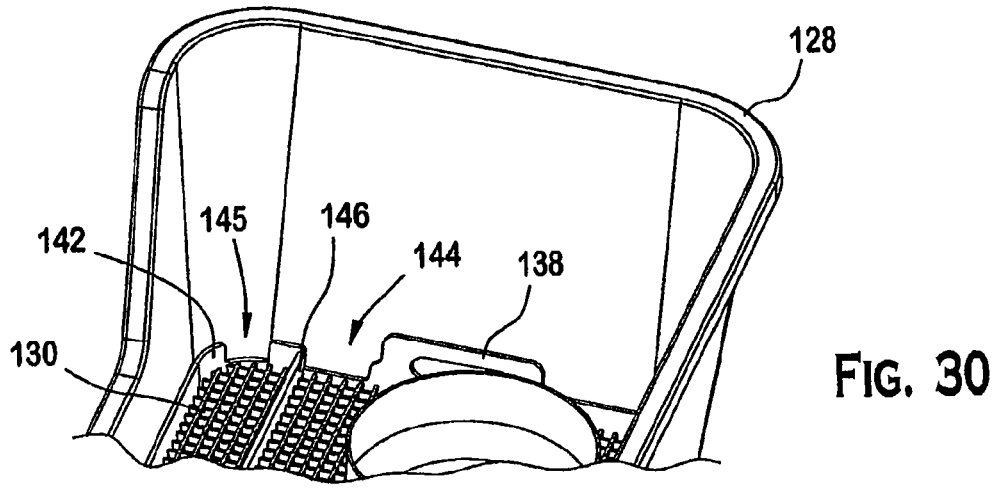
FIG. 30 illustrates a rotated perspective view of the present invention shown in FIG. 29 having a filtering tray.

FIGS. 27 and 28 show an alternative shape of an embodiment of the invention, in which the corners of the pet feeding system 210 are substantially curved, forming, in effect, a flattened oval. The at least one wall comprises a rear section 204, two side sections comprising a first side section 206 and a second side section 208, and a front region 212, all of which are substantially flat. The curved corners may permit the pet feeding system 210 to take up less floor space, and to require less material to fabricate, than a substantially rectangular embodiment. The flat sections allow the pet feeding system 210 to be more flush with any surrounding walls, as opposed to a true oval or circle. It is also contemplated that a system 210 in the shape of a modified oval is less cumbersome to clean than a substantially rectangular embodiment, and may be considered more aesthetically pleasing.

Figure 41:
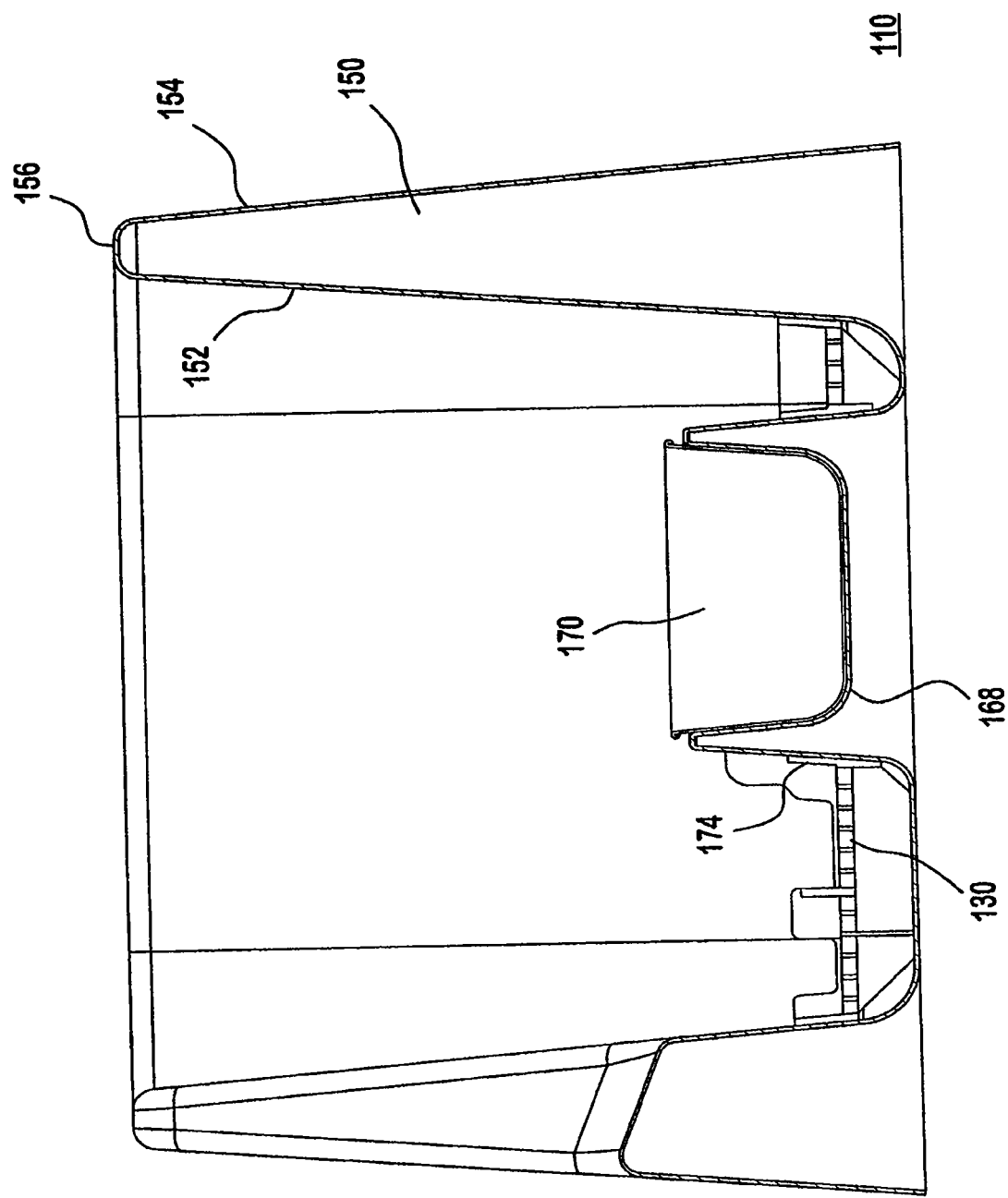
FIG. 41 illustrates a cross-sectional view of a monolithic embodiment of the present invention having a base defining at least one mold and a filtering tray.
Figure 46:
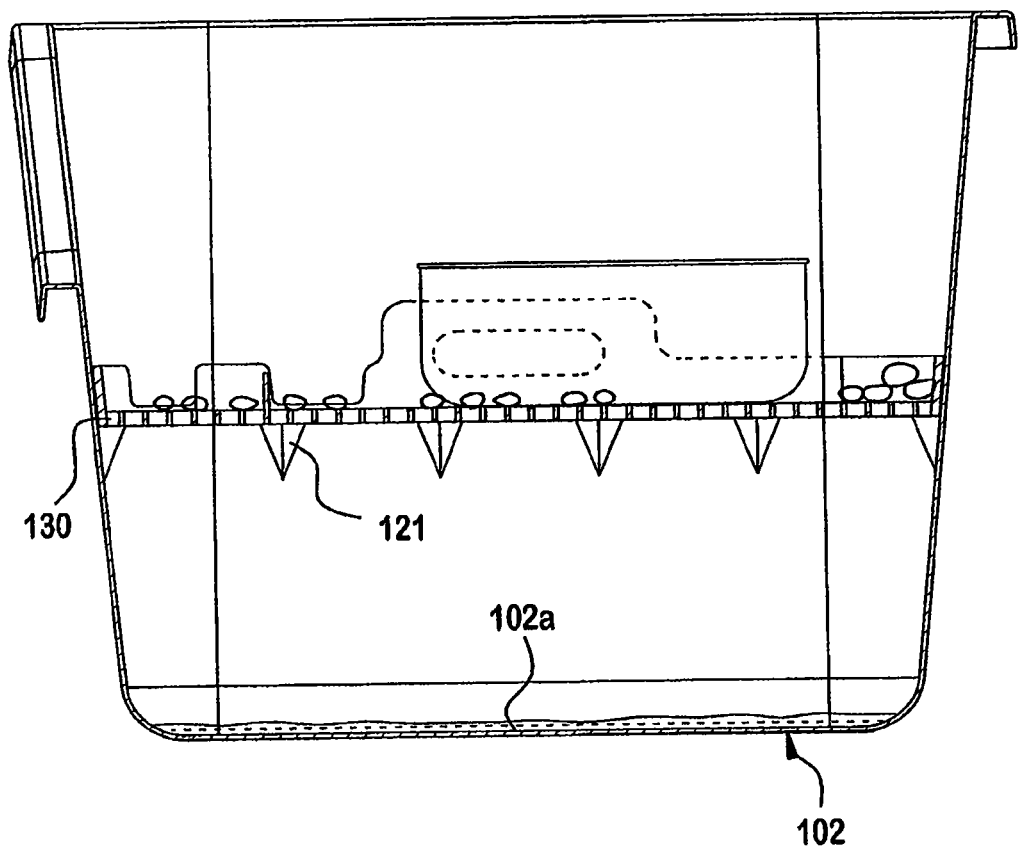
FIG. 46 illustrates a cross-sectional view of an embodiment of the present invention having protruding mounts as means to elevate feeding bowls.
Figure 47:
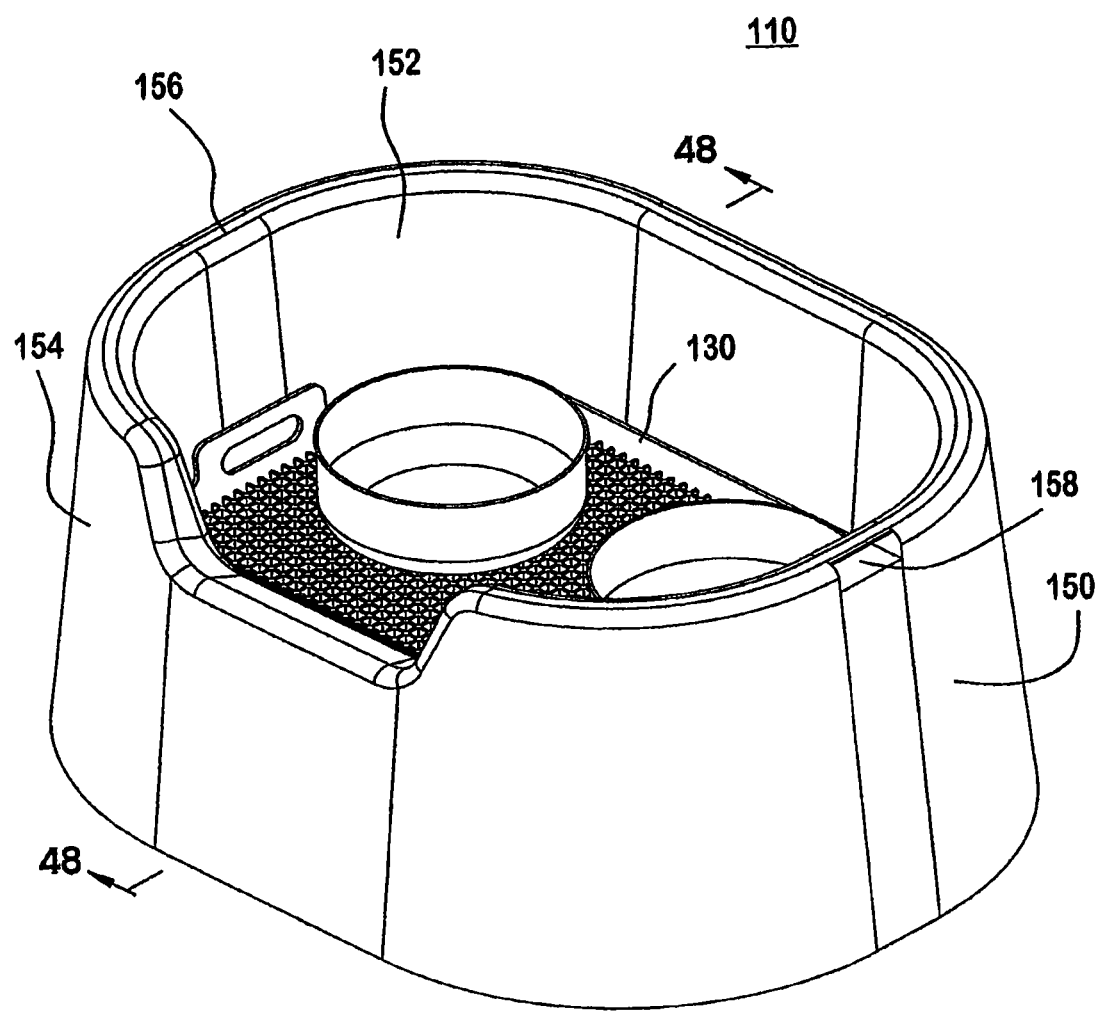
FIG. 47 illustrates a perspective view of an embodiment of the present invention having a modified oval shape, a double wall, and a raised interior base surface as means to elevate feeding bowls.
Figure 48:
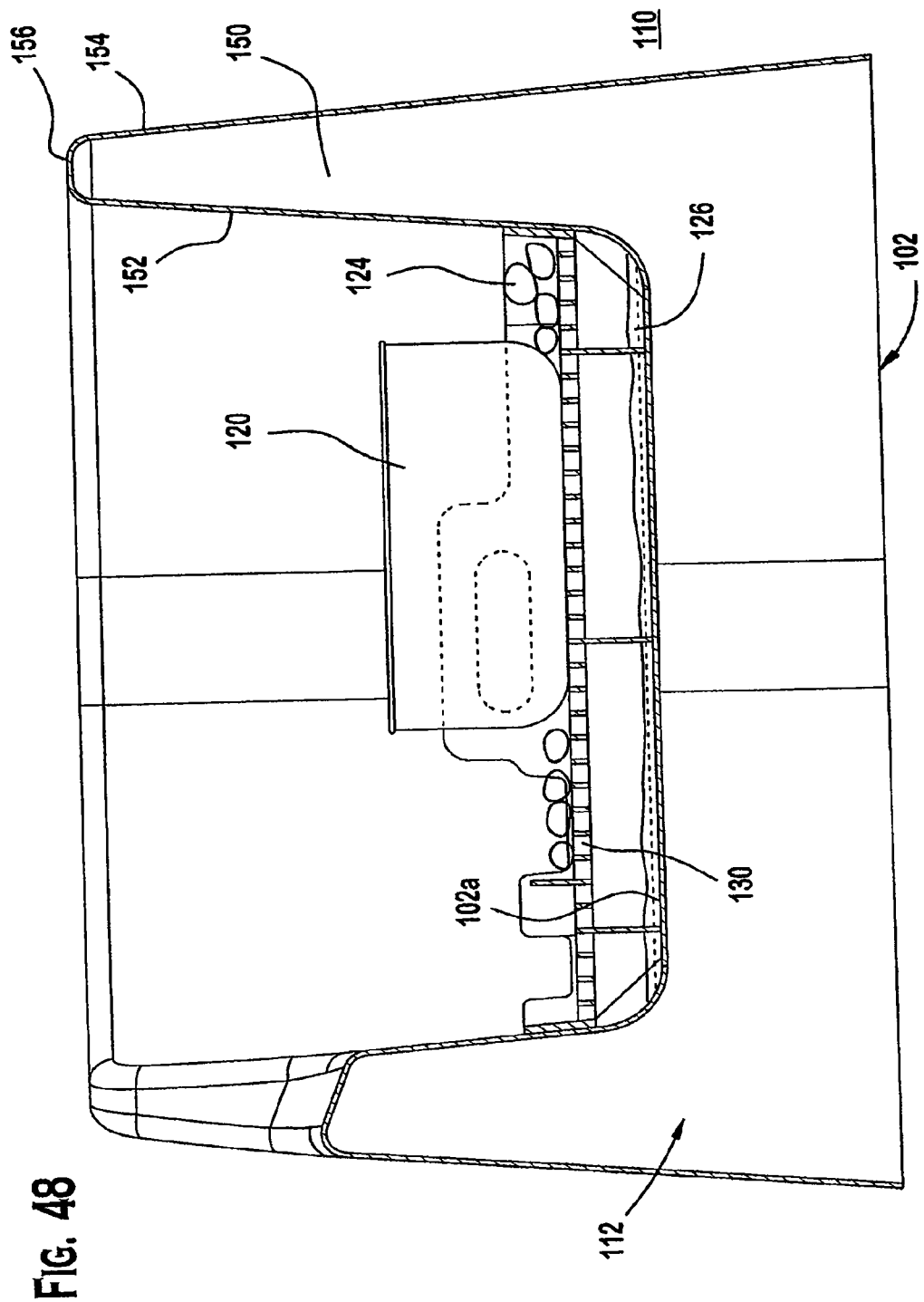
FIG. 48 illustrates a cross-sectional view, along the line 48-48, of the embodiment of the present invention shown in FIG. 47.

In alternative embodiments of the present invention, elevating means increase the height of the bowls relative to the floor. It has been reported that an elevated feeding position provides some health and comfort benefits for certain pets. Such elevating means can elevate the bowls themselves or elevate the surface upon which the bowls rest or are adapted to rest, whether that surface is the interior base surface 102*a* or a filtering tray 130. Elevating components are alternatively situated within the contained feeding area 103 or outside of the contained feeding area 103. For example, FIG. 46 is a cross-sectional view of an embodiment of the invention in which means for elevating the surface adapted to hold bowls is shown. In FIG. 46, a filtering tray 130 adapted to hold feeding bowls is elevated above the interior base surface 102*a* and rests upon protruding mounts 121 which extend from the walls. FIGS. 47 and 48 illustrate a perspective view and a cross-sectional view, respectively, of an embodiment of the invention in which the interior base surface 102*a* is raised above the floor. This is achieved by providing an outer wall 154 which has a greater height as measured from the floor than the height of the inner wall 152 as measured from the interior base surface 102*a*. Alternative embodiments having elevating components outside of the contained feeding area 103 are contemplated as having legs or support stands, among others. An additional way to provide elevating means is illustrated in FIG. 41, in which the height of the bottom of the mold 168 is raised so that the removable bowl 170 is elevated. For example, this can be achieved by configuring the relative lengths of the outer and inner walls of the mold 168 appropriately.

Figure 33:
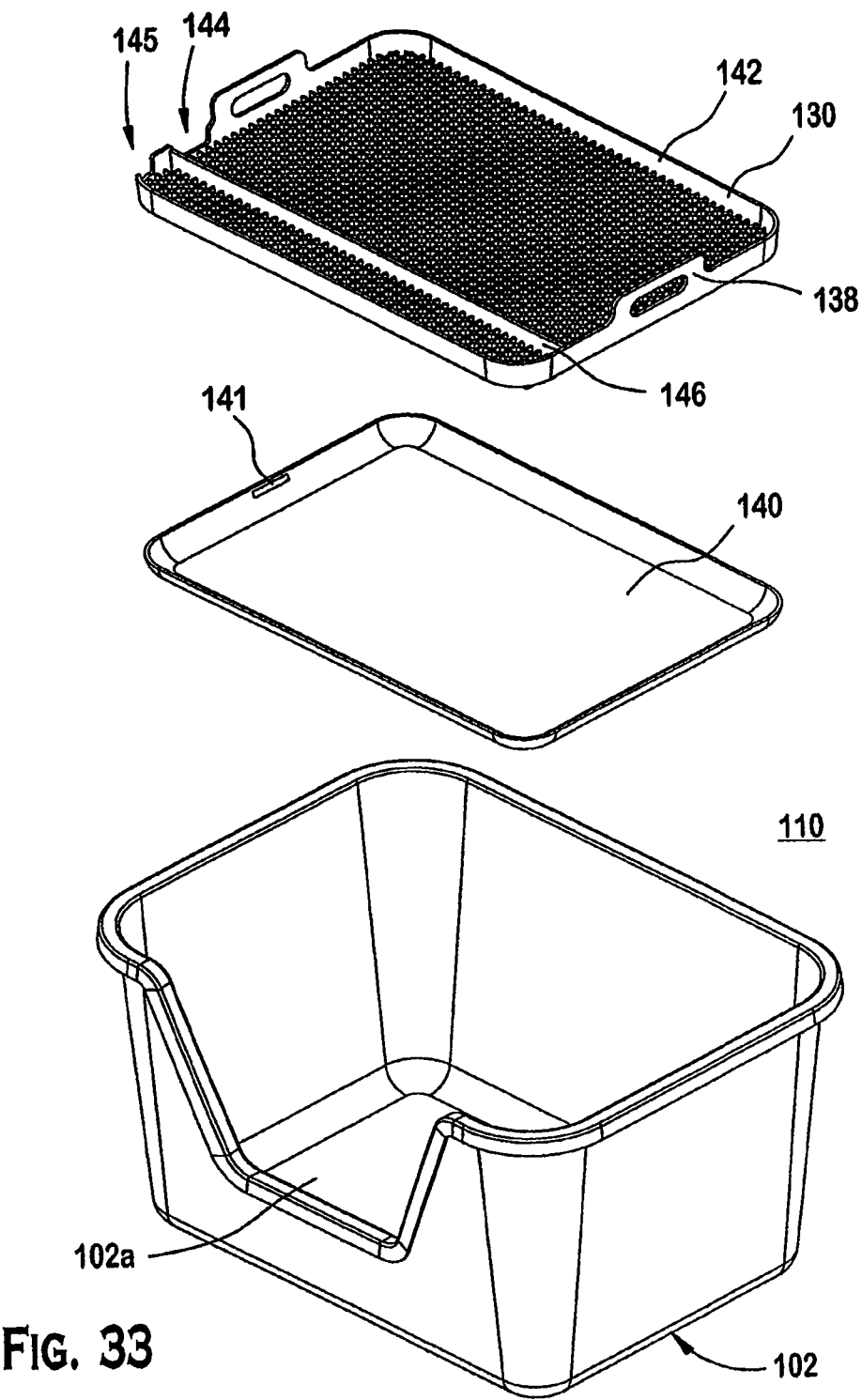
FIG. 33 illustrates an exploded view of an embodiment of the present invention having a filtering tray and a liner.
Figure 34:
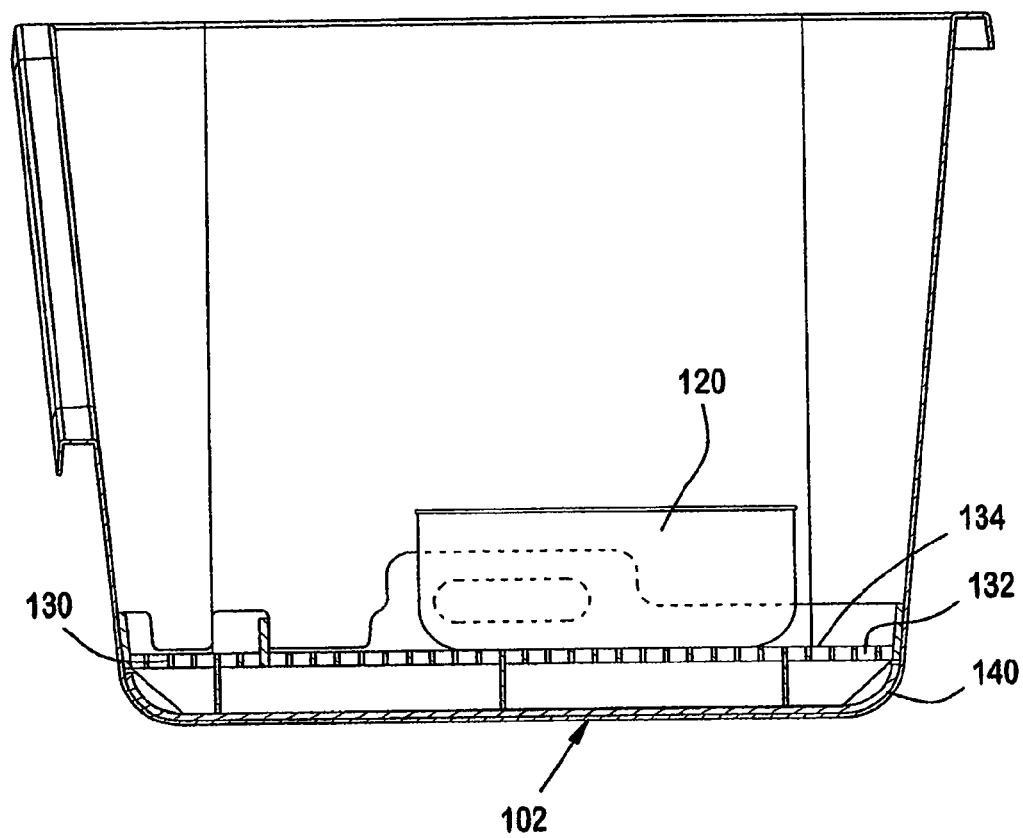
FIG. 34 illustrates a cross-sectional view of an embodiment of the present invention having a filtering tray and a liner.
Figure 35:
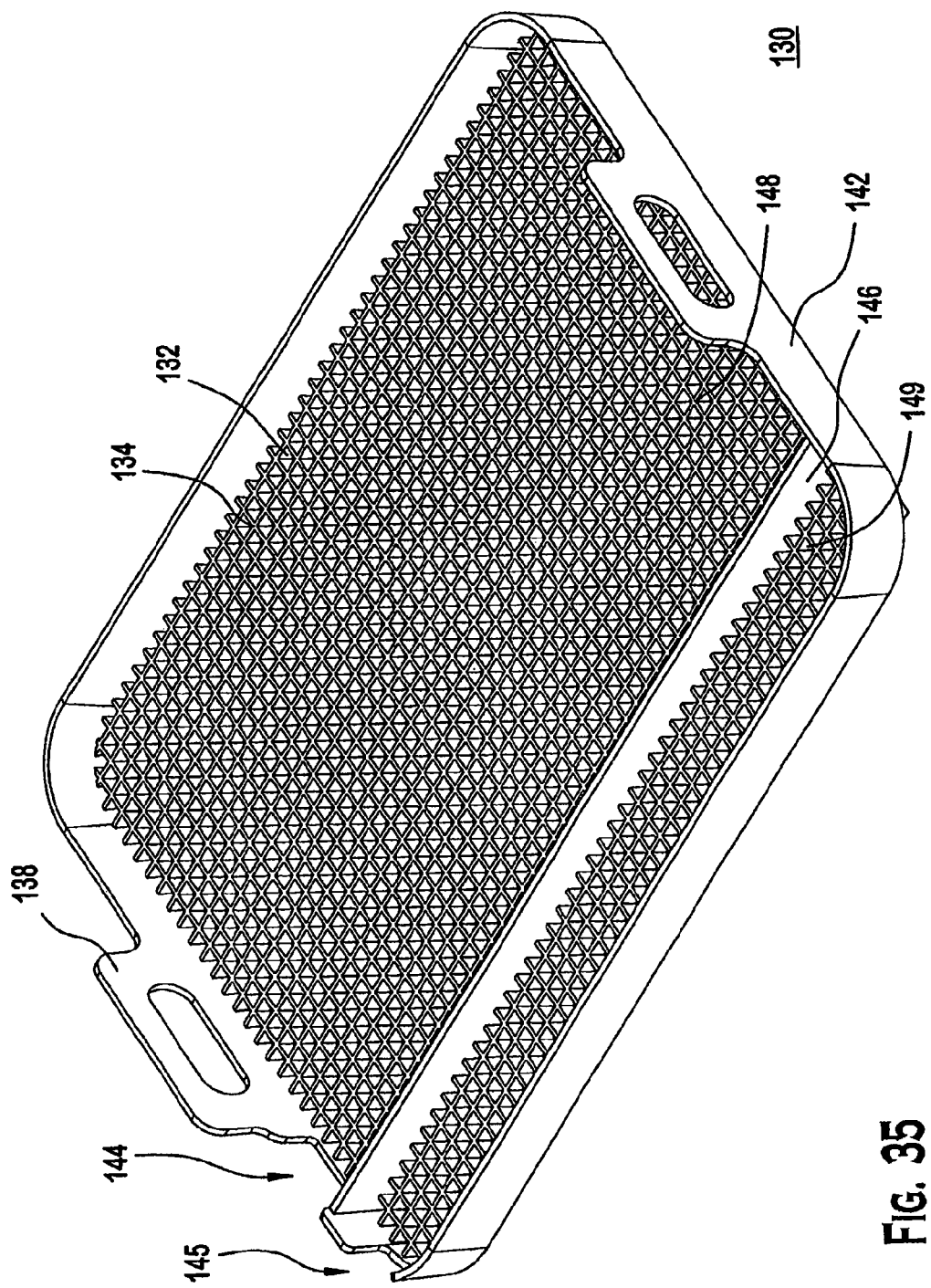
FIG. 35 illustrates a perspective view of an embodiment of the filtering tray.
Figure 36:
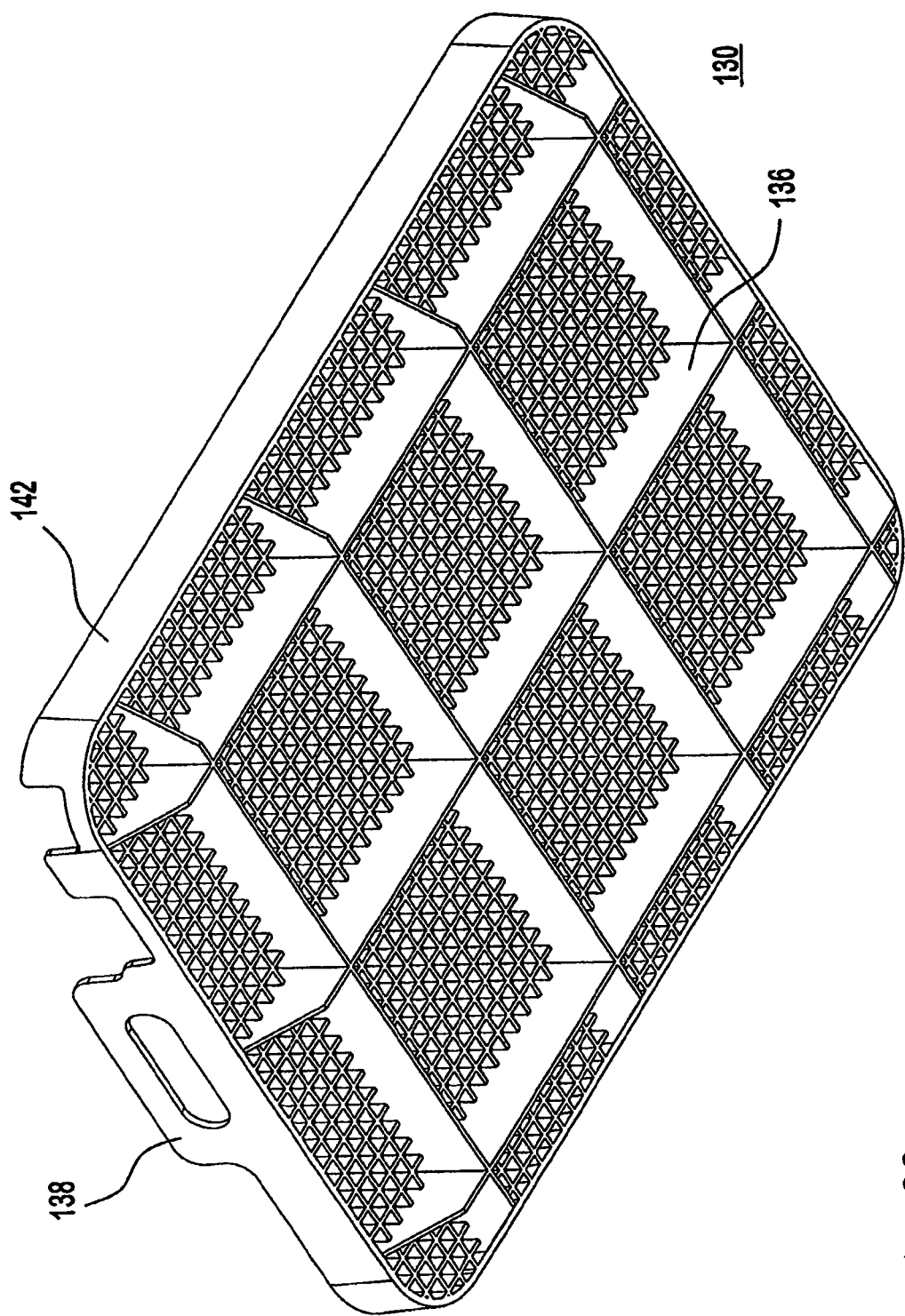
FIG. 36 illustrates a bottom perspective view of the embodiment of the filtering tray shown in FIG. 35.

FIG. 35 is a top perspective view of an embodiment of a filtering tray 130. It is contemplated that the filtering tray 130 comprises mesh, wire, or any material having a sufficient number of perforations to keep spilled food separate from spilled water. Most preferably, the filtering tray 130 comprises a screen or plurality of cross bars 134 attached together at their junctures. As can be appreciated, the interstitial spaces 132 are of any size that is sufficiently small to prevent a significant amount of spilled food from passing though the opening(s), while allowing a significant amount of water to pass through the opening(s). FIG. 36 is a bottom perspective view of the filtering tray 130. The filtering tray 130 is configured to allow for its top surface to be sufficiently high above the interior base surface 102*a* to keep spilled food separate from spilled water. Various designs, such as legs or supports, or more preferably raised cross bars 136 that intersect to create a grid, would allow for the top surface of the filtering tray 130 to be sufficiently high above the interior base surface 102*a* to keep spilled food separate from spilled water. The filtering tray 130 is preferably removable and comprises handles 138. It is contemplated that the handles 138 enable an owner to remove the filtering tray 130 to more easily retrieve spilled food from the top of the filtering tray 130 and clean spilled water off of the interior base surface 102*a* or liner 140 (as shown in FIGS. 33 and 34).

As illustrated in the embodiment shown in FIG. 35, the filtering tray 130 preferably comprises a peripheral wall 142. The peripheral wall 142 extends upwardly from the periphery of the filtering tray 130 to a height of at least ¼ inch above the filtering tray 130, more preferably to a height of about ½ inch to about 1½ inches above the filtering tray 130. The peripheral wall 142 inhibits spilled food from falling off an edge of the filtering tray 130 onto the interior base surface 102*a* or liner 140. In a preferred embodiment, the filtering tray 30 further comprises a raised divider 146. The raised divider 146 is substantially parallel to the front section 112 of the system 110 when the filtering tray 130 is abutting the walls of the system. The raised divider 146 extends upwardly from the filtering tray 130 to a height of at least ¼ inch above the filtering tray 130, more preferably to a height of about ½ inch to about 1½ inches above the filtering tray 130.

As illustrated in the top plan view of FIG. 31, when set inside the system 110, the raised divider 146 is a sufficient distance from the front section 112 to inhibit the food bowl 120 and water bowl 122 from touching the front section 112, most preferably in a range of about 1 inches to about 6 inches from the front section 112. The raised divider 146 inhibits the bowls 120, 122 from sliding forward, and from being pulled forward, on the filtering tray 130 and coming into contact with the front section 112. This further inhibits spills or splashes from soiling the front section 112 of the system 110 and the surrounding floor. Thus, spills coming out of the bowls 120, 122 are contained behind the divider 146 on a back portion 148 of the filtering tray 130. Some spilled food and water dropped by the pet may also fall onto a front portion 149 of the filtering tray 130 between the raised divider 146 and the front section 112.

In addition, the peripheral wall 142 alternatively defines at least one gap, more preferably a first gap 144 and a second gap 145. For example, as illustrated in FIG. 35, the first gap 144 is behind the divider 146 on the back portion 148 of the filtering tray 130, and the second gap 145 is in front of the divider 146 on the front portion 149 of the filtering tray 130. In an exemplary embodiment, the filtering tray 130 is removed from the system 110, and spilled food is collected from the top of the filtering tray 130 by tipping the filtering tray 130 at an angle to direct the spilled food along the peripheral wall 142 and the raised divider 146 towards the gaps 144, 145 and pouring the spilled food off of the filtering tray 30 through the gaps 144, 145.

Figure 42:
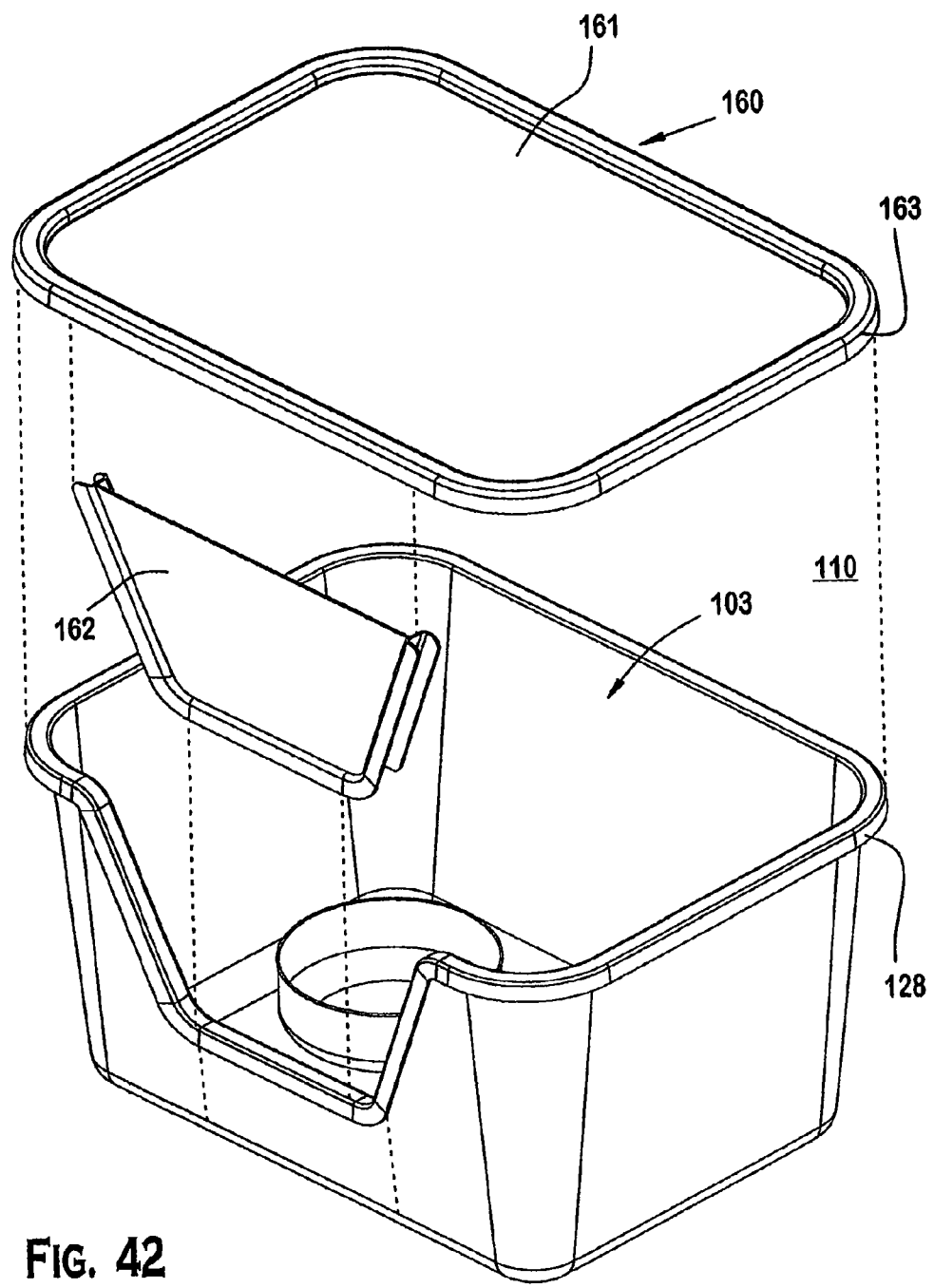
FIG. 42 illustrates an exploded view of an embodiment of the housing of the present invention having a lid.
Figure 43:
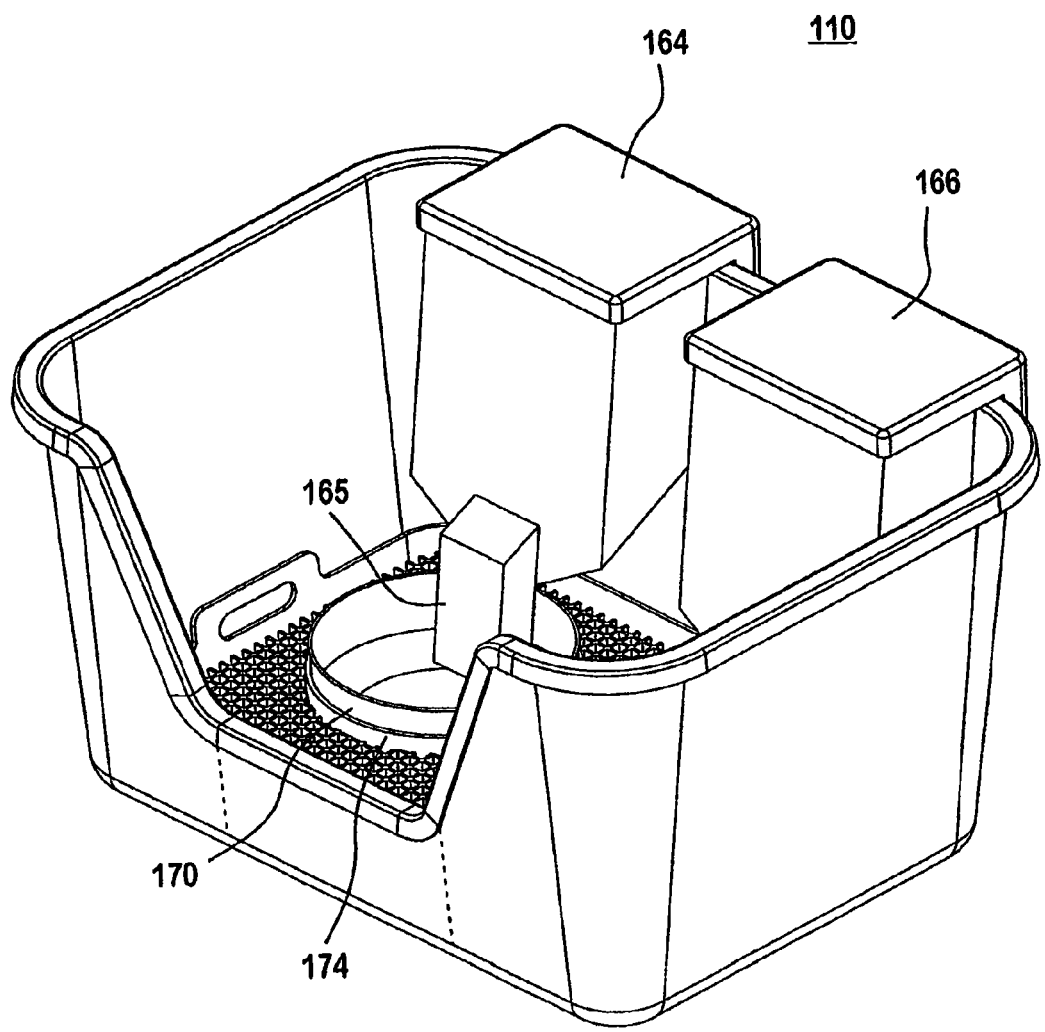
FIG. 43 illustrates a perspective view of an embodiment of the present invention having a gravity-fed food container and a gravity-fed water container.

FIG. 42 illustrates an embodiment of the housing of the present invention having a lid 160 coupled to the top of the housing. The lid 160 can be used for closing the feeding system 110 and for inhibiting access to the contained feeding area by, for example, pets and children. The lid 160 is contemplated as being either removable or non-removable. FIG. 43 illustrates a perspective view of an embodiment of the present invention having a food container 164 and a water container 166 disposed above the food bowl 120 and water bowl 122, respectively. Food is gravity-fed from the food container 164 into a food bowl 120, and water is gravity-fed from the water container 166 into the water bowl 122. Any known food and water containers can be used in the present invention, such as timer-controlled systems.

Figure 37:
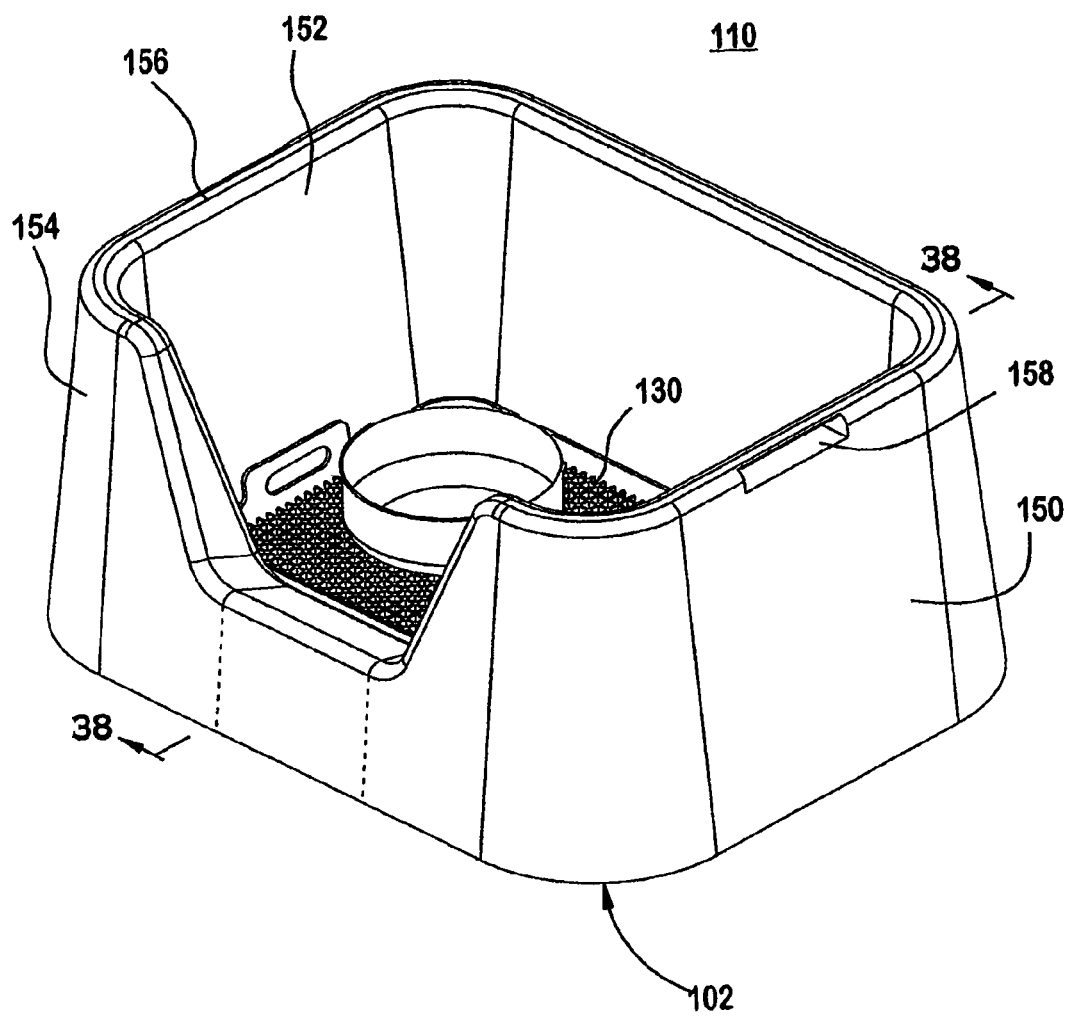
FIG. 37 illustrates a perspective view of an embodiment of the present invention having a double wall.
Figure 44:
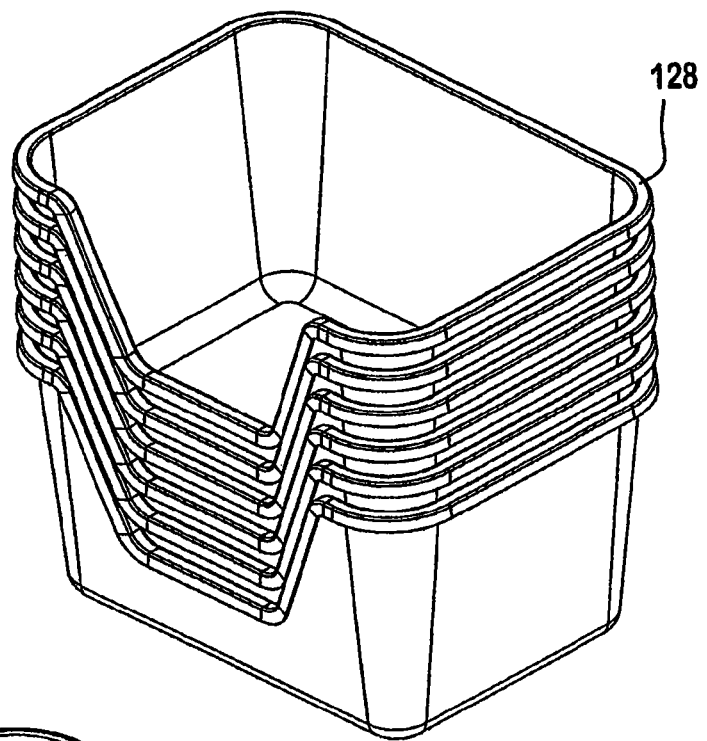
FIG. 44 illustrates a perspective view of several embodiments of the housing of the present invention having a rolled edge stacked on top of each other.
Figure 45:
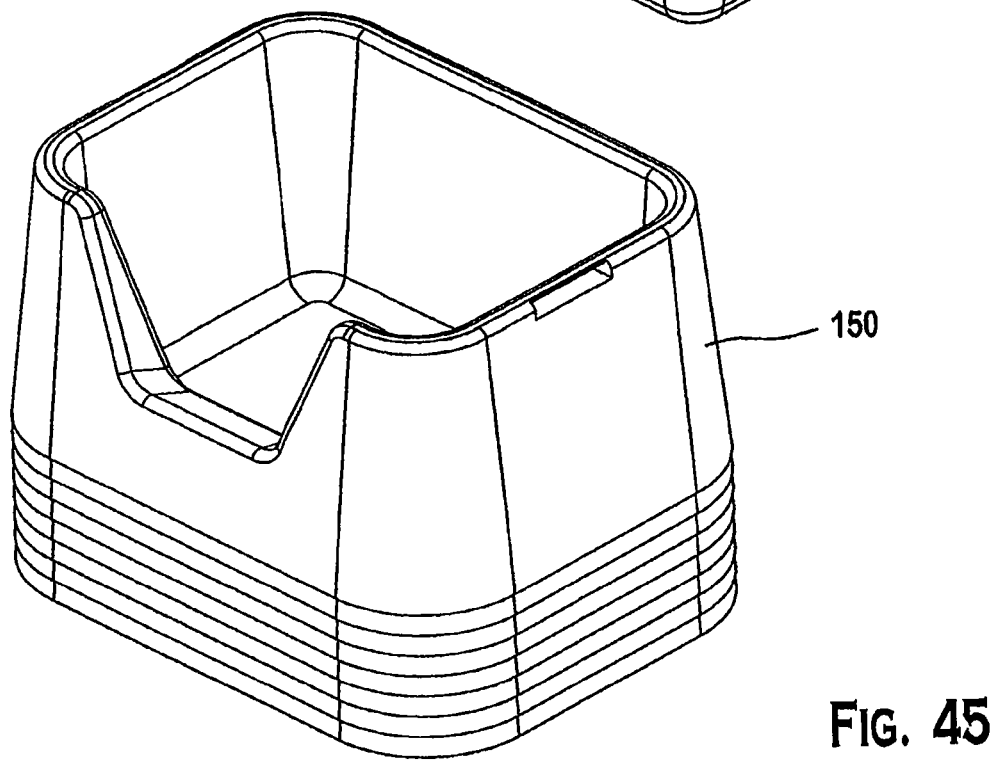
FIG. 45 illustrates a perspective view of several embodiments of the housing of the present invention having a double wall stacked on top of each other.

FIG. 37 illustrates an embodiment of the present invention having a double wall 150. In the double-walled embodiment, the at least one wall comprises an inner wall 152, an outer wall 154, and an upper portion 156, and the inner wall 152, the outer wall 154, and the upper portion 156 define a hollow space. FIG. 39 illustrates a monolithic embodiment of the housing of the present invention having a double wall 150 and a base 102 defining at least one mold 168 for containing food or water, or for containing a bowl which contains food or water. Preferably, the at least one mold 168 is disposed at a location relative to the front section 112 such that an area of the base 102 is exposed between the at least one mold 168 and the front section 112. As with other suitable features described in connection with one embodiment herein, this relative placement of the mold or openings with respect to the front section can be utilized in connection with other embodiments, such as the embodiment shown in FIGS. 1-8. The exposed area of the base 102 is sufficiently large so that food and/or water dropped by the pet lands on the exposed area of the base 102 and is contained by the feeding system 110. Also, as shown in FIGS. 44 and 45, pet feeding systems of the present invention are stackable on top of each other.

The present invention provides a method for collecting spilled food and spilled water from a pet feeding system 10. In one method embodiment, the method comprises the steps of separating the pet feeding system 10 into a first reservoir 2 and a second reservoir 4; removing the spilled food from the first reservoir 2; and removing the spilled water from the second reservoir 4. In a preferred embodiment, the separating step comprises detaching the reservoirs by lifting the first reservoir 2 off of the second reservoir 4. Alternatively, the second reservoir is removed from underneath the first reservoir. For example, when using the embodiment shown in FIG. 18, the drawer-like second reservoir 4 is slid out from under the first reservoir 2. In a preferred embodiment, the spilled food that is collected from the first reservoir 2 is substantially dry and can be saved for re-use, and the spilled water can be saved for safe disposal; the spilled water that is collected from the second reservoir 4 is substantially clean because it is substantially free of spilled food, which decreases the need for frequent removal and keeps spills more sanitary and less odorous and unsightly. A user preferably holds the spilled food and spilled water for safe re-use and/or disposal, thereby conserving spilled food and preventing spilled food and water from causing damage to surrounding floors and walls.

Preferably, the method for collecting spilled food and spilled water includes a step of setting the first reservoir 2 down on a floor or surface, after separating the first reservoir 2 and second reservoir 4. As shown in FIG. 8, one embodiment of the first reservoir 2 comprises a support portion 34. The support portion 34 causes the first reservoir 2 to fit snugly into the second reservoir 4, as shown in its assembled position in FIG. 1, for example. The support portion 34 also ensures that the first reservoir 2 remains level if a user sets the first reservoir 2 down on a floor or surface. As discussed above, in an exemplary embodiment, the support portion 34 extends downward substantially enough to ensure that the tops of the bowls 14, 15 remain substantially level if a user sets the first reservoir 2 down on a floor or surface with the bowls still resting in the openings 40, 42. In this way, if a user were to rest the first reservoir on the floor or on a counter, with the bowls still in it, the bowls would more securely stay in place. In addition, it may also be possible to invert the second reservoir, then place it into the top of the first reservoir for stacking purposes. In addition, it is also preferable to size each reservoir to be capable of being stacked individually, for shipping. In a preferred embodiment, the high portions 3a and 3b of the front wall that are adjacent to the low portion 30 form corners which provide a user with the option of tilting or substantially inverting the first reservoir 2 so that spilled food (or spilled food and/or water, such as may occur when using the embodiment shown in FIG. 50, for example) is poured down one of the corners and out of the top of the reservoir 2. The high portions 3a, 3b, 25 that form the front corners cause the spilled food and/or water to be concentrated into a relatively narrow stream that can be easily poured out.

Referring again to FIG. 2, the manner in which pet feeding system 10 collects spilled food and spilled water will be described in additional detail. During a feeding, a spilled food is received on base 60. Similarly, spilled water is received on base 60. The spilled water is conveyed down at least one channel to rapidly remove the spilled water from the bowl area and into the trap. The spilled water may be conveyed down central channel 70, side channel 72, side channel 74, or a combination of any two channels, or all three channels. The spilled water enters the trap 17 and drains through the openings 38 to the second reservoir 4, where the liquid remains separate from the spilled food. The spilled food remains on base 60 or in the trap 17 and accessible to the pet. The spilled food remaining on the base or in the trap may be consumed by the pet, or recovered for a subsequent feeding.

Figure 50:
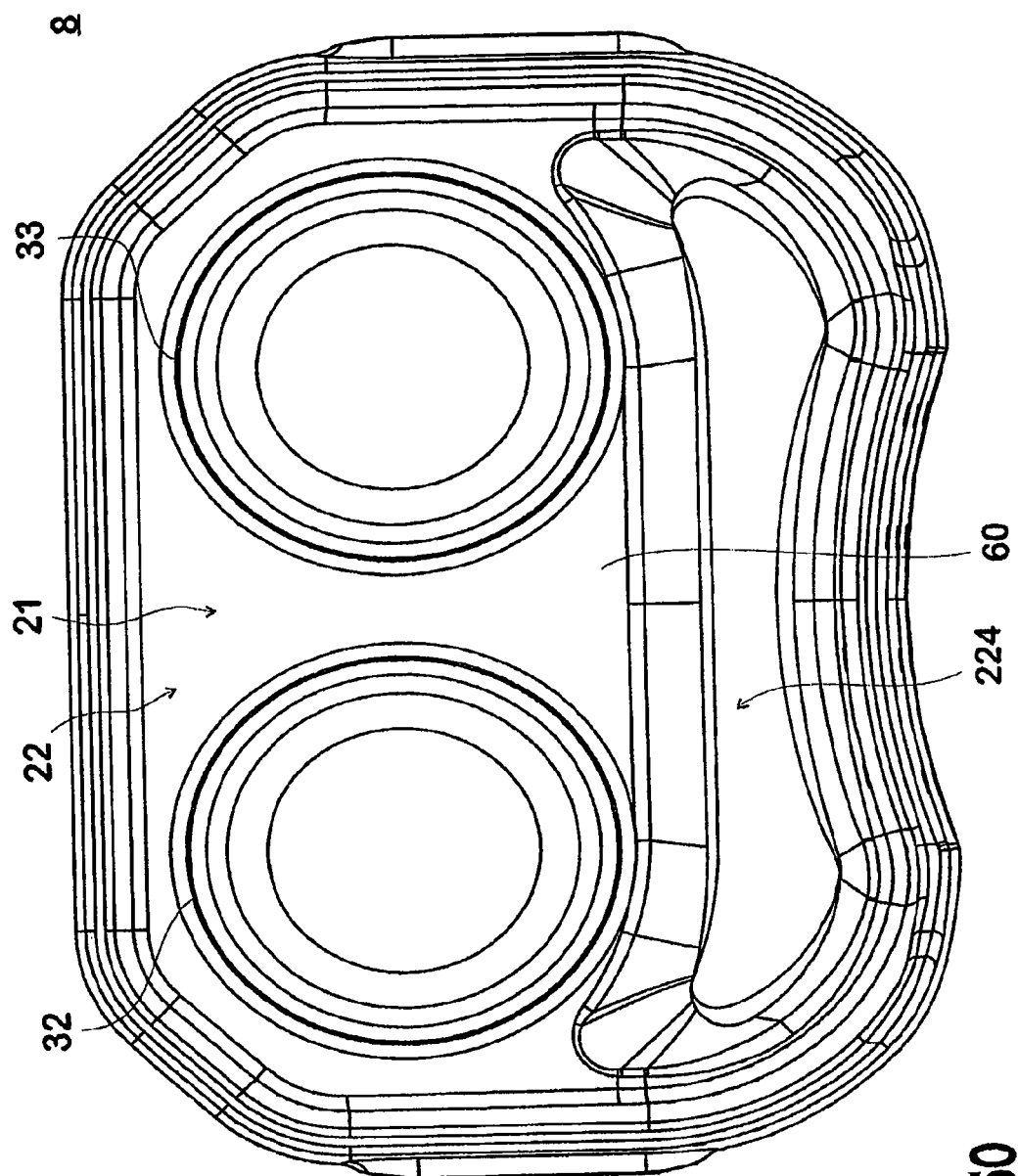
FIG. 50 illustrates a top plan view of an embodiment of the invention with a collection region.

FIG. 50 illustrates an embodiment with a housing 8 which does not include any filtering means. In this embodiment, the pet feeding system comprises housing 8 which defines a contained feeding area 21 having a bowl region 22 and a collection region 224. Bowl region 22 is adapted to hold at least one bowl for containing food, water, or both food and water. As shown in FIG. 50, the bowl region is adapted to contain a first bowl 32 and a second bowl 33. As in the embodiments shown in FIGS. 1-15, housing 8 has a base 60 with a sloped surface for directing water from bowl region 22 to collection region 224. Collection region 224 is adapted to contain a quantity of water, such as by having a concave area, as discussed in the embodiments in connection with perforated collection region 24. Because there is no means for filtering, however, collection region 224 simply stores the water for being drained, or saved for re-use. While the same shape of the collection region is shown as in the other embodiments, other shapes can readily be contemplated.

FIG. 51 illustrates an embodiment of a pet feeding system 250 comprising a housing 251 and a filter component 252. Housing 251 defines a contained feeding area 254 adapted to hold at least one bowl for containing food, water, or both food and water and defines a filter opening 253. Upon placement by the user, filter component 252 is mounted to housing 251 at filter opening 253 for filtering spilled food from spilled water, wherein the filter component comprises at least one opening sufficiently small such that the spilled food remains on the filter component but the spilled water passes through the at least one opening, thereby allowing for separation of spilled food from spilled water. In this embodiment, filter component 252 is assembled to be a component which is separate from housing 251, such that the filter component can be easily removed from the housing by a user. For example, while feeding system 250 is configured for allowing pets to feed from the feeding system, filter component 252 is mounted in place over filter opening 253 to separate food from water. While in place, some of the spilled food will fall into the trough area of filter component 252, as the filter component is contoured as shown to form such a trough area for retaining spilled food. Also, in such a configuration, a user could easily move spilled food from the other parts of contained feeding area 254 into filter component 252. When some amount of food has accumulated on filter component 252, a user may remove the filter component and pour the food into another container for reuse or disposal.

Preferably, the filter component is designed and shaped to conform snugly around the filter opening to minimize the chance of any food pieces from falling down to the second reservoir. Also, filter component 252 preferably has a flush friction fit to seal properly over filter opening 253 thereby preventing the spillage of any food into the lower reservoir. Other means for sealing filter component 252 to housing 251 may be employed, including a hook and loop fastener, an adhesive, a resilient hook formed onto the filter component fitting into a hole on the housing, or a magnetic system. Also, some means for easily removing filter component 252 from housing 251 may be utilized, such as a nub or hook for grasping or a finger hook formed on the edge of the frame for lifting the filter component off of the housing.

Figure 52A:
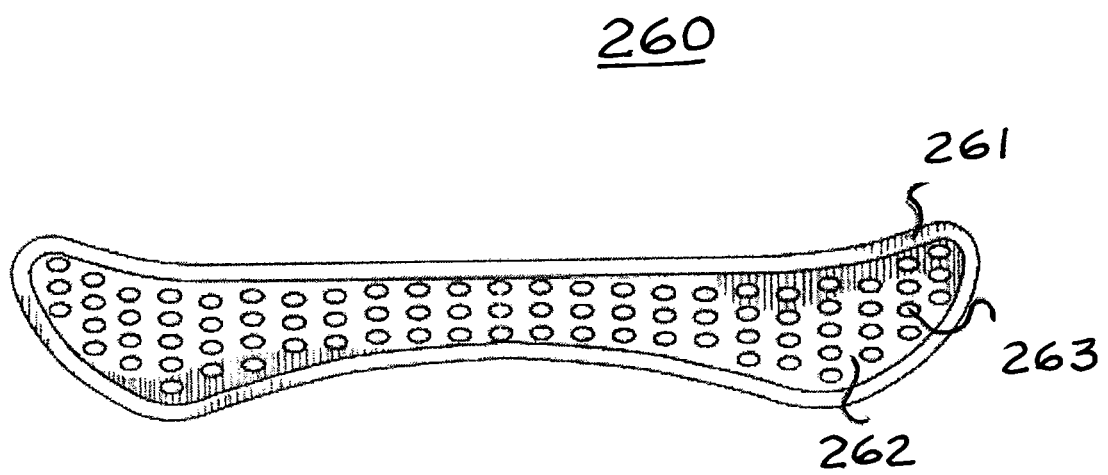
FIGS. 52a, 52b, and 52c illustrate top plan views of various views of the filter component suitable for use in the embodiment shown in FIG. 51.
Figure 52B:
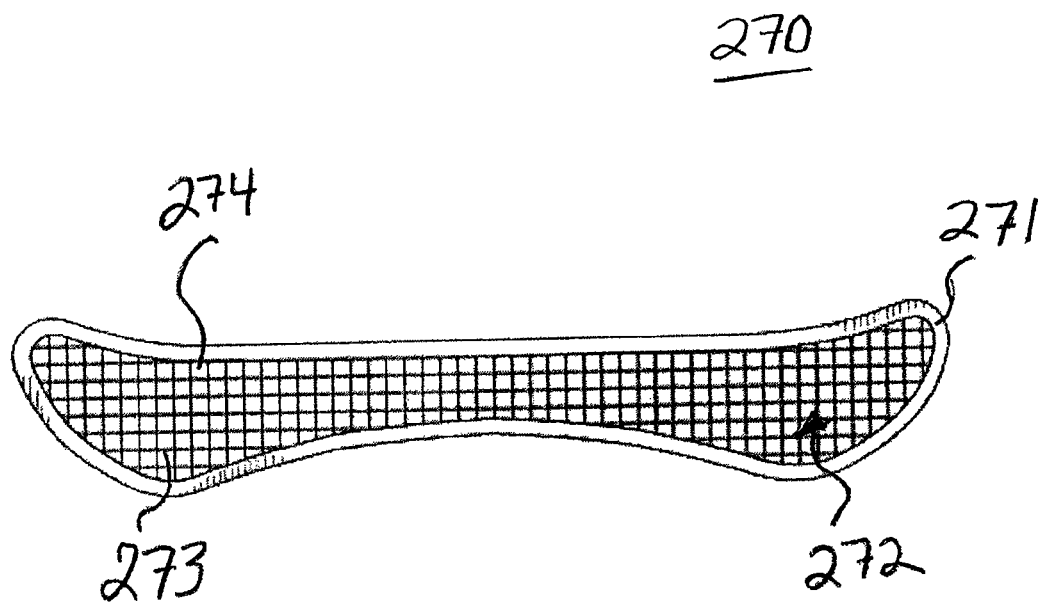
Figure 52C:
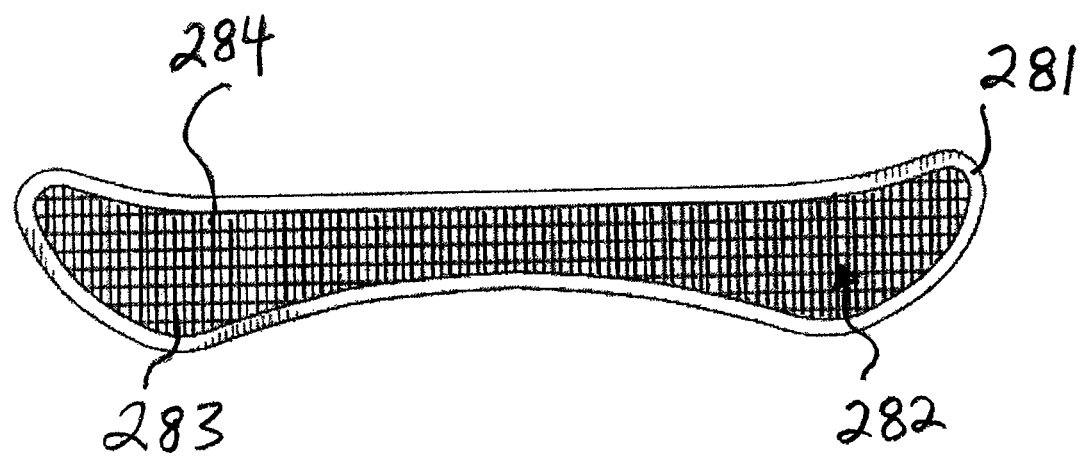

FIGS. 52a, 52b, and 52c illustrate various embodiments of filter component 252. In these embodiments, the filter component comprises a frame, which may be rigid, and a filter material attached to the frame. For example, FIG. 52a shows a filter component 260 having a rigid frame 261 and a filter material 262 having a plurality of holes 263. In this embodiment, holes 263 are ovular in shape, as discussed above in connection with other embodiments. FIG. 52b shows a filter component 270 having a rigid frame 271 and a filter material 272. In this embodiment, filter material 272 comprises a relatively coarse wire mesh material made of wires 273 defining square-shaped holes 274. FIG. 52c shows a filter component 280 having a rigid frame 281 and a filter material 282, which in this embodiment is a fine mesh 283. The fine mesh 283 defines openings 284 sized on the order of hundredths of an inch across (or less). The fine mesh material may be made of metal, plastic, fabric or a variety of permeable membranes and materials. For any of the embodiments shown in FIGS. 52a-52c, the filter component may be reusable or disposable. Alternatively, it may be used with a suitably-sized filter paper which itself is disposable. Of course, other forms of a filter component may be employed, such as a single slit formed in a filter component. Preferably, the filter component is positioned near the front of the pet feeding system.

Although illustrated and described above with reference to certain specific embodiments, the present invention is nevertheless not intended to be limited to the details shown. Rather, various modifications may be made in the details within the scope and range of equivalents of the claims and without departing from the invention. Therefore, many of the features of the invention illustrated in the figures only in connection with one of the embodiments, such as, for example, the food container 164 and water container 166, may be adapted to be included in other embodiments of the invention. Moreover, many elements in the illustrated embodiments are primarily or exclusively ornamental elements. Those elements may have a wide variety of shapes or configurations selected to meet aesthetic criteria, and those elements may be modified within the scope of the invention to suit particular tastes. For example, the shape, contours, and relative dimensions of collar 11 and upper reservoir 2 need not be as shown in FIG. 1, and neither FIG. 1 nor any of the Figures are intended to be limited to any particular scale or proportion. A collar with a much smaller or larger overhang can be used, for example, with the understanding that the chosen amount of overhang is selected for purely decorative reasons. Similarly, the perimeter shape of trough 46 need not be the exact shape shown for purposes of illustration in FIG. 2, and can be made with a number of other arbitrary shapes. Likewise, the inwardly curved contour of front wall 12 shown in FIG. 2 need not have the contour shown, but instead may have a smaller or larger radius of curvature, or a compound radius, or may optionally be eliminated entirely. Alternatively, front wall 12 may have no curvature at all, and instead may have a polygonal indentation that is rectangular or trapezoidal, for example. These ornamental aspects of the embodiments, which are only some of the ornamental aspects shown on the embodiments, may be modified in accordance with customer tastes or design preferences, without departing from the scope of the invention.

What is claimed:

1. A pet feeding system comprising:
a housing defining a contained feeding area having a bowl region adapted to hold at least one bowl for containing food, water, or both food and water, and a collection region, the housing having a base with a sloped surface for directing water from the bowl region to the collection region, the contained feeding area surrounded by a wall extending upwardly from the base, the bowl region comprising an opening extending through the sloped surface, the opening having a perimeter that is surrounded by a peripheral wall, the bowl region further comprising a bowl that is received in the opening and resting on the peripheral wall, the wall surrounding the contained feeding area extending higher than the peripheral wall so that the entirety of the bowl is positioned below the top of the wall surrounding the contained feeding area, the wall surrounding the contained feeding area and the peripheral wall being separated from one another by at least one channel that slopes downwardly from the bowl region to the collection region, forming a chute for conveying spilled water from the bowl region directly into the collection region by channel flow.

2. A pet feeding system comprising:
a base having a first end and a second end opposite the first end, the base having a perimeter and a slope descending from the first end to the second end and an opening extending through the base, the opening having a perimeter that is surrounded by a peripheral wall;
a barrier extending upwardly from the base and surrounding the perimeter of the base, the barrier having a first section rising a first height from the base, and a second section rising a second height from the base at the second end of the base, the second height being less than the first height to form an access opening at the second end of the base;
a trap in the second end of the base for receiving a solid or a liquid spilled on the base, the trap comprising at least one opening for allowing a liquid that enters the trap to exit the trap while retaining a solid that enters the trap in the trap; and
a bowl extending through the opening and resting on the peripheral wall, the first section of the barrier extending higher than the peripheral wall so that the entirety of the bowl is positioned below the top of the first section, the first section and the peripheral wall being separated from one another by at least one channel that slopes downwardly from the first end to the second end, forming a chute for conveying spilled water from the first end of the base directly into the trap by channel flow.

3. The pet feeding system of claim 2, wherein the at least one opening comprises a plurality of openings in the trap.

4. The pet feeding system of claim 2, wherein the at least one opening comprises a single opening in the trap.

5. The pet feeding system of claim 2, wherein the trap is integral with the base.

6. The pet feeding system of claim 2, wherein the trap is removable from the base.

7. The pet feeding system of claim 2, wherein the opening and the peripheral wall form a first bowl receptacle on a first side of the base, the base further comprising a second bowl receptacle on a second side of the base opposite the first side of the base.

8. The pet feeding system of claim 7, wherein the second bowl receptacle comprises an opening and a peripheral wall extending upwardly from the base.

9. The pet feeding system of claim 8, wherein a space between the peripheral wall of the second bowl receptacle and the barrier forms a flow channel for conveying liquid, the flow channel discharging into the trap.

10. A pet feeding system comprising:
a base having a first end and a second end opposite the first end, the base having a slope descending from the first end to the second end;
at least one bowl receptacle between the first and the second end, the at least one bowl receptacle comprising an opening extending through the base and a peripheral wall surrounding the opening;
a barrier extending upwardly from and surrounding the perimeter of the base;
a trap in the second end of the base for receiving a solid or a liquid spilled on the base; and
a bowl extending through the opening and resting on the peripheral wall, the barrier extending higher than the peripheral wall so that the entirety of the bowl is positioned below the top of the barrier, the barrier and the peripheral wall being separated from one another by at least one channel that slopes downwardly from the first end to the second end, forming a chute for conveying spilled water from the first end of the base directly into the trap by channel flow.

11. The pet feeding system of claim 10, wherein the trap includes means for draining liquid from the trap and retaining solids in the trap.

12. The pet feeding system of claim 11, wherein the means for draining liquid from the trap and retaining solids in the trap comprises at least one opening at a bottom-most section of the trap.

13. The pet feeding system of claim 10, wherein the at least one channel extends along an edge of the at least one bowl receptacle and discharges into the trap.

14. The pet feeding system of claim 10, wherein the at least one bowl receptacle comprises a first bowl receptacle comprising a first opening through the base and a second bowl receptacle comprising a second opening through the base, the first opening surrounded by a first peripheral wall, and the second opening surrounded by a second peripheral wall.

15. The pet feeding system of claim 14, further comprising a central channel extending from the first end of the base and discharging into the trap, the central channel bounded on one side by the first peripheral wall and bounded on the other side by the second peripheral wall.

16. The pet feeding system of claim 1, wherein the collection region comprises means for filtering spilled food from spilled water.

17. The pet feeding system of claim 16, wherein the means for filtering spilled food from spilled water comprises at least one opening sufficiently small such that the spilled food remains in the contained feeding area but the spilled water passes through the at least one opening, thereby allowing for separation of spilled food from spilled water.

18. The pet feeding system of claim 1, wherein the collection region is a perforated collection region for filtering spilled food from spilled water.

19. The pet feeding system of claim 1, wherein the housing comprises a first reservoir, the pet feeding system further comprising a second reservoir separate from the first reservoir, the first reservoir adapted to collect spilled food and the second reservoir adapted to collect spilled water.

20. The pet feeding system of claim 1, wherein the collection region comprises a removable filter component mounted to the housing.

21. A pet feeding system comprising:
a base having a first end and a second end opposite the first end, the base having a perimeter and a slope descending from the first end to the second end and an opening extending through the base, the opening having a perimeter that is surrounded by a peripheral wall;
a barrier extending upwardly from the base and surrounding the perimeter of the base;
a trap in the second end of the base for receiving a solid or a liquid spilled on the base, the trap comprising at least one opening for allowing a liquid that enters the trap to exit the trap while retaining a solid that enters the trap in the trap;
a bowl extending through the opening and resting on the peripheral wall, the barrier extending higher than the peripheral wall so that the entirety of the bowl is positioned below the top of the barrier, the barrier and the peripheral wall being separated from one another by at least one channel that slopes downwardly from the first end to the second end, forming a chute for conveying spilled water from the first end of the base directly into the trap by channel flow; and
a reservoir extending beneath the slope and trap, the reservoir consisting of a single basin in fluid communication with the trap for receiving spilled liquid that exits the trap.

* * * * *